(12) United States Patent
Kondo et al.

(10) Patent No.: US 6,347,993 B1
(45) Date of Patent: Feb. 19, 2002

(54) VIDEO GAME DEVICE, CHARACTER GROWTH CONTROL METHOD FOR VIDEO GAME AND READABLE STORAGE MEDIUM STORING GROWTH CONTROL PROGRAM

(75) Inventors: Tetsuya Kondo, Nara; Eiji Nakagawa, Kakogawa; Akinori Hiromi, Habikino, all of (JP)

(73) Assignee: Konami Co., Ltd., Tokyo (JP)

( * ) Notice: Subject to any disclaimer, the term of this patent is extended or adjusted under 35 U.S.C. 154(b) by 0 days.

(21) Appl. No.: 09/569,947

(22) Filed: May 12, 2000

(30) Foreign Application Priority Data

May 13, 1999 (JP) .......................................... 11-133356

(51) Int. Cl.[7] .................................................. A63F 9/22

(52) U.S. Cl. ................................ 463/1; 463/4; 463/36; 463/44; 463/45; 434/167; 434/169; 434/185; 434/308

(58) Field of Search ................................ 463/1, 43–44, 463/36; 434/169, 185, 167, 308

(56) References Cited

U.S. PATENT DOCUMENTS

| | | | | |
|---|---|---|---|---|
| 4,858,930 A | * | 8/1989 | Sato | 273/85 G |
| 5,498,002 A | * | 3/1996 | Gechter | 273/434 |
| 5,885,156 A | | 3/1999 | Toyohara et al. | 463/1 |

FOREIGN PATENT DOCUMENTS

EP 0768105 4/1997

OTHER PUBLICATIONS

Tim Chown: "Premier Manager 97" Online!, May 1997, pp. 1–8, XP002115838 *p. 4, paragraph 3*.
Tim Chown: "Championship Manager 3"Online!, Apr. 1999, pp. 1–5, XP002153214, Retrieved from the Internet: <URL: www.gamesdomain.co.uk/gdreview/zones/reviewes/pc/apr99/cm3_prnt.html;> retrieved on Nov. 17, 2000! *p. 2, paragraph 5*.
"Monthly Gamewalker", Dec. 1997, p. 119, article "Debut 21" (published on Dec. 1, 1997, by Kadokawa Shoten Inc.).
Amusement Sangyo–The Amusement Industry, Apr. 1999, p. 157, article "Love Quiz Highschool Angel" (published on Mar. 26, 1999, by Amusement Sangyo Inc.).

* cited by examiner

*Primary Examiner*—Michael O'Neill
*Assistant Examiner*—Carmen D. White
(74) *Attorney, Agent, or Firm*—Jordan & Hamburg LLP

(57) ABSTRACT

A video game device of this invention comprises a speech/action storage device for storing contents of various speeches and actions of a leader character to be given to a main character as an ability growth object; an ability value updating device for successively updating an ability value of the main character according to the execution result of the content of the speech/action; a parameter storage device for storing an enthusiasm parameter which is set to be a positive value for each training-related speech/action and a negative value for any other speech/action; an enthusiasm parameter adding device for adding a set value to a present enthusiasm parameter given to the main character every time the speech/action is executed; a reliability degree calculating means for calculating a reliability degree between the main character and the leader character; and a judging device for judging a successful growth of the main character.

18 Claims, 57 Drawing Sheets

FIG. 58

Bad ending episode 9

~ EXPLOSION ~

VIDEO GAME DEVICE, CHARACTER GROWTH CONTROL METHOD FOR VIDEO GAME AND READABLE STORAGE MEDIUM STORING GROWTH CONTROL PROGRAM

The present invention relates to a video game system (device) for a growth game or a like game in which specific abilities are given to a main character by causing the main character on a video screen to perform a simulated experience (roll-playing) instead of a game player using a cassette type storage medium including an optical disk, magnetic disk or semiconductor memory storing program data, a character growth control game and a readable storage medium storing a game program.

BACKGROUND OF THE INVENTION AND RELATED ART STATEMENT

As roll-playing games in which a game player goes through a simulated experience as a main character on a video screen, battle games in which the main character grows while repeating battles with enemy character(s) in various scenes are known. There are also known games in which an individuality is given to a main character by allotting abilities of specified values from a plurality of kinds of abilities to the main character.

Japanese Unexamined Patent Publication No. 9-140938 discloses a game in which points allottable to various abilities are given to a player at certain probabilities by causing a main character to execute various speeches/actions, and the player having desired abilities is reared by allotting the given points to desired ability values, wherein particularly physical and mental states of the character are changed according to the selected speech and the above probabilities are changed according to the physical and mental states.

In the above battle games, the fighting ability of the main character is improved as he fights with an enemy character. Since this fighting ability is strengthened or weakened according to a game operating ability of the game player and an ability growing factors depend only on the fighting state with the enemy character, the same or similar results are always obtained. As a result, these battle games lack an interesting nature as a game. Further, in the games in which various abilities of the main character are allottably set, only the main character which is set exactly as the player instructed is obtained. Thus, these games lack in variety, and therefore lack an interesting nature as a game.

Further, in the growth game disclosed in the above publication, the physical and mental states lead to an increase of the given points at a certain probability and the given points are adopted to be allotted to the ability values. Therefore, these points cannot serve as a judgment factor for the evaluation of the growth.

SUMMARY OF THE INVENTION

In view of the above problems residing in the prior art, an object of the present invention is to provide a video game device, a character growth control method and a readable storage medium storing a growth program, which provide high interesting nature and gaming nature by realizing a growth evaluation of a main character from a broad point of view, i.e. realizing a growth roll-playing in a more realistic manner.

A first aspect of the present invention relates to a video game device comprising:

a speech/action storage means for storing contents of various speeches and actions of a leader character to be given to a main character as an ability growth object relating at least to training and a random factor;

a display control means for displaying the leader character, the main character, menus corresponding to the various speeches/actions made by the main character, and contents of the speeches/actions to be executed on a display unit;

an operation unit for successively selectably instructing the menu corresponding to an arbitrary speech/action from the various menus displayed on the display unit;

a speech/action executing means for reading out the speech/action corresponding to the menu instructed by the operation unit and causing the main character to perform the content of the speech/action into which the random factor is incorporated to thereby obtain an execution result, an ability value updating means for successively updating an ability value of the main character according the execution result of the content of the speech/action;

a parameter storage means for storing an enthusiasm parameter which is set to be a positive value corresponding to each training-related speech/action while being a negative value corresponding to any other speech/action;

an enthusiasm parameter adding means for adding a corresponding set value to a present enthusiasm parameter presently given to the main character every time the speech/action is executed, a reliability degree calculating means for calculating a reliability degree between the main character and the leader character, and a judging means for judging a successful growth based on conditions if the ability value of the main character is equal to or above a specified level after the speeches/actions are executed a specified number of times and if the reliability degree given to the main character is equal to or above a specified level.

With the video game device constructed as above, the leader character and the main character of this video game suitably appear on the display unit, and the menus corresponding to the various speeches/actions of the main character and the contents of the speeches/actions to be executed are displayed on the display unit if necessary. Various contents of speeches/actions of the leader character to be given to the main character as an ability growth object and relating at least to the training and the random factor are successively read from the speech storage means and executed according to the successive operation of the operation unit, and the main character is caused to perform the contents of speeches/actions into which the random factor is incorporated, thereby obtaining the execution results. The ability value is successively updated according to the execution result of the speech content every time the speech is executed. The speech may be executed, for example, upon each lapse of a specified time unit of, e.g. one week in a time axis of the game. The successful growth is judged if the ability value of the main character is equal to or above the specified level after the speeches/actions are executed a specified number of times.

More specifically, the enthusiasm parameter which is set to be a positive value corresponding to each training-related speech while being a negative value corresponding to any other speech is stored in the enthusiasm parameter storage means. Every time the speech is executed, the enthusiasm parameter adding means adds the corresponding set value to the enthusiasm parameter presently given to the main character. Further, the reliability degree calculating means calculates a reliability degree between the main character and the leader character based on the execution result of the speech and the enthusiasm parameter value at that time. The judgment as to a successful growth is made based on the growth success condition, i.e. whether the reliability given to the main character is equal to or above the specified level, after the speeches/actions are executed the specified number of times.

A second aspect of the present invention is directed to a character growth control method for a video game in which an ability value of a main character is successively updated every time the speech/action is executed by successively executing various contents of speeches/actions of a leader character to be given to the main character as an ability growth object and relating at least to training and a random factor according to the consecutive operation of an operation unit, and causing the main character to perform the contents of speeches and actions into which the random factor is incorporated, said method comprising the steps of:

storing an enthusiasm parameter which is set to be a positive value corresponding to each training-related speech/action while being a negative value corresponding to any other speech/action is stored;

adding a corresponding set value to a present enthusiasm parameter presently given to the main character every time the speech/action is executed, calculating a reliability degree between the main character and the leader character based on an execution result of the speech/action and the enthusiasm parameter value at that time, and judging a successful growth based on conditions if the ability value of the main character is equal to or above a specified level after the speeches/actions are executed a specified number of times and if the reliability degree given to the main character at the time of the judgment is equal to or above the specified level.

A third aspect of the present invention is directed to a readable storage medium for storing a character growth program of a video game in which an ability value of a main character is successively updated every time the speech/action is executed by successively executing various contents of speeches/actions of a leader character to be given to the main character as an ability growth object relating at least to the training and a random factor according to the successive operation of an operation unit, and causing the main character to perform the contents of speeches/actions into which the random factor is incorporated, wherein an enthusiasm parameter which is set to be a positive value corresponding to each training-related speech/action while being a negative value corresponding to any other speech/action is stored; a corresponding set value is added to a present enthusiasm parameter presently given to the main character every time the speech/action is executed, a reliability degree between the main character and the leader character is calculated based on an execution result of the speech/action and the enthusiasm parameter value at that time, and a successful growth is judged based on conditions if the ability value of the main character is equal to or above a specified level after the speeches/actions are executed a specified number of times and if the reliability degree given to the main character at the time of the judgment is equal to or above the specified level.

These and other objects, features and advantages of the present invention will become more apparent upon a reading of the following detailed description and accompanying drawings.

BRIEF DESCRIPTION OF THE DRAWINGS

FIG. 58 is a diagram showing a "Game Over" screen.

DETAILED DESCRIPTION OF THE PREFERRED EMBODIMENTS OF THE INVENTION

Figure 1:
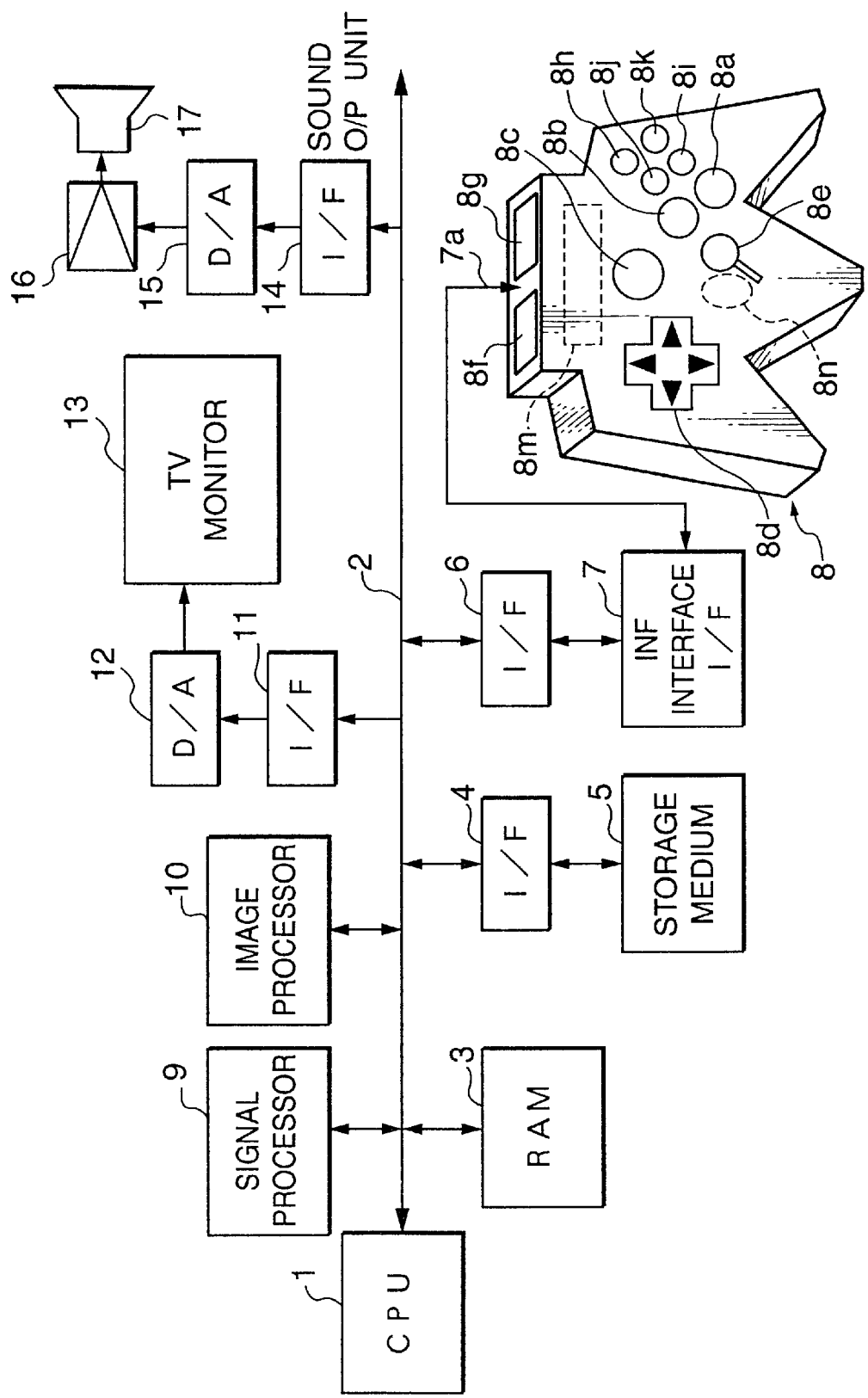
FIG. 1 is a construction diagram illustrating a video game device according to one embodiment of the invention.

FIG. 1 is a construction diagram illustrating a video game device according to one embodiment of the invention.

A video game device shown in FIG. 1 is comprised of a main game unit, a television (TV) monitor 13 for outputting images of a game, a pre-main amplifier 16 for outputting sounds of the game, a loudspeaker 17, and a storage medium 5 for storing a game data including image data, sound data and a program data. The storage medium 5 is, for example, a so-called ROM cassette in which a ROM or the like storing the game data, a program data of an operating system is contained in a plastic casing, an optical disk, or a flexible disk. The storage medium 5 may, of course, be directly mounted on a game circuit board.

The main game unit is constructed by connecting a bus 2 comprised of addresses, data and a controller bus to a CPU 1, connecting a RAM 3, interface circuits 4 and 6, a signal processor 9, an image processor 10, and interface circuits 11 and 14 to the bus 2, respectively, connecting a controller 8 to the interface circuit 6 via an operational information interface circuit 7, and connecting a digital-to-analog (D/A) converter 15 to the interface circuit 14.

This game device has different modes depending upon its application. More specifically, if the game device is constructed to be used at home, the TV monitor 13, the pre-main amplifier 16 and the loudspeaker 17 are separate from the main game unit. If the game device is constructed to be used on a commercial basis, all the parts shown in FIG. 1 are accommodated as a unit in a signal container. Further, if the game device is constructed by a system using a personal computer or a work station as a core, the TV monitor 13 corresponds to a display of the computer; the image processor 10 corresponds a part of the game program data stored in the storage medium 5 or a hardware on an extension board mounted on an extension slot of the computer; and the interface circuits 4, 6, 11, 14, the D/A converter 12, 15 and the operational information interface circuit 7 correspond to the hardware on the extension board mounted on the extension slot of the computer. Further, the RAM 3 corresponds to a main memory of the computer or the respective areas of an extension memory. In this embodiment, an example in which the game device is constructed to be used at home is described.

Next, the respective parts shown in FIG. 1 are described in more detail. The signal processor 9 is mainly adapted for the eye position calculation (the height, orientation and zooming of a camera as described later in this embodiment), the calculation of the eye position in a three-dimensional (3D) space, the calculation to transform a position in the 3D space into the one in a simulated 3D space, the light source calculation, and the generation and processing of sound data.

The image processor 10 is adapted to write an image data in the RAM 3 in accordance with the calculation result of the signal processor 9: for example, to write (paste) a texture data in an area of the RAM 3 designated by a polygon.

The operation unit 8 as a controller includes an A-button 8a, a B-button 8b, a start button 8c, a cross key 8d, a stick-shaped controller 8e, a left trigger button 8f, a right trigger button 8g, a C1-button 8h, a C2-button 8i, a C3-button 8j, a C4-button 8k, a connector 8m, a back (rear) trigger button 8n. A memory or the like for temporarily storing, e.g. the progress of the game is detachably mountable on the connector 8m. The stick-shaped controller 8e is operable not only to up, down left and right, but in any direction of 360°, and has substantially the same functions as a joystick. It should be noted that the C1-button 8i, C2-button 8i, C3-button 8j and C4-button 8k are collectively called C-buttons.

The functions of the respective buttons are described each time they come up in the description. In the present invention, the cross key 8d and the A-button 8a are mainly used for the designation of positions and for the confirmation, respectively. By operating these buttons, a variety of menus and contents of speeches/actions displayed on the monitor 3 and described later are selected, and instructions are given to move the main character to front, back, left and right during a game and to cause him to perform various gaming movements such as kicking and dribbling of a soccer ball (in the case that the game is a soccer game).

Next, a general operation of the video game device shown in FIG. 1 is described.

A power switch (not shown) is turned on to apply a power to the game device. At this time, the CPU 1 reads image data, sound data and game program data from the storage medium 5 in accordance with an operating system stored in the storage medium 5. A part or all of the read image data, sound data and game program data are stored in the RAM 3. Thereafter, the CPU 1 progresses a game based on the game program and data (image data such as polygons and textures of objects to be displayed including character images, and sound data) stored in the RAM 3 and contents of instructions given from a game player via the operation unit 8. In other words, the CPU 1 suitably generates commands as tasks to output images and sounds based on the contents of instructions given from the game player via the operation unit 8. The signal processor 9 performs the eye position calculation, the calculation of positions of characters in the 3D space (the same applies to the two-dimensional (2D) space) corresponding to the eye position, the light source calculation, the sound data generation and processing.

Subsequently, the image processor 10 writes an image data to be displayed in a display area of the RAM 3. The image data written in the display area of the RAM 3 is fed to the D/A converter 12 via the interface circuit 11, where it is converted into an analog video signal and then fed to the TV monitor 13 to be displayed on its display surface as an image. On the other hand, the sound data outputted from the signal processor 9 is fed to the D/A converter 15 via the interface circuit 14, where it is converted into an analog sound signal and then outputted as sounds from the loudspeaker 17 via the pre-main amplifier 16.

Imaging commands include an imaging command to form a 3D image using polygons and an imaging command to form a usual 2D image. Here, polygons are polygonal 2D images. In this embodiment, triangular or rectangular 2D images are used as polygons.

The imaging command to form a 3D image using the polygons is comprised of polygon apex address data read from the storage medium 5 and stored in the RAM 3, texture address data representing stored positions of texture data to be pasted to the polygons in a buffer 11, color palette address data representing stored positions of color palette data indicating the colors of the texture data in the RAM 3, and luminance data representing the luminance of the textures.

Among these data, the polygon apex address data are obtained as follows. The image processor 10 applies a coordinate transformation to the polygon apex coordinate data in the 3D space from the CPU 1 based on a movement amount data and a rotation amount data of the video screen itself, thereby replacing them by polygon apex coordinate data in the 2D space. The image processor 10 writes the texture data corresponding to a range of the display area of the RAM 3 represented by three or four polygon apex address data.

One object is constructed by a multitude of polygons. The CPU 1 causes the coordinate data of the respective polygons in the 3D space to be stored in the RAM 3. In the case that a player as a character on the video screen is moved by operating the operation unit 8, i.e. a movement of the player himself is expressed or a position of viewing the player (eye position) is changed, following processing is performed.

Specifically, the CPU 1 successively calculates the 3D coordinate data of the respective polygons after movement and rotation based on the 3D coordinate data of the apiece of the respective polygons stored in the RAM 3, and the movement amount data and rotation amount data of the respective polygons. Out of the 3D coordinate data of the respective polygons thus obtained, the coordinate data in horizontal and vertical directions are given to the image processor 10 as the address data in the display area of the RAM 3, i.e. as the polygon apex address data. The image processor 10 writes texture data indicated by the texture address data allotted in advance in the triangular or rectangular display area of the buffer 11 indicated by the three or four polygon apex address data. In this way, objects (teammate characters including the main character and enemy characters, and a soccer ball, a field, goal nets, stands, etc. (if the game is a soccer game)) obtained by pasting the texture data to a multitude of polygons are displayed on the display surface of the monitor 13.

The imaging command to form a usual 2D image is comprised of apex address data, texture address data, color palette address data representing stored positions of color palette data indicating the colors of the texture data in the RAM 3, and luminance data representing the luminance of the textures.

Among these data, the polygon apex address data are coordinate data obtained by the image processor 10 applying a coordinate conversion to the polygon apex coordinate data in the 2D space from the CPU 1 based on a movement amount data and a rotation amount data from the CPU 1. Hereafter, the above imaging processing is mentioned in a simplified manner such as "to issue an imaging command".

The signal processor 9 causes ADPCM data read from the storage medium 5 to be stored in the RAM 3, and uses it as a sound source. The signal processor 9 reads the ADPCM data by a clock having a frequency of, e.g. 44.1 KHz and applies pitch conversion, noise addition, envelope setting, level setting, reverb addition, and the like to the ADPCM data read from the RAM 3. If the sound data read from the storage medium 5 are PCM data such as CD-DA (compact disk digital audio), they are converted into ADPCM data by the signal processor 9. Further, the PCM data are directly processed by the program data in the RAM 3. The PCM data processed in the RAM 3 are fed to the signal processor 9, where they are outputted as sounds through the loudspeaker 17 after being converted into the ADPCM data and being subjected to the aforementioned various kinds of processing.

The data in the storage medium 5 are read by a driver such as a hard disk driver, optical disk driver, flexible disk driver, silicone disk driver, or cassette medium reader. The storage medium 5 is, for example, a hard disk, optical disk, flexible disk, or semiconductor memory. The driver reads the image data, the sound data and the program data from the storage medium 5 and feeds the read data to the interface circuit 4. The interface circuit 4 applies an error correction to the reproduced data from the driver by an ECC (error correction code) and feeds the error-corrected data to the RAM 3 or the signal processor 9.

Hereafter, the video game device according to the invention is described with reference to FIGS. 2 to 58.

Figure 2:
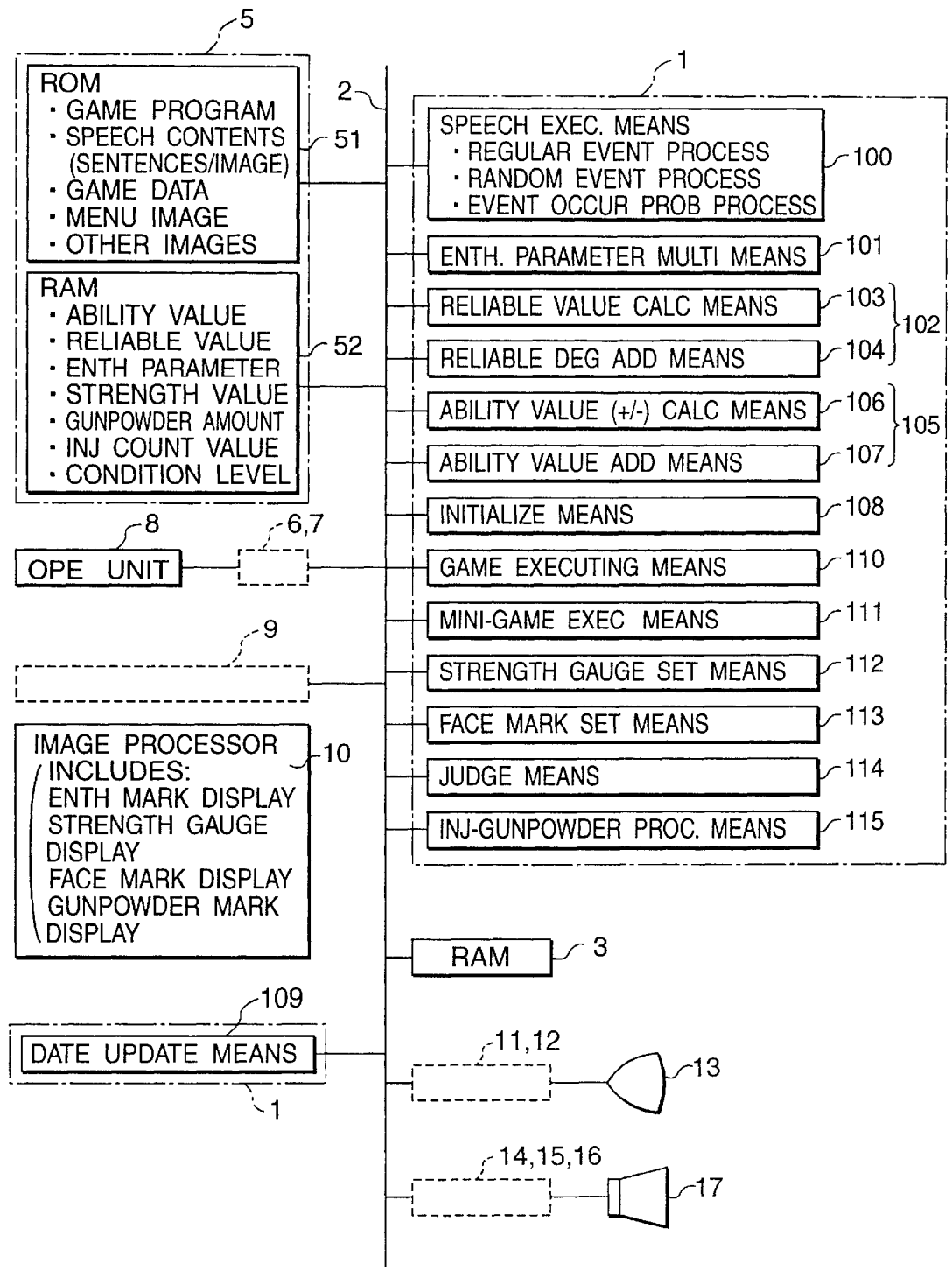
FIG. 2 is a functional construction diagram mainly showing functions of a CPU shown in FIG. 1.
Figure 3:
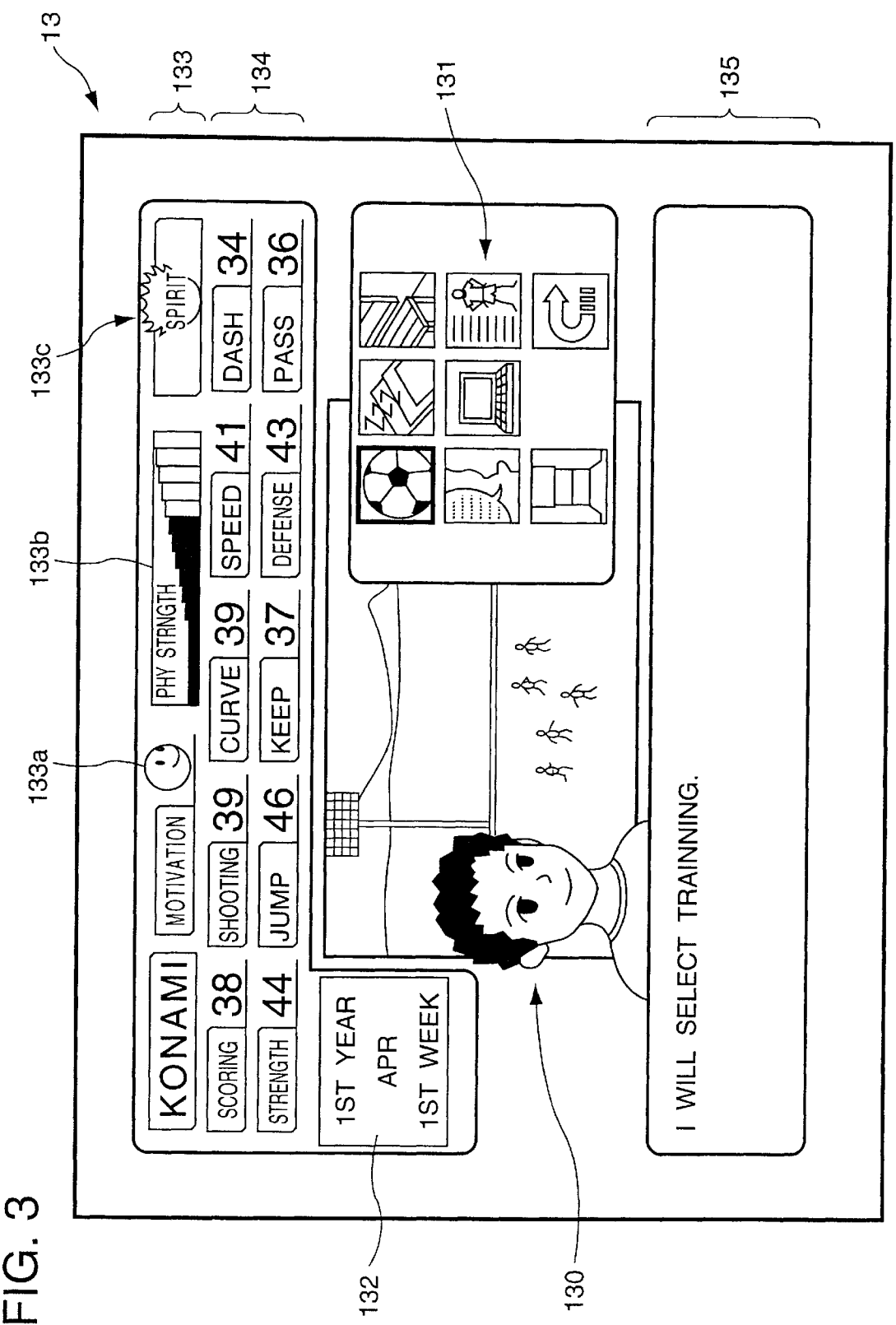
FIG. 3 is a diagram illustrating a menu selection screen as a main screen.

FIG. 2 is a functional construction diagram mainly showing the functions of the CPU 1 shown in FIG. 1, and FIG. 3 is a diagram illustrating an example of the menu selection screen as a main screen.

The video game to which the invention is applied is, for example, such that a rookie soccer player (main character) having joined a youth team of the J-league is reared and trained so as to be promoted to the first team of the same club of the J-league (or promoted from the second team to the first team depending upon the kind of the game) within a specified period on a time axis of the game.

In this soccer game, various registration screens are displayed using a registration screen display function of the CPU 1 prior to the game. For example, a game mode setting screen is displayed with icons. The modes include, for example, "J-league", "Tournament", "Tournament among National Teams" and others (e.g. "File Selection". The game player can confirm (i.e. select) the content of instruction by pushing the A-button 8a while designating the position of a desired icon by the cross key 8d (by changing a display color of the designated icon or increasing the luminance thereof) or by movably displaying a cursor and clicking it at the designated position). The video screen is switched to a screen of the confirmed game mode. Here, if, for example, the game mode "Training of Player" is designated, an initialization screen is displayed to register a player if the game is started "new". Alternatively, if the game was interrupted and the contents of the game up to the interruption was loaded, a next game screen is displayed. In the initialization, the generation of a main character is permitted as he joins the team, and his name is inputted, his face is selected from a plurality of already available faces, a name of his team is set (e.g. the name of the youth team), his position (e.g. FW (forward), MF (midfield) or DF(defender)) is set, his height and his stronger leg are inputted, and how he calls himself is selected by an initializing means 108 according to the operation contents of the operation unit 8. The input and selection results are displayed in corresponding positions of the initialization screen of the monitor 3. Upon the enrollment of the main character, a "scoring ability" of the main character as a rookie, "shooting ability", "curving ability" to curve the shot ball, "speed", "dashing ability", "physical strength", "jumping ability", "ball-keeping ability", "defense ability" and "passing ability" are set at random or fixed numerical values (of 1 to 99) and displayed. Further, a time information is set at the first week, April of the first year and displayed.

When the interrupted game is resumed using the game data loaded immediately before the game was interrupted, it can be started by selecting the "File Selection" after selecting the aforementioned "Training of Player" in the game mode selection. Time passes by the week in the game by selecting various speeches/actions and practicing then accordingly by the week. The ability values, reliability degree, enthusiasm parameter value, etc. of the main character increase and decrease as described later according to the execution results of the selected speeches/actions. According to a basic flow of the game, the game is over after a judgment as to whether the main character can be promoted to the first team of the club of the J-league is made upon the lapse of a predetermined period, e.g. two and half years in the time axis of the game.

In FIG. 2, the storage medium 5 is provided with a ROM 51 and a backup battery RAM 52 which is a built-in battery. The ROM 51 has a memory area in which game programs (including a playing game and a mini-game to be described later) necessary to execute this game, the main character's speeches (sentences representing the contents of what he speaks (see FIG. 3, etc.), images of the main character, manager character as a leader of the main character, two coach characters, teammate characters and other characters (see FIG. 6) who appear if necessary, the menu screen, the respective basic screens while the speeches/actions are conducted, background screens and the like are stored, and another memory area in which various game data necessary to progress this game are stored. The RAM 52 is provided with a memory area in which various contents of the ability values, reliability degree, enthusiasm parameter value, physical strength value, gunpowder amount, injury count value and motivation degree are renewably loaded and another memory area in which the result of the mini-game is stored.

In addition to the imaging processing described above, i.e. all the image display processing in this game, the image processor 10 applies an imaging processing to an "enthusiasm mark" representing the main character's dedication to soccer, a "physical strength gauge" representing the main character's physical strength, a "face mark" showing a motivation degree in a distinguishable and simulated manner, and a "bomb mark" showing a physical trouble in a body part such as a waist or leg based on the numerical data sent from the CPU 1 in real time.

FIG. 3 is a diagram illustrating a menu screen as a main screen of this game. In the menu screen, a field is simulated in the middle of the screen of the monitor 13 and a face image 130 of the main character is superimposed in a specified position at the left side of the field. An icon display area 131 where icons representing selectable commands are arrayed in matrix as in a list is set at the right side of the field. A date display area 132 where a lapse of time from the enrollment of the main character as a time information of the game is displayed in date, month, year is set at the left end of a central part. Further, a mark display area 133 where a part of the individual data of the main character: name, "face mark", "physical strength gauge", "enthusiasm mark" are displayed in a horizontal line is set in an upper part of the screen, and an ability value display area 134 where various ability values are displayed is set immediately below the mark display area 133.

In the mark display area 133, a face mark 133a, a physical strength gauge 133b and an enthusiasm mark 133c are displayed from the left. The face mark 133a shows an expression by the eyes and mouth in a circle or a circular mark. The enthusiasm mark 133c is expressed by a Chinese character "soul" and a flame mark, preferably in color.

A speech progress guide display area 135 which appears in relation to the speech of the main character to display sentences so as to guide a progress of the contents of the speeches/actions is set in the lower half of the screen. There are cases where sentences are displayed as a guide in a multiple-choice format according to the contents of the speech or the progress thereof. In this case, a desired sentence is selected by the operation unit 8.

Figure 15:
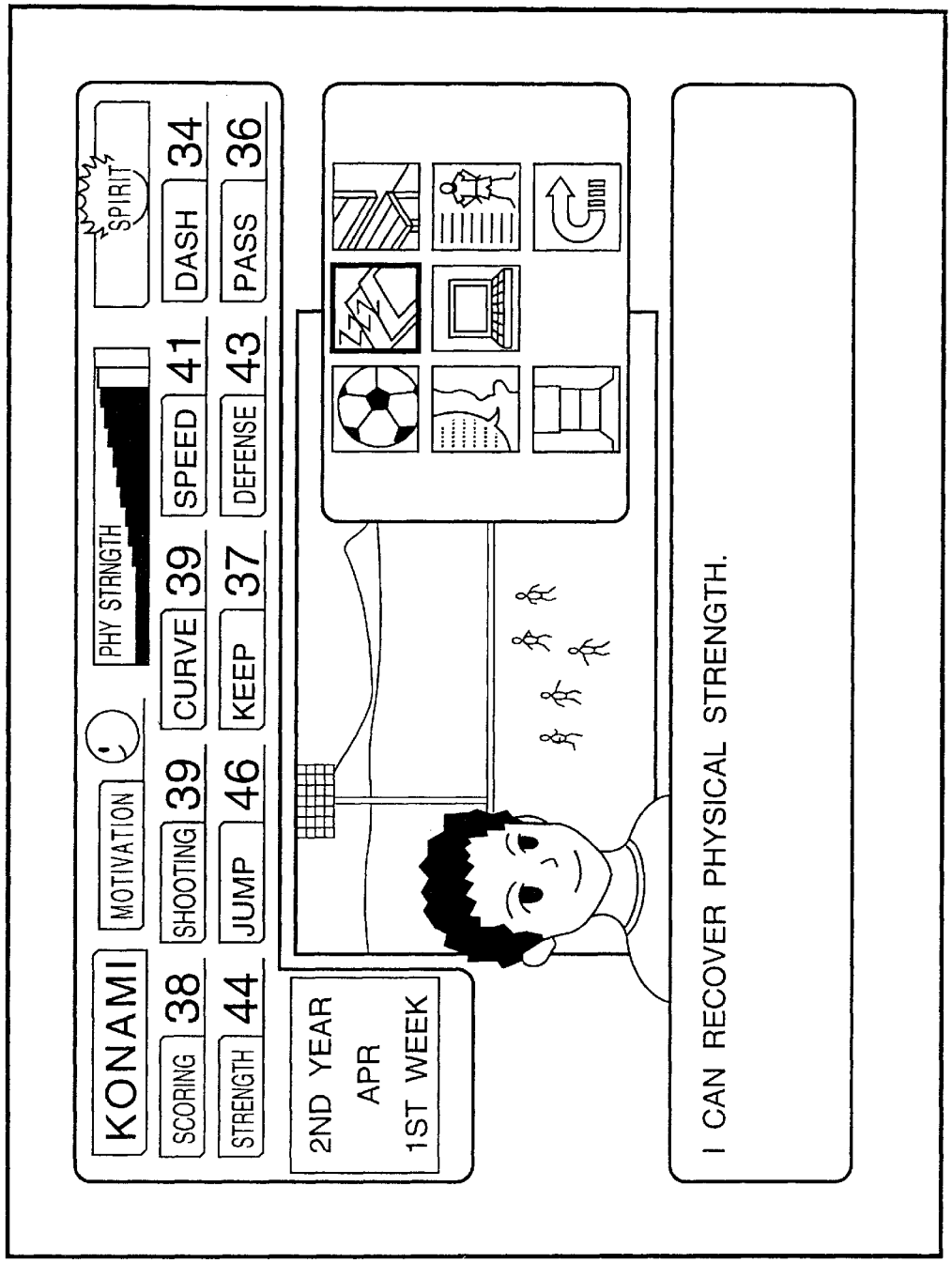
FIG. 15 is a diagram illustrating a screen when "Rest" is selected.
Figure 16:
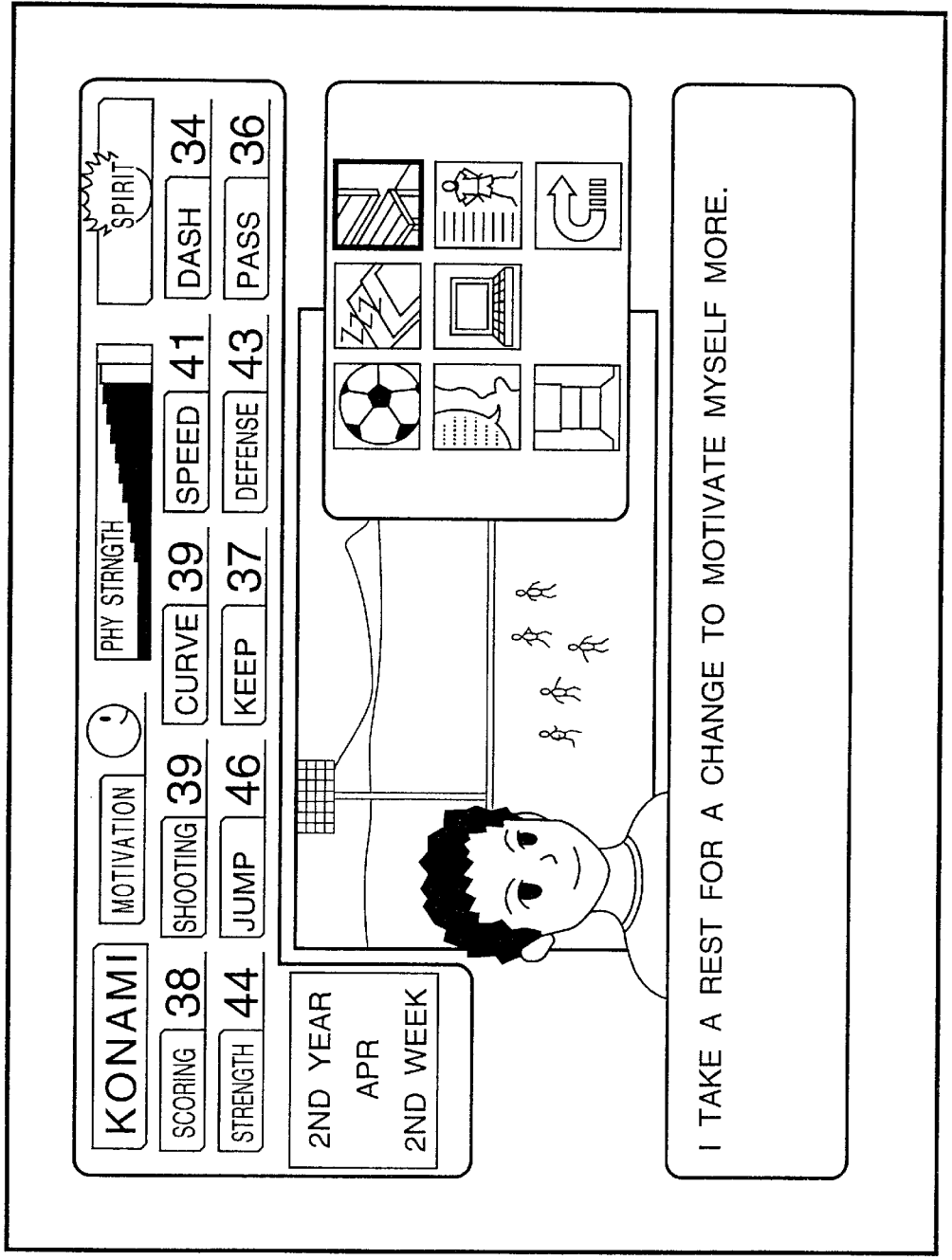
FIG. 16 is a diagram illustrating a screen when "Play" is selected.

The respective icons in the icon area 131 represent commands "Training", "Rest", "Play", "Speak", "Own Evaluation", "Individual Status", "Option" and "Next Page" from upper left to lower right. Out of these commands, "Training", "Rest", "Play", "Speak" are prepared as speech commands. When these commands are selected, one week passes and specified processing is performed by a speech executing means 100 to be described later. In FIG. 3, "Training" (although unconfirmed) is instructed by the cross key 8d, a character guide "I will select training." is displayed in the lower half of the screen. If "Rest" is instructed as shown in FIG. 15, a character guide "I can recover physical strength." is displayed. Further, if "Play" is instructed as shown in FIG. 16, a character guide "I will have more motivation after a change." is displayed. Similarly, the remaining command "Speak" can also be instructed and selected. Further, other commands such as "Own Evaluation" can be similarly instructed and selected.

Although "Own Evaluation", "Individual Status" and "Option" are independent of an increase or decrease of the abilities of the main character and a passage of time, an ability table or the like is displayed so that the present ability value data of the main character can be, for example, easily confirmed when the respective commands of "Own Evaluation, "Individual Status" and "Option" are selected.

Next, the means of the CPU 1 for realizing its respective functions are described.

The speech executing means 100 reads contents corresponding to a speech selected by the operation unit 8 from "Training", "Rest", "Play", "Speak" from the RAM 3 which are transferred from the ROM 51 and stored in the RAM 3 during the game, thereby executing a speech. The execution of the speech coming up by the week include regular events which always occur upon reaching a certain point of time if specified factors are satisfied, and random events which randomly occur from a plurality of factors prepared in advance according to the selected speech in view of various factors. The speech executing means 100 executes such regular events and random events as the contents of speech.

An enthusiasm parameter calculating means 101 adds a specified value set in advance when the training-related command, i.e. "Training", "Speak with a Rival" of the "Speak" menu, and "Participate in a Game" by the recommendation of the manager to be described later are executed, and conversely subtracts a specified value when "Rest", "Play", and "Speak with a Girl" and "Speak with a Girlfriend" of the "Speak" menu are selected. In this embodiment, the enthusiasm parameter is an index of dedicated attitude to and enthusiasm for soccer and is expressed in, for example, up to maximum 256 points. If the enthusiasm parameter vale is extremely high, a benefit of tentatively increasing abilities during a game when the main character participates in a "Game" to be described later.

The enthusiasm parameter calculating means 101 outputs the calculated enthusiasm parameter value to the image processor 10. The image processor 10 color-displays the enthusiasm mark 133c with the Chinese character "Soul" and the flame mark. Further, the display color or outline color of the Chinese character "Soul" is changed in a plurality of gradations from red to blue, for example, in 256 different gradations of color in the same way as the enthusiasm parameter so as to correspond or preferably be proportional to the inputted enthusiasm parameter value, and the flame mark is displayed in five different sizes according to the enthusiasm parameter value.

A reliability degree calculating means 102 is comprised of an reliability degree addend calculating means 103 and a reliability degree adding means 104. The calculating means 103 determines a reliability degree addend according to the enthusiasm parameter value. The adding means 104 adds the determined reliability degree addend to the present reliability degree. The reliability degree is expressed, for example, in 0 to 99 points.

Here, a relationship between the enthusiasm parameter value and the reliability degree addend is described. If the enthusiasm parameter value is high, bonus points are given when the reliability degree increases, whereas less points than specified are subtracted when the reliability degree increases. More specifically, when 10 points are supposed to be added due to an occurrence of an event in the speech list, the reliability degree value is increased by 15 points including bonus points of 5 if being fairly high, for example, 250 points (equal to or above an upper threshold value Pa); it is increased by 10 points if being relatively high (Pb to Pa) although being below the upper threshold value; and it is increased by only 5 points by subtracting 5 points from the specified 10 points if being merely high (for example, 129 point=Pc to Pb).

If the enthusiasm parameter value is high, such an event as to bring about a good result is selected from a plurality of events in the processing by the speech executing means 100. For example, if the enthusiasm parameter value is equal to or above Pa, such an event as to increase "Motivation" and considerably increase "Reliability Degree" between the main character and the teammates occurs. If the enthusiasm parameter value is equal to or above Pb, such an event as to increase "Motivation" and increase "Reliability Degree" between the main character and the teammates occurs. If the enthusiasm parameter value is equal to or above Pc, such an event as to increase "Motivation" but decrease "Reliability Degree" from the teammates occurs. In an area of the ROM 51 for storing the contents of speech, such events as to act negatively and positively are selectably stored.

On the other hand, if the enthusiasm parameter value is low, less points than specified are given when the reliability degree decreases, whereas more points than specified are subtracted when the reliability degree decreases. More specifically, when 10 points are supposed to be subtracted due to an occurrence of an event in the contents of speech, the reliability degree value is decreased by 5 points including bonus points of 5 if being a little low, for example, 110 points (equal to or above an upper threshold value Pa); it is increased by 10 points if being lower (for example, 70 points=Pe to 100); and it is decreased by 15 points by adding −5 points to the specified −10 points if being even lower (for example, lower threshold value=30 points=equal to or below Pc).

If the enthusiasm parameter value considerably falls to or below the lower threshold value or to the low threshold value, the CPU 1 forcibly ends the game in the middle by executing a forcible ending function assuming that the main character's enthusiasm for soccer has fallen to an unrecoverable level.

The reliability degree is reflected on the determination of an ability value addend which is obtained by executing the speech influential to the ability value s. This is also reflected whether or not the main character will be given a chance to participate in a specified event which occurs during the execution of the contents of speech, for example, in the "Game".

An ability value renewing means 105 is comprised of an ability value addend calculating means 106 and an ability value adding means 107. In the calculating means 106, the results of execution of speeches/actions influential to changes of the ability values and ability value addends corresponding to various abilities are stored in correspondence as game data. The calculating means 106 determines ability value addends corresponding to the respective abilities in relation to the result of speech executed based on such game data. The adding means 107 adds the obtained ability value addends to the ability values presently set for the main character. The calculating means 106 reads the reliability degrees of the manager, coach and teammates on the main character from the reliability degree calculating means 104 during the calculation to use them as factors determining the ability value addends. The higher the reliability degrees, the larger ability value addends are set when the ability values are increased, and the smaller ability value addends are set when the ability values are decreased. In this case, a weighted reliability degree of those of the manager, coach and teammates on the main character may be added or only the reliability degrees of the manager and coach on the main character may be added.

The initializing means 108 causes the initialization screen of the main character to generate his individual data at the time when he joins the soccer club when this game is first started. The name of the main character is inputted, a face image is selected as his face from a plurality of faces prepared in advance, his club name (for example, a team name of the youth league, etc.) is inputted, his position such as FW, MF or DF is inputted, his height and stronger leg are inputted, and how he calls himself is selected according to the operation of the operation unit 8.

A date renewing means 109 functions as a time renewing means for advancing time in the game. Every time the speech-related menu is operated by the operation unit 8, time is advanced by one week from the first week, April of the first year till the first week, September of the third year.

A game executing means 110 randomly causes the manager character to permit the main character to participate in a "Game" when a specified condition, e.g. the reliability degree above a specified value, is satisfied, and executes processing concerning the "Game" when a game is decided. In the "Game", a field screen is displayed and a program processing is executed based on the rule con firming to a soccer game. In the "Game", the game player moves the main character by operating the various buttons and keys of the operation unit 8. As described later, a mode in which the "Game" is actually executed and a mode in which the game result is displayed in digest form without executing the "Game" are selectable (see FIG. 18).

A mini-game executing means ill executes a mini-game when "Mini-Game" is selected from the "Training" menu, and is constructed by a function realizing means shown in FIG. 31 as described later. The function realizing means is shown in detail in FIGS. 32 to 42.

A physical strength gauge setting means 112 subtracts values correspond to the respective contents of "Training" from the present physical strength value and adds values set for "Rest", "Play", "Speak" and the like to the present physical strength value, and outputs the calculated values to the image processor 10. The image processor 10 causes the physical strength gauge 133b in which a horizontal axis is gauged by 0 to 100 scales to be displayed, and makes the remaining physical strength visible to the player by displaying a gauge range from value 0 to the present physical strength value in relatively high luminance.

A face mark setting means 113 calculates a "Motivation Index" set in conformity with "Rest", "Play", "Speak" and the like in real time. The calculated "Motivation Index" is outputted to the image processor 10. The image processor 10 suitably changes the states of the eyes and mouth of the face mark 133a so as to correspond to the inputted "Motivation Index" and further changes the display color of the circle mark if necessary, thereby making the present degree of the main character's "Motivation" visible to the player by replacing it by the facial expression of the face mark 133b.

A judging means 114 operates in the first week, September of the third year to judge whether the main character can be promoted to the first team of the same club of the J-league. Determination factors include (1) whether the main character has ability values necessary for the set position, (2) whether the reliability degree of the manager on him is high, i.e. whether the reliability degree of the manager character is equal to or above a specified value (e.g. 200 points) (if necessary, it may be added as a condition that the reliability degrees of both Kitoh coach and Ohbayashi coach are equal to or above 120 points. Since the promotion conditions are stricter in this case, more difficult games can be provided), (3) whether the main character has already participated in one "game" regardless of whether the team has won or not. If all conditions were satisfied, the judging means 114 judges a "successful growth" and promotes the main character to the first team of the same club of the J-league. Unless otherwise, the judging means 114 judges a "growth failure" and causes the "game over" processing to be performed. Since whether the main character has been successfully reared is evaluated also with reference to the reliability degree of the manager and others on him in this way, the growth evaluation can be made in a more realistic manner.

The ability values of the main character may be evaluated by comparing the respective ability values. However, an evaluation based only on the ability-items set for each position is more preferable since such an evaluation conforms to an actual practice. For example, a center forward" may be evaluated based on his "scoring ability", "shooting ability", "speed", "dashing ability", "physical strength", "jumping ability" and "ball-keeping ability", whereas a goalkeeper may be evaluated based on his "goal saving ability", "goal-kick ability", "dashing ability" and "jumping ability". For other positions, the player's abilities may be evaluated by comparing them with the ability items regarded as important. Alternatively, the positions may be divided into "goalkeeper" and other positions.

An injury/bomb processing means 115 counts the number of "injuries" occurred to the main character and sets and displays an amount of gunpowder set according to the content of injury as a "bomb mark". The processing means 115 is described in detail with reference to FIGS. 43 and 56 to 58.

Next, a game operation of the video game device thus constructed is described in accordance with a flowchart while referring to FIGS. 3 to 27 showing the game screen.

Figure 28:
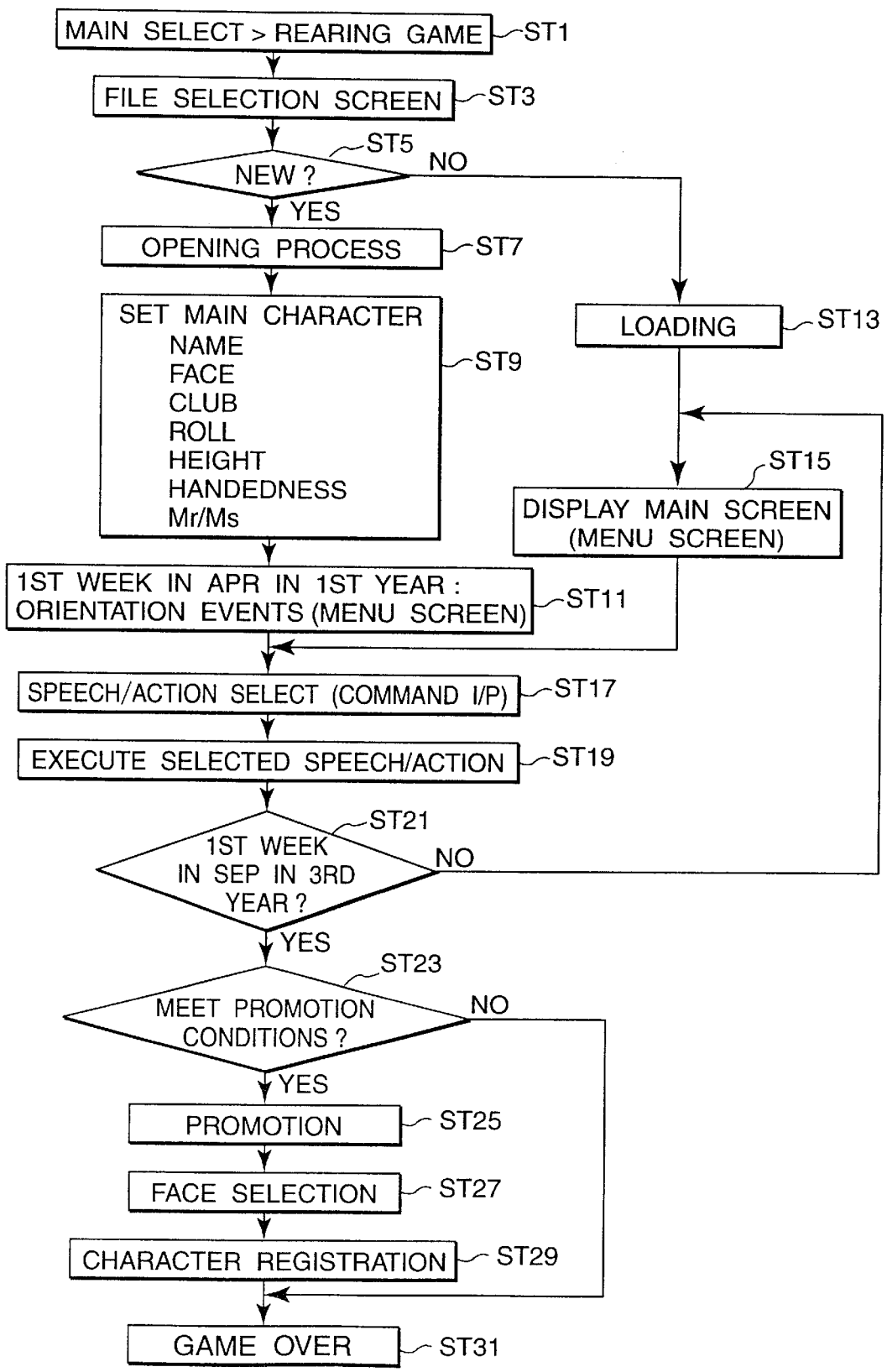
FIG. 28 is a flowchart illustrating an entire flow of a game performed by the video game device.

FIG. 28 is a flowchart showing an entire flow of this game.

First, when an unillustrated power supply is turned on to activate the game device, a specified main selection menu is displayed (Step ST1). If "Rearing Game" is selected at this stage, a specified "File Selection Screen" is displayed (step ST3) to guide whether this game is new or not (Step ST5).

If this game is played for the first time or the contents of the previous game were not loaded" (not saved as data in the RAM 52), a specified "opening" screen which creates a soccer game atmosphere is displayed with sound effects by selecting "New" (Step ST7), and the setting and input of the individual data of the main character are permitted (Step ST9). Upon the completion of input of the individual data, the game is started and the date is first set to "the first week, April of the first year" (Step ST11).

On the other hand, if there is the loaded data, the data of the game loaded immediately before the game was interrupted are transferred from the RAM 52 to the RAM 3 by selecting a guide "Not New" (Step ST13). Consequently, the main screen ("Training" is not instructed yet) as shown in FIG. 3 is displayed on the monitor 13 (Step ST15).

Subsequently, speech selection is selected from the icon display area 131 by the operation unit 8 (Step ST17), and the speech executing means 100 executes the contents of the selected speech and issues a command to the date renewing means 109 to advance the date by one week (Step ST19). Whether the date has reached a point of time when the growth results are evaluated is judged (Step ST21). Unless the date has reached this point of time, this flow returns to Step ST15 to display the menu screen. On the other hand, if the growth result evaluation time has come, whether the growth results satisfy the promotion conditions is judged (Step ST23). If so, the growth is judged to be successful and the main character is promoted to the first team of the same club of the J-league (Step ST25). Subsequently, an arbitrary selection of a new face shot for the J-league from a plurality of those prepared in advance is permitted (Step ST27), and the main character is registered as a player newly generated for the J-league (Step ST29). When the "J-league" is selected on the main selection screen upon playing this game thereafter, the grown and promoted player is added to the members who can participate in the game.

On the other hand, if the promotion conditions are not satisfied, the game is over (Step ST31) assuming a growth failure.

Here, a subroutine "Speech Execution" in Step ST19 is described with reference to flowcharts "Usual Period" and "Season" shown in FIGS. 29 and 30.

Figure 29:
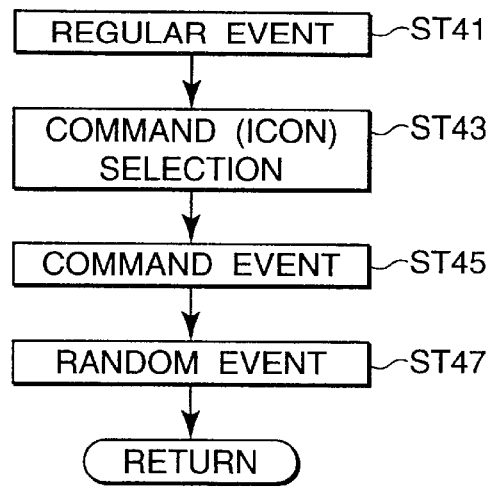
FIG. 29 is a flowchart illustrating a subroutine "Usual Period"
Figure 30:
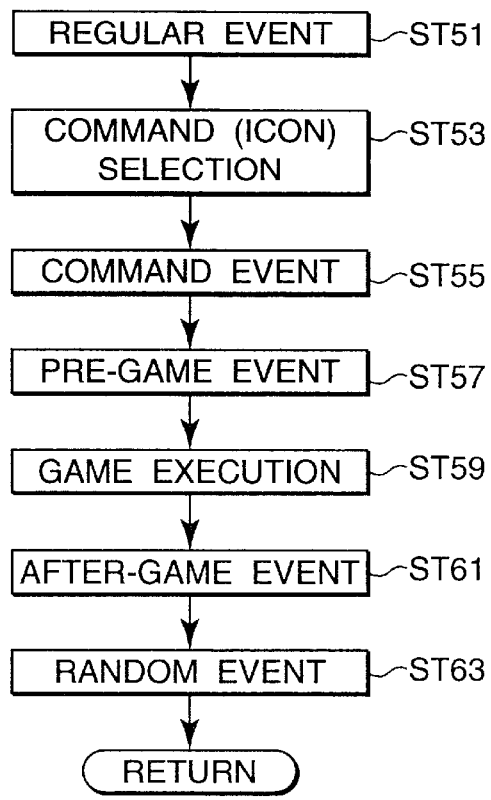
FIG. 30 is a flowchart illustrating a subroutine "Season"

In FIG. 29, upon the start of the speech execution, a "regular event" is executed (Step ST41). This "regular event" occurs at a fixed point of time and always occurs when time in the game coincides with this fixed point of time. Basically, the "regular events" are set at most of times for the respective speeches/actions. Upon the completion of this "regular event", the flow returns to the menu screen, and the date is advanced by one week by displaying, for example, a sentence "What shall I do this week" in the speech progress guide display area 135. In this state, an input of a new command is permitted (Step ST43). If a certain speech is selected, contents corresponding to this speech are executed (Step ST45), and a "random event", which can be positive or negative, randomly occurs at a certain probability (Step ST47).

Figure 4:
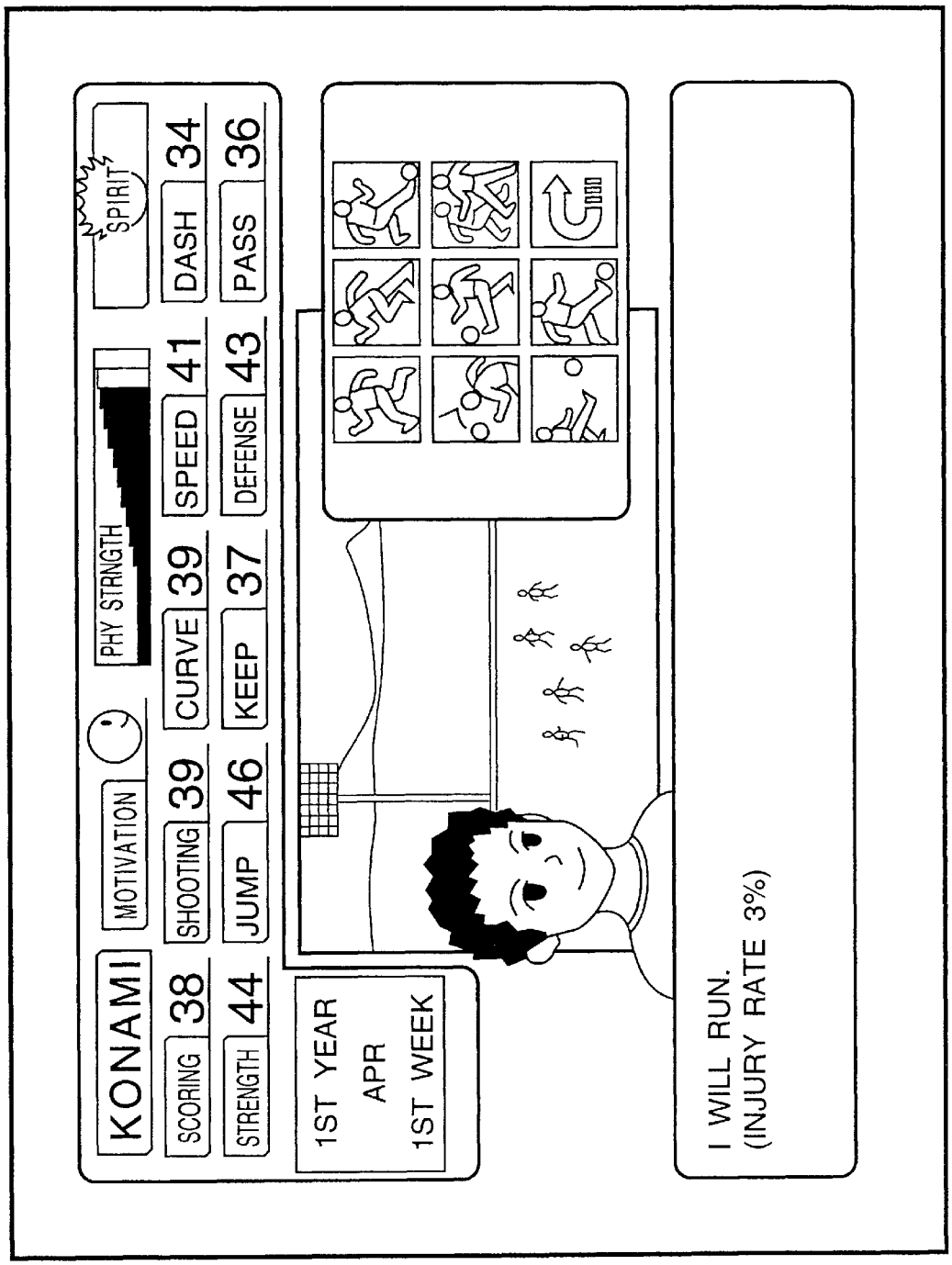
FIGS. 4 to 7 are diagrams illustrating screens when "Training" is selected.
Figure 5:
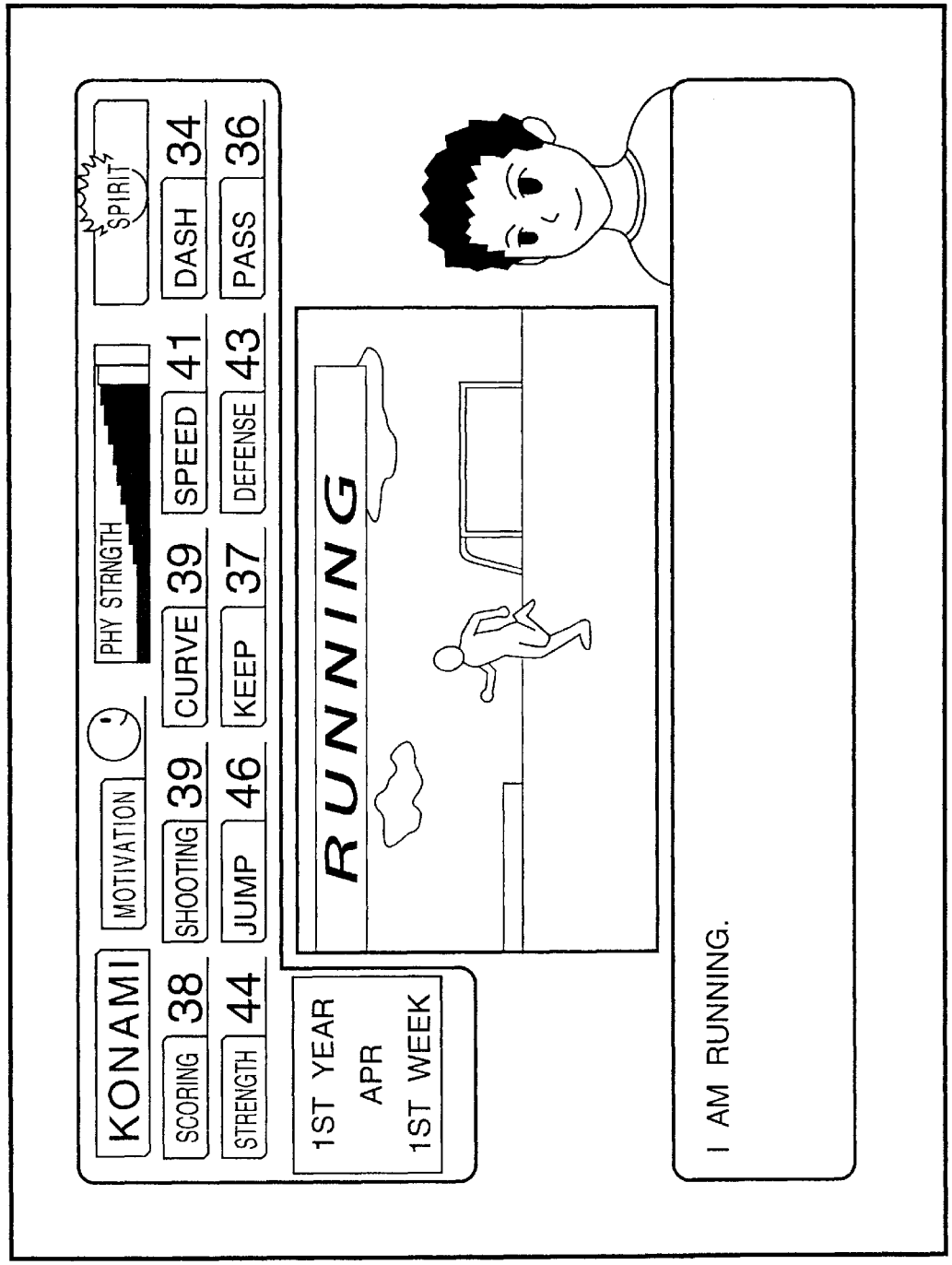
Figure 6:
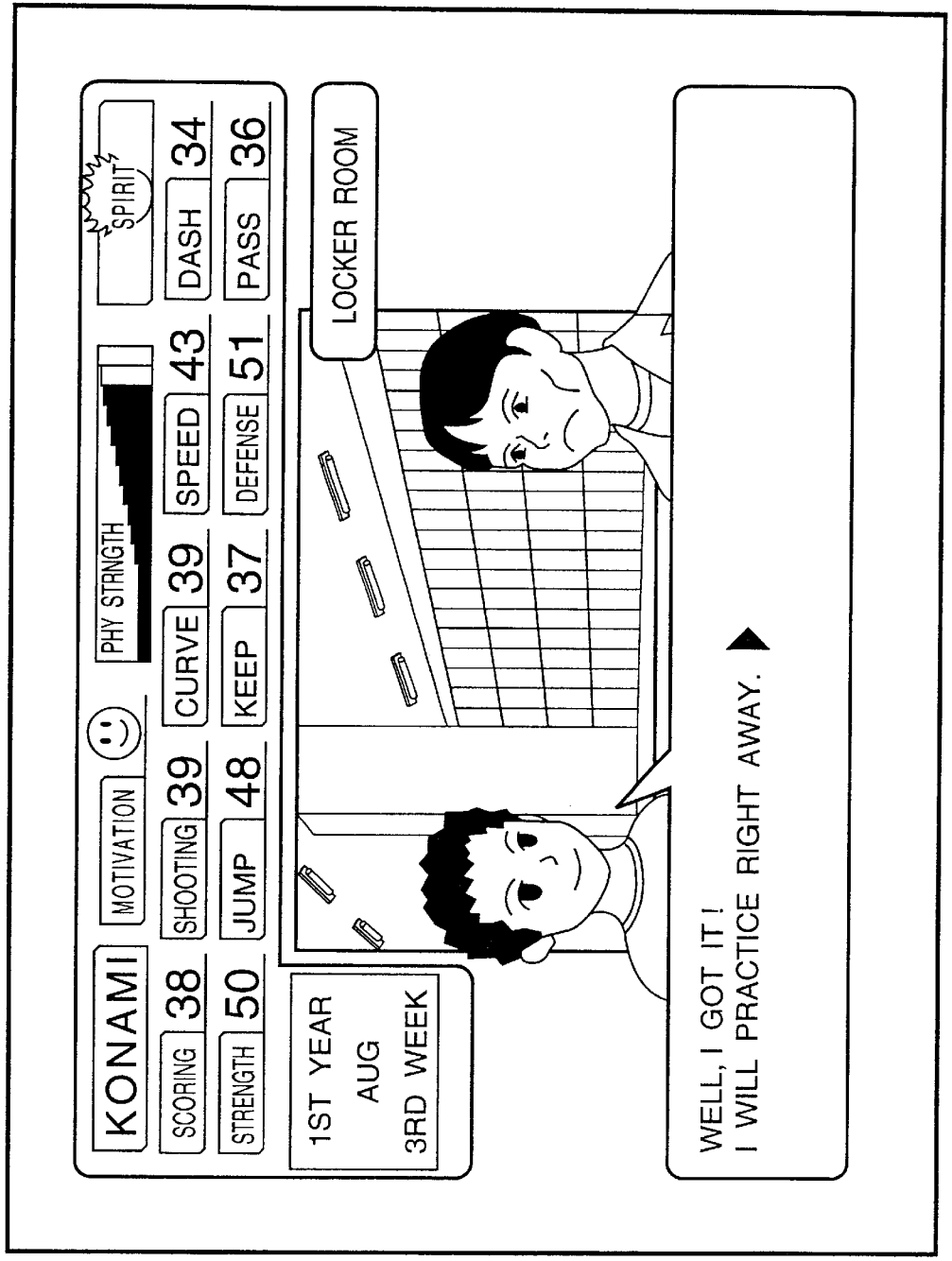
Figure 7:
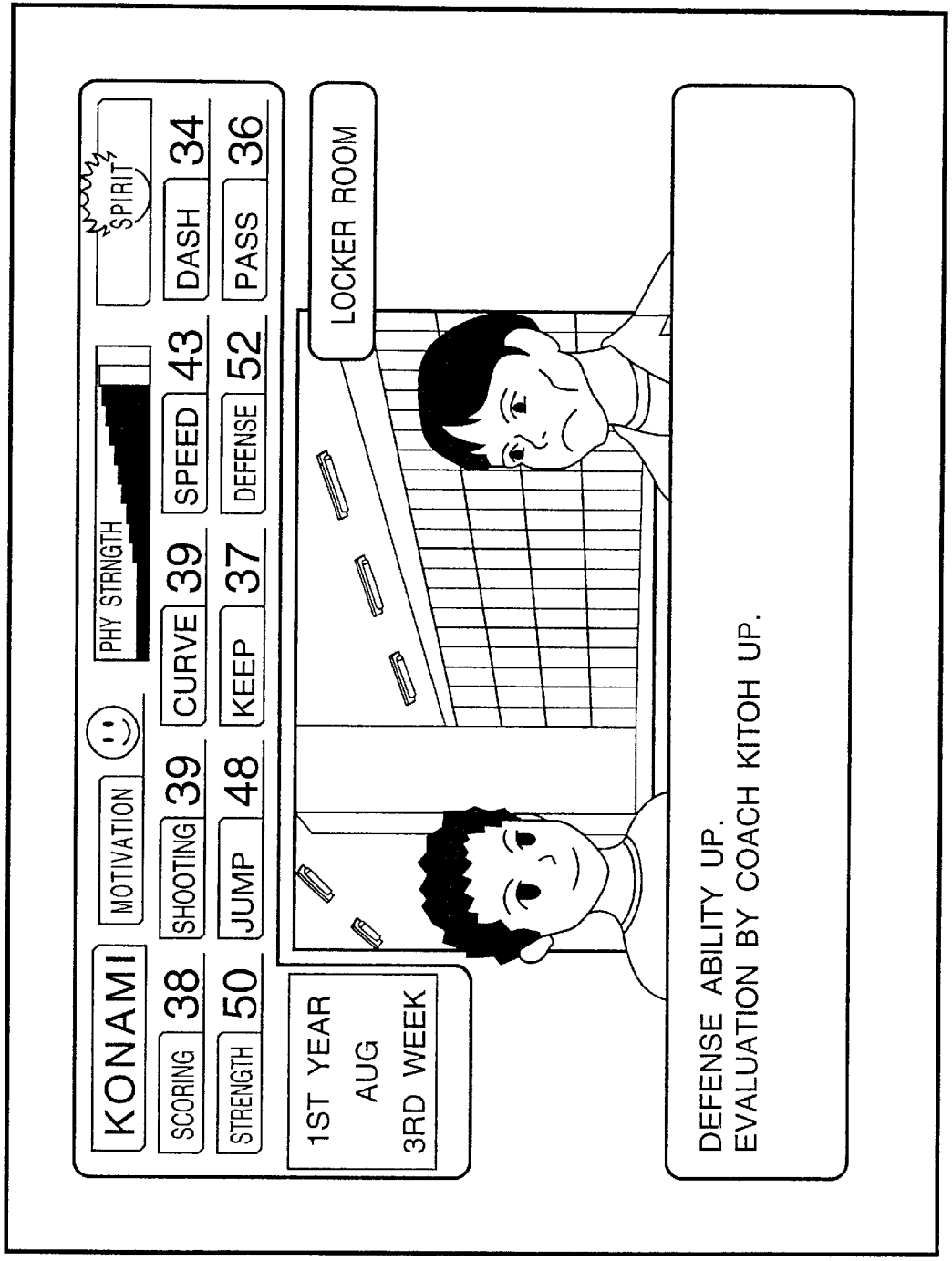

If, for example, "Training" is selected, a guide is displayed in characters as shown in FIG. 3. If "Training" is confirmed, various training menus are selectably displayed in the form of icons as shown in FIG. 4. The training menus include, for example, "Running", "Dashing", "Dribbling", and "Mini-Game (Defense Training)". If "Running" is selected, "I will run (injury rate: 3%)" is displayed in the speech progress guide display area 135 as shown in FIG. 4, and the execution of this speech is started. The speech executing means 100 calculates the "Injury Rate" in view of the main character's "Physical Strength Value", "Enthusiasm Parameter Value", "Reliability Degree", "Motivation Index", etc. at this time, such that the higher these values, the smaller a probability of occurrence of injury. Subsequently, an image in which the main character is running in the field is displayed and "I will run" is displayed in the speech progress display area 135 as shown in FIG. 5. If "Training" is selected, the main character's "Enthusiasm Parameter Value" is increased by a specified value according to the kind of the selected training. Upon the completion of "Training", the "Reliability Degrees" of the manager and coaches on the main character are calculated in accordance with the aforementioned operational expression based on the "Enthusiasm Parameter Value", and the "Ability Values" set in correspondence with the kinds of the "Training" are given based on the "Reliability Degrees". FIG. 6 shows a part of the speech contents when Kitoh coach gives the main character a training guidance, and FIG. 7 shows a case where positive results are seen in the contents in the speech progress guide display area 135 and the "Reliability Degree" of the coach on the main character and the "Ability Values" increase. In this way, increases (ability value addends) of the "Ability Values" are set in view of the "Reliability Degree (s)".

However, the speech contents are set, for example, such that "Injury Event" or negative event randomly occurs during training. In the case of an occurrence of a negative event such as "Injury Event", "Outpatient Event (event which causes the main character to go to hospital for treatment", or "Inpatient Event (event which causes the main character to be hospitalized)", the "Ability Values" and the "Reliability Degrees" of the manager and coaches remain at the present levels or are decreased.

Figure 8:
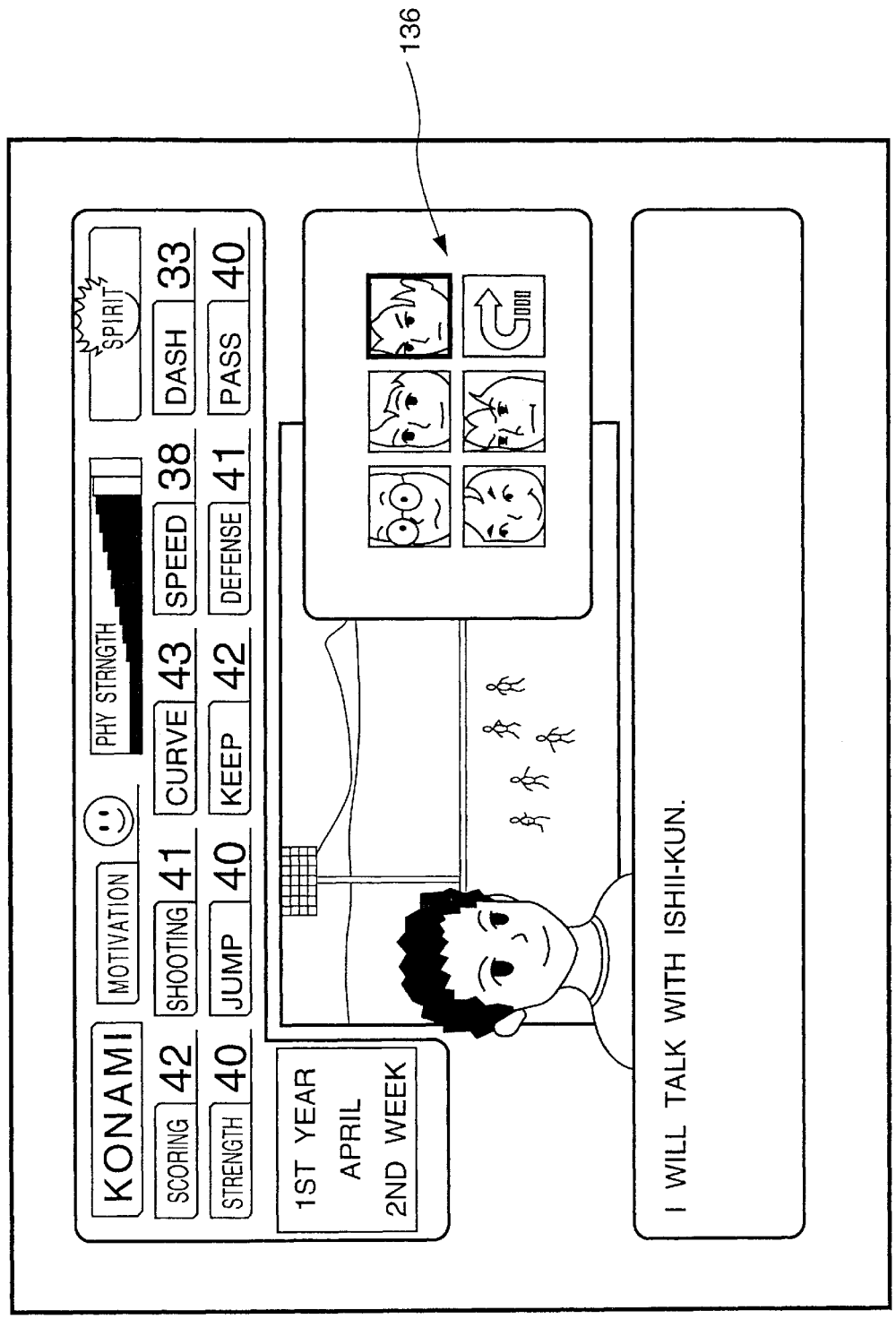
FIGS. 8 to 14 are diagrams illustrating screens when "Speak" is selected.
Figure 9:
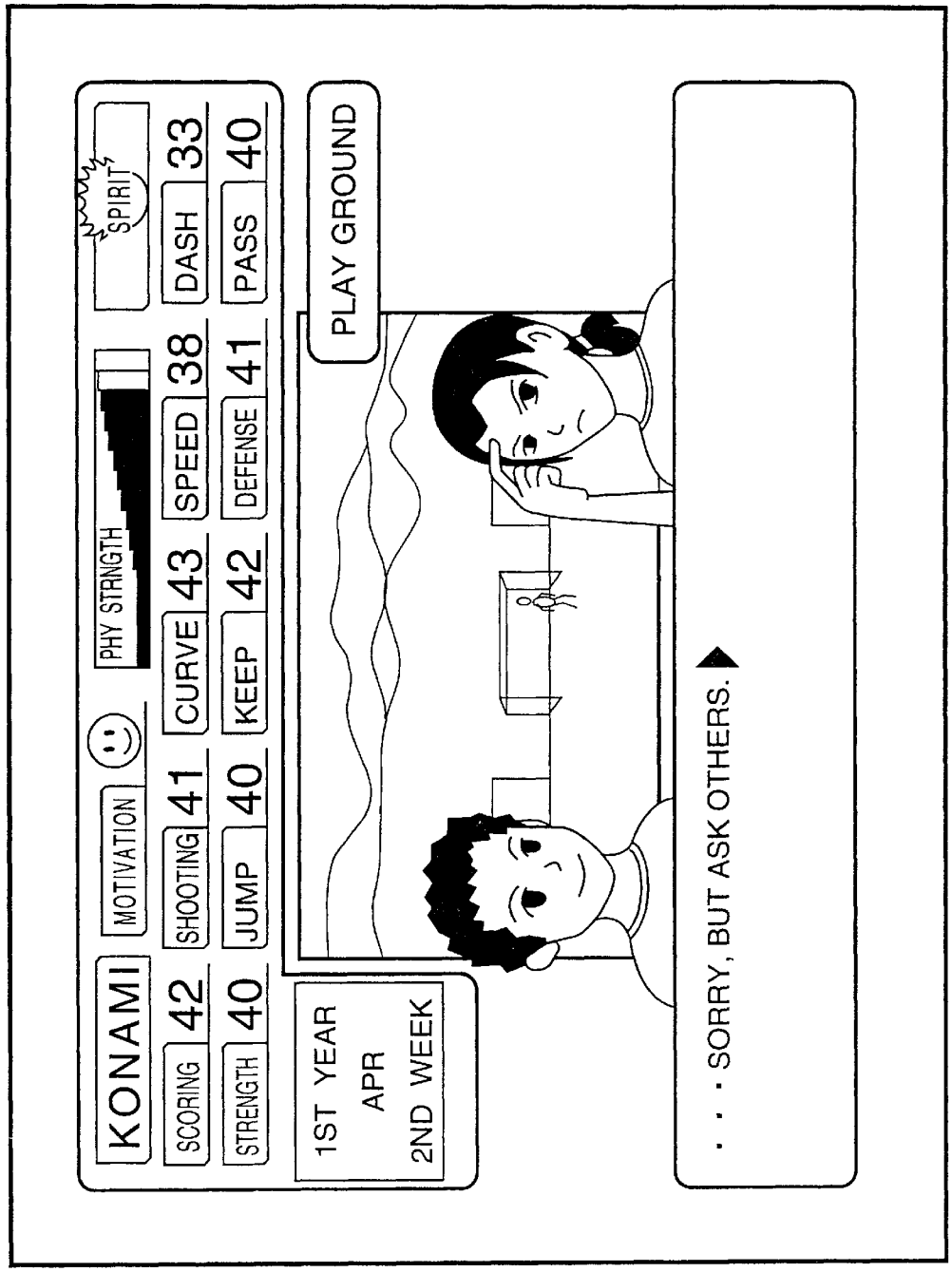
Figure 10:
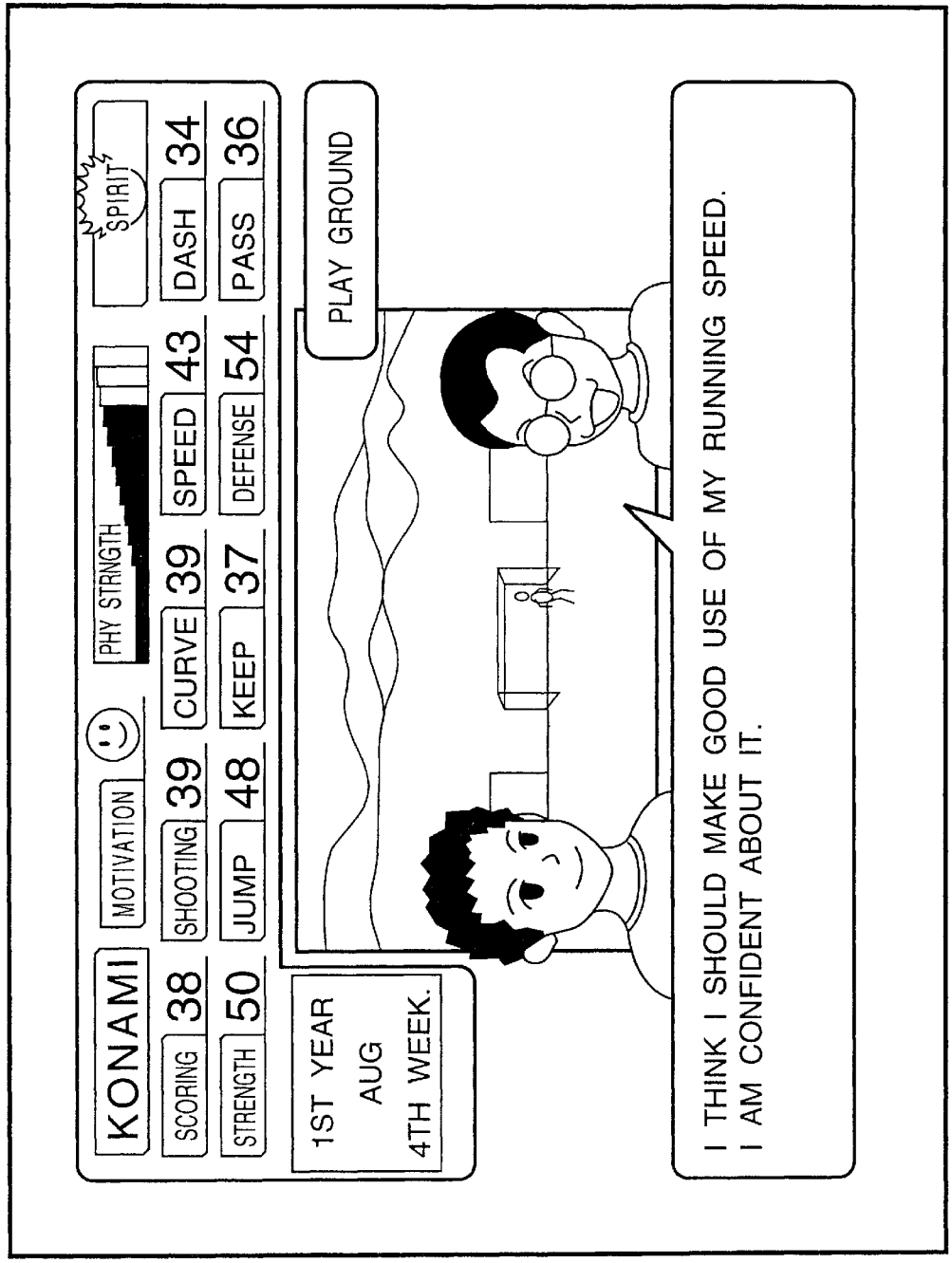
Figure 11:
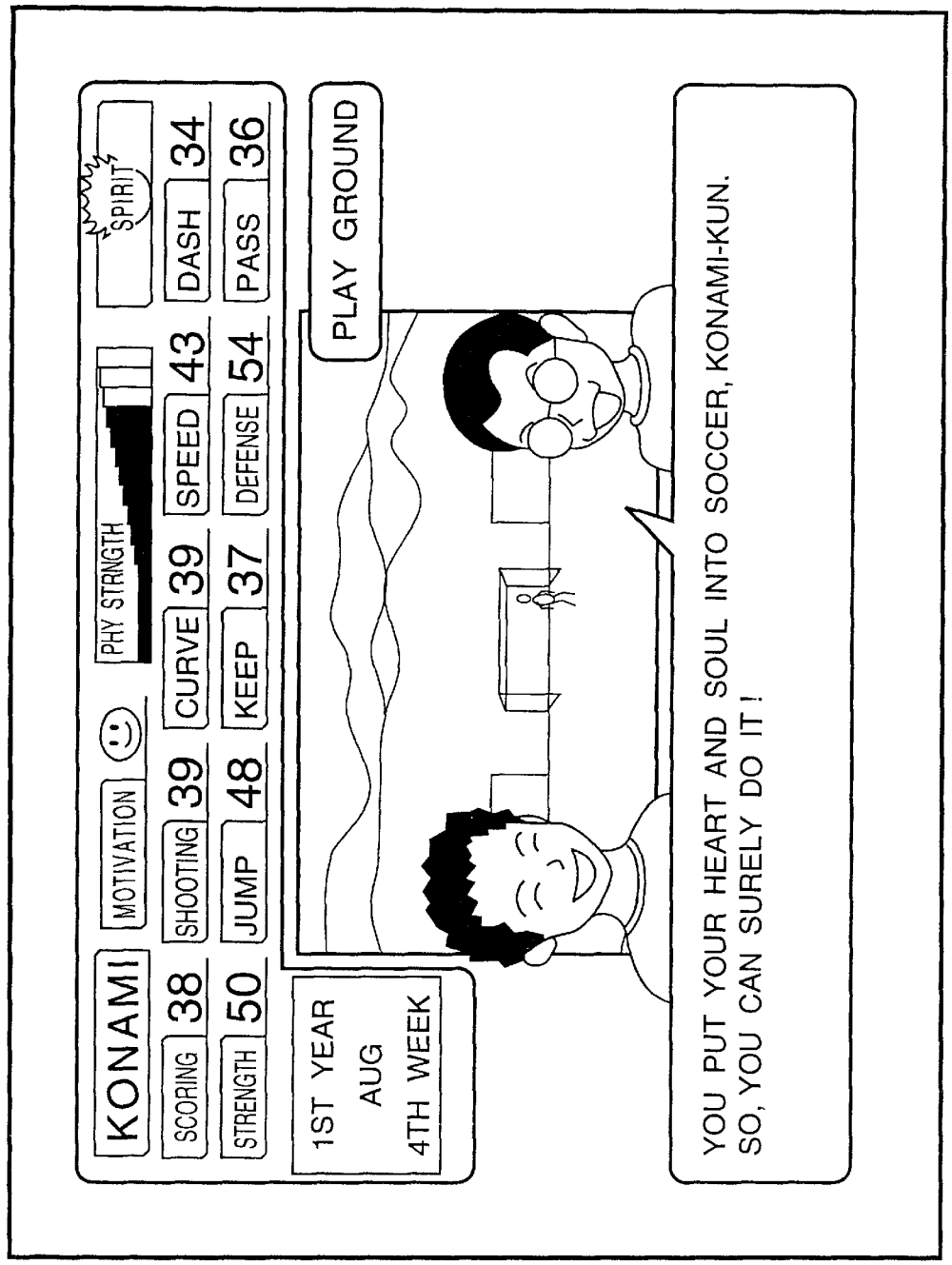
Figure 12:
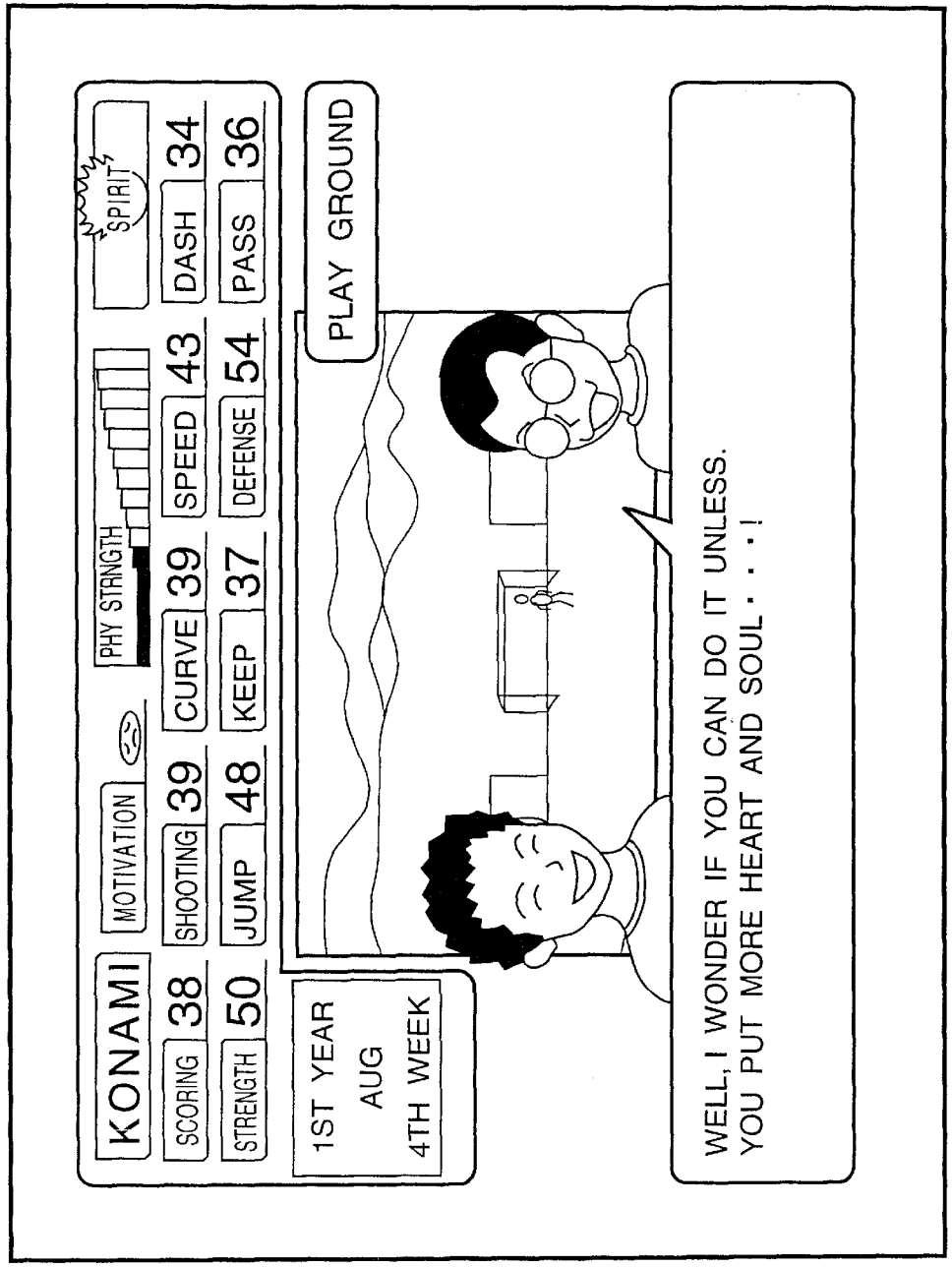
Figure 13:
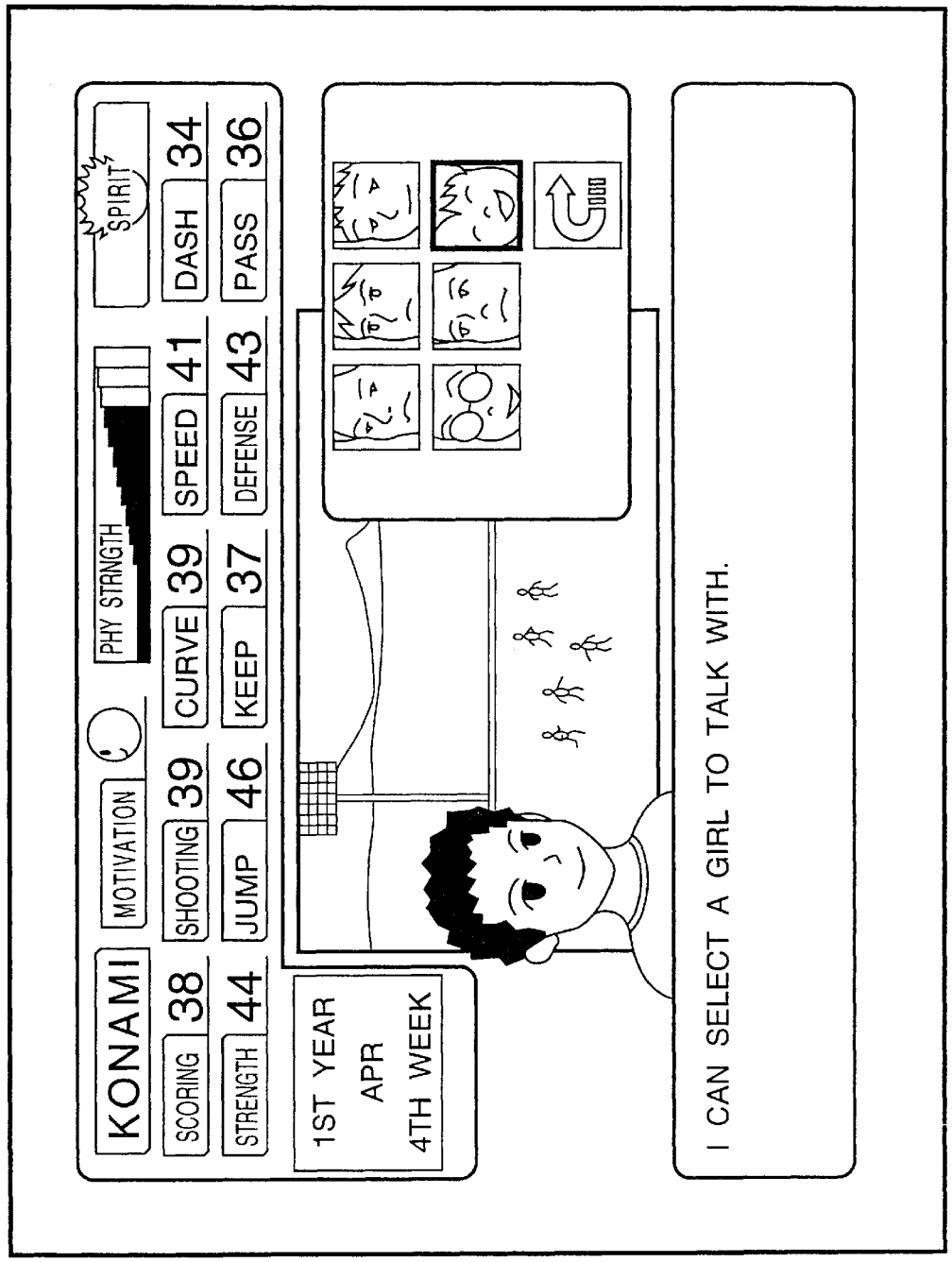
Figure 14:
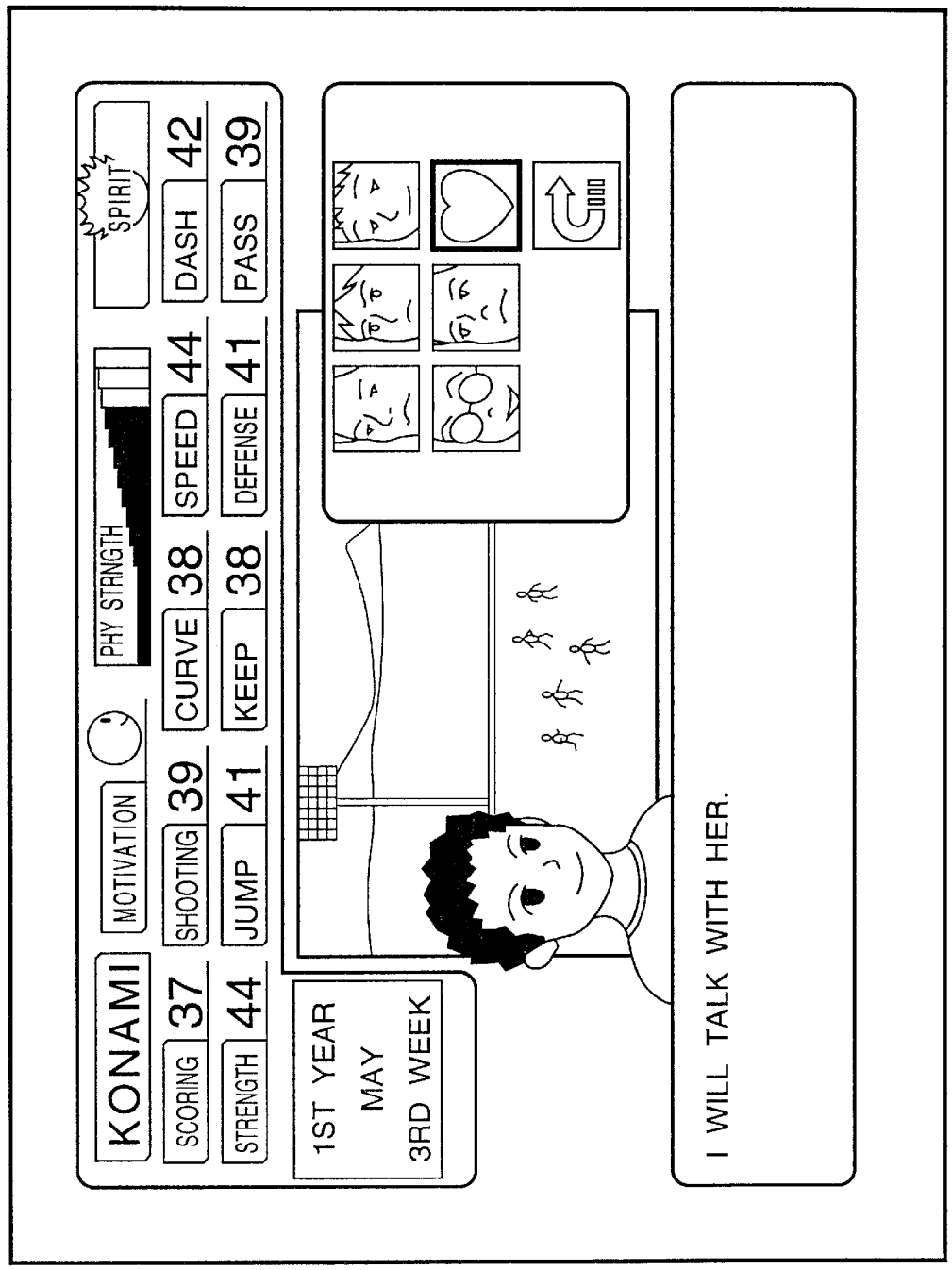

Further, when "Speak" is selected, a company icon area 136 for selectably displaying a conversation company is displayed, and a desired conversation company can be selected from those displayed in this area 136. It should be noted that the company icon area 136 shown in FIG. 8 is on a next page and that the previous page includes "Manager" as a leader character, "Kitoh coach", "Ohbayashi coach", at least one "Rival" having the same position as the main character, "Girl", and "Next Page" from upper left as shown in FIG. 13. In FIG. 8, a teammate "Ishii-kun" in the next page is selected, a character guide "I will talk with Ishii-kun" is displayed. In FIG. 9, a conversion with "Ishii-kun" is guided in characters, for example, "Sorry, but ask others". FIG. 9 rather shows a randomly occurred negative event. FIGS. 10 to 12 also show a case where "Speak" is selected, specifically showing a part of the speech contents with the "Rival". In FIG. 11, a good result (positive event) as a speech result: "You put your heart and soul into soccer, Konami-kun. So you can surely do its!!" occurs. On the other hand, in FIG. 12, a bad result (negative event) as a speech result: "Well, I wonder whether you can do it unless you put more heart and soul . . . " occurs.

The speech executing means 100 sets the direction of the speech result: whether the speech result is positive, or negative or neutral if necessary, based on the main character's "Enthusiasm Parameter Value". In other words, the higher the "Enthusiasm Parameter Value", the more likely positive events are to occur at a certain probability. Conversely, the lower the "Enthusiasm Parameter Value", the more likely negative events are to occur at a certain probability.

FIG. 13 shows a case where "Girl" has been designated as a conversation company, and the speech content successively progress as shown in "I will talk with her" by confirming using the "A" button 8a. In this way, the contents of the conversation prepared in advance or the contents of conversation randomly selected from those prepared in a multiple choice format are displayed, and the "Motivation Index" calculated by the face mark setting means 113 increases. As a result, the expression of the face mark 133a changes to lighten up.

FIG. 15 shows a case where "Rest" is selected. "I can recover physical strength" is displayed in the speech progress guide display area 135. This increases the "Motivation Index" and "Physical Strength Value" and conversely decreases the "Enthusiasm Parameter Value" although the "Ability Values" are not changed.

FIG. 16 shows a case where "Rest" is selected. "I take a rest for a change to motivate myself more" is displayed in speech progress guide display area 135. This case also increases the "Motivation Index" and "Physical Strength Value" and conversely decreases the "Enthusiasm Parameter Value" although the "Ability Values" are not changed. If the "Enthusiasm Parameter Value" is lower when "Rest" is selected, the speech executing means 100 makes a negative event such as a "Traffic Accident" likely to occur.

Figure 17:
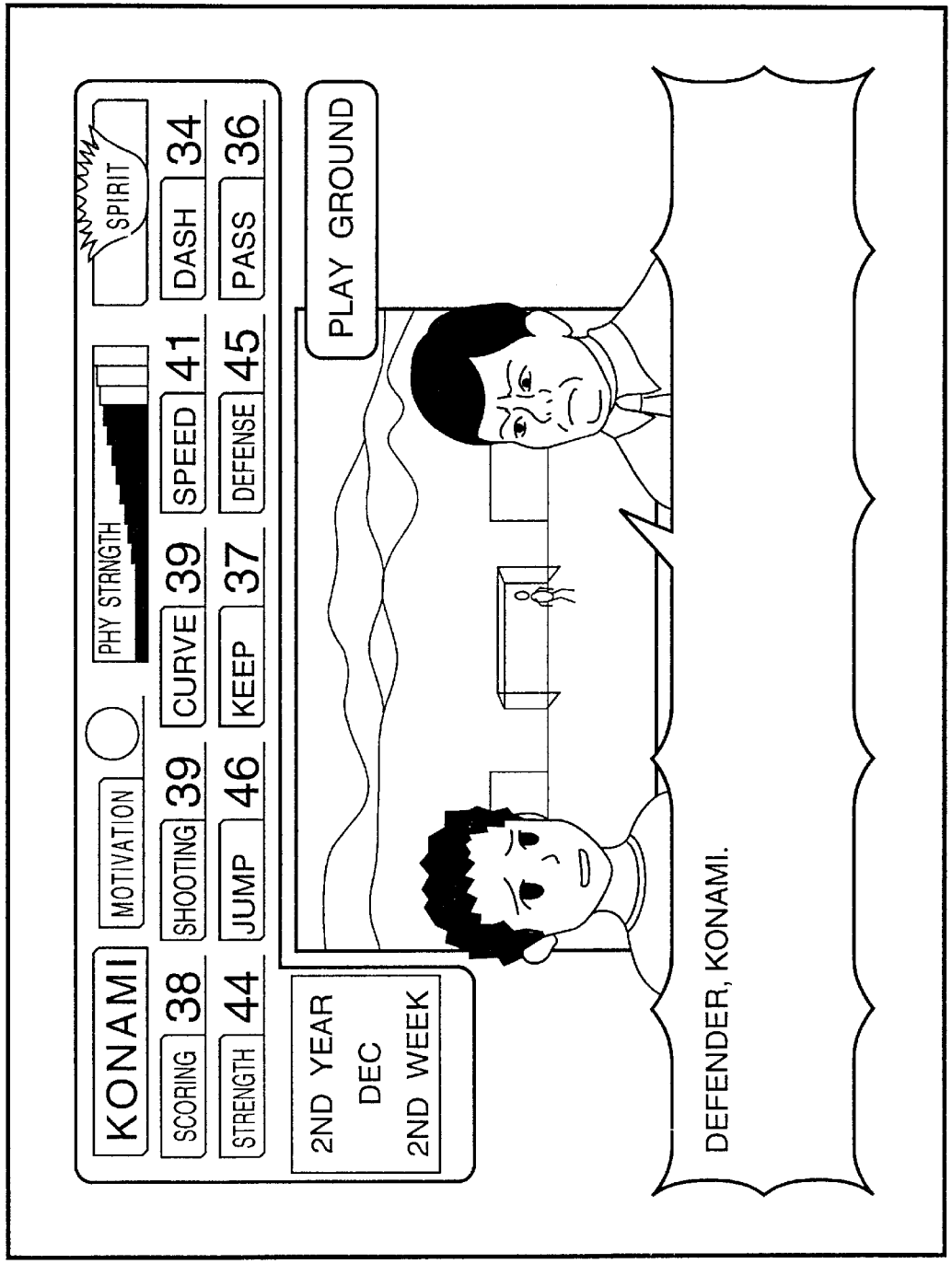
FIGS. 17 and 18 are :diagrams illustrating screens when "Game" is selected.

FIG. 17 shows a screen when the "Manager" character permits the main character to participate in the "Game". In this screen, a face image of the "Manager" character is displayed and "Defender Konami" is displayed in the speech progress guide display area 135.

Next, a flowchart of the case shown in FIG. 17 where the main character is permitted to participate in the "Game" is described with reference to FIG. 30.

After the screen of FIG. 17 appears, the "regular event" in this week is executed (Step ST51). The "regular event" occurs at a fixed point of time and always occurs when time in the game coincide with this fixed point of time. Basically, the "regular events" are set at most of times for the respective speeches/actions. The flow returns to the menu screen upon the completion of the "regular event", and the date is advanced by one week by displaying, for example, "What shall I do this week?" in the speech progress guide display area 135. In this state, an input of a new command is permitted (Step ST53). When a certain speech is selected, the content corresponding to this speech is executed (Step ST55). Subsequently, the "Game" is executed after, for example, a conversation with a member of an enemy team is displayed on the screen as a "before-the-game event" (Steps ST57, ST59). Upon the completion of the "Game", a conversation with a supporter is, for example, displayed as a "after-the-game event" (Step ST61). Thereafter, a positive or negative event occurs at a certain probability as a "random event" (Step ST63). The time of the game passes by the specified time unit, i.e. one week in this embodiment by making simple speeches/actions. Alternatively, speeches/actions may progress in such a manner that -passage of one day (or several days) can be understood.

Figure 18:
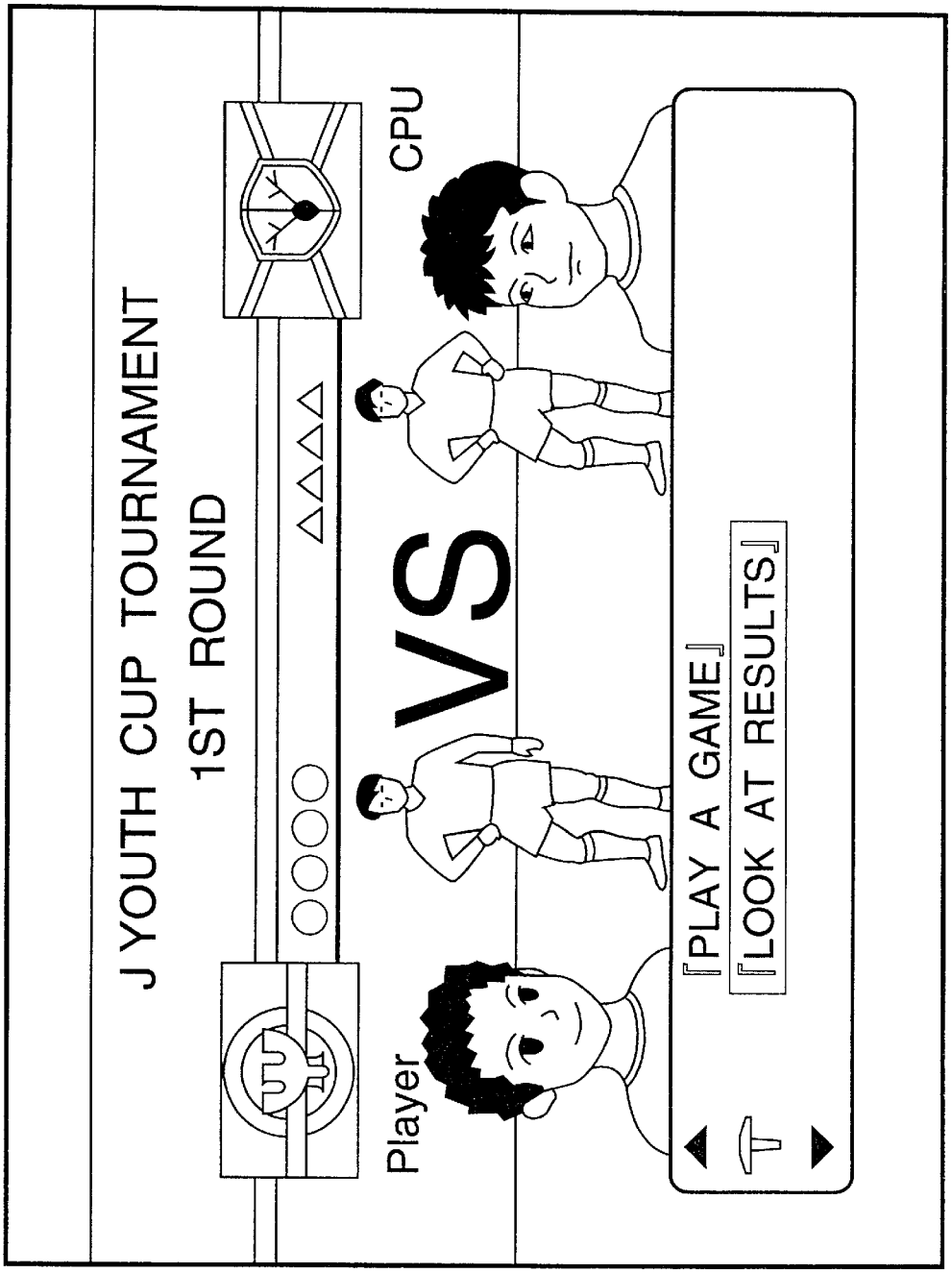

FIG. 18 is a screen following the screen of FIG. 17, and "Play a Game" and "Look at the Result" are selectably displayed in the speech progress guide display area 135. The game executing means 110 displays a screen simulating an actual field, and the main character, teammate characters and enemy characters whose movements are controlled by the CPU 1 in accordance with the rules of the soccer game, and controls the progress of the game based on the contents of instructions given to the main character by operating the operation unit 8.

FIG. 18 shows a state where the cross key 8d is positioned on "Look at the Result" to designate it. If the A-button 8a is operated in this state, the content of instruction is confirmed and "Look at the Result" is executed. The game executing means 110 displays a game showing an image in which the main character appears in a digest version game prepared in advance.

Figure 19:
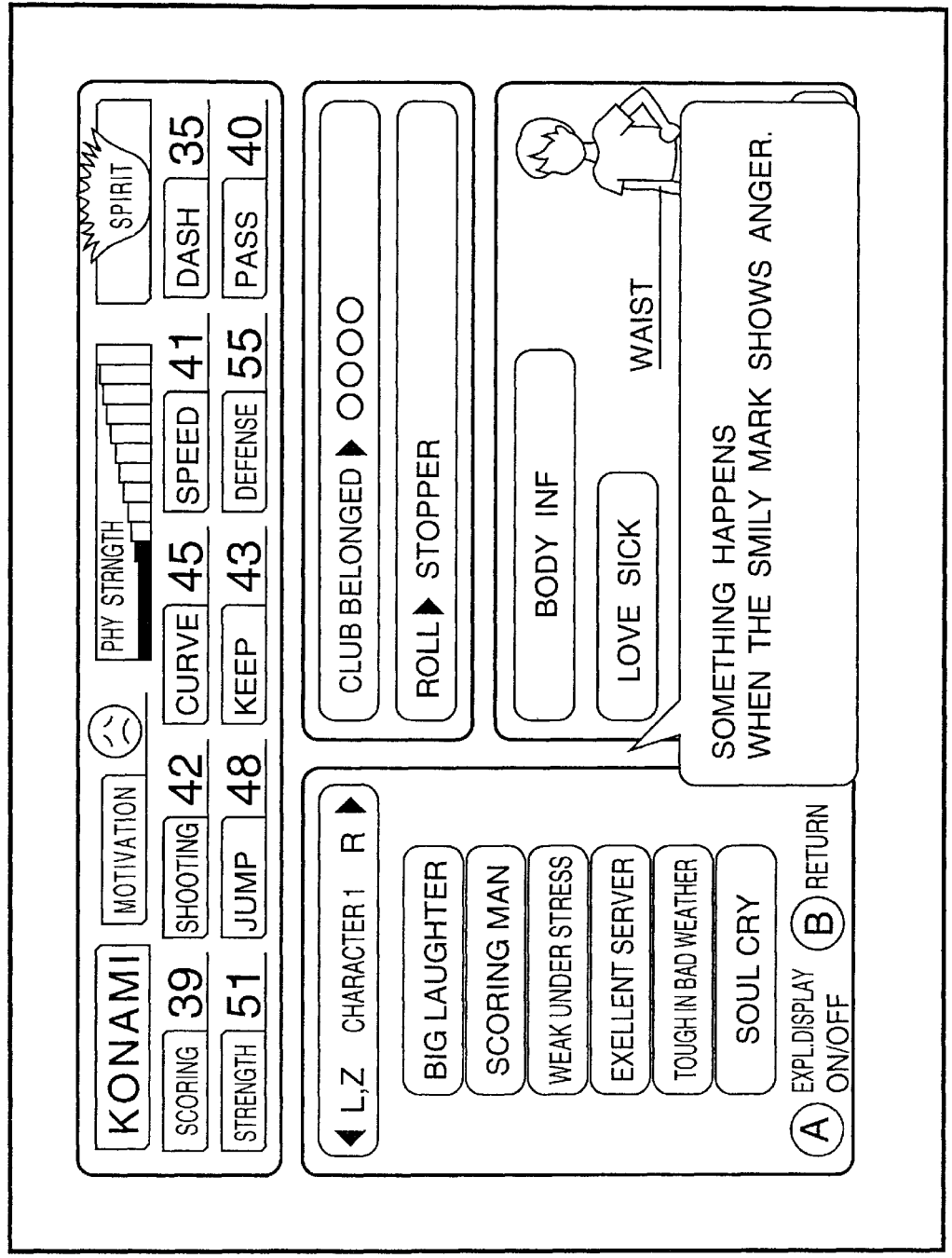
FIG. 19 is a diagram of a screen illustrating an ability table.

Upon the completion of the "Game", a screen of FIG. 19 showing the ability table is displayed, so that the game player can know the contents of the game are reflected on the ability values of the main character, i.e. the ability values are increased or decreased depending upon the contents of the game. "Something happens when the smily mark shows anger" is displayed. This message means that the eyes and mouth of the face mark 133a are changed to express anger if such an event as a foul occurs during the "Game" when the flame of the enthusiasm mark 133c is at or near maximum, i.e. the main character's "Enthusiasm Parameter Value" is extremely high. Further, the abilities of the main character are controlled to slightly increase during the "Game". Specifically, even if the same instruction is given by the operation unit 8, the movement of the main character is speedier and quicker during the "Game".

Figure 20:
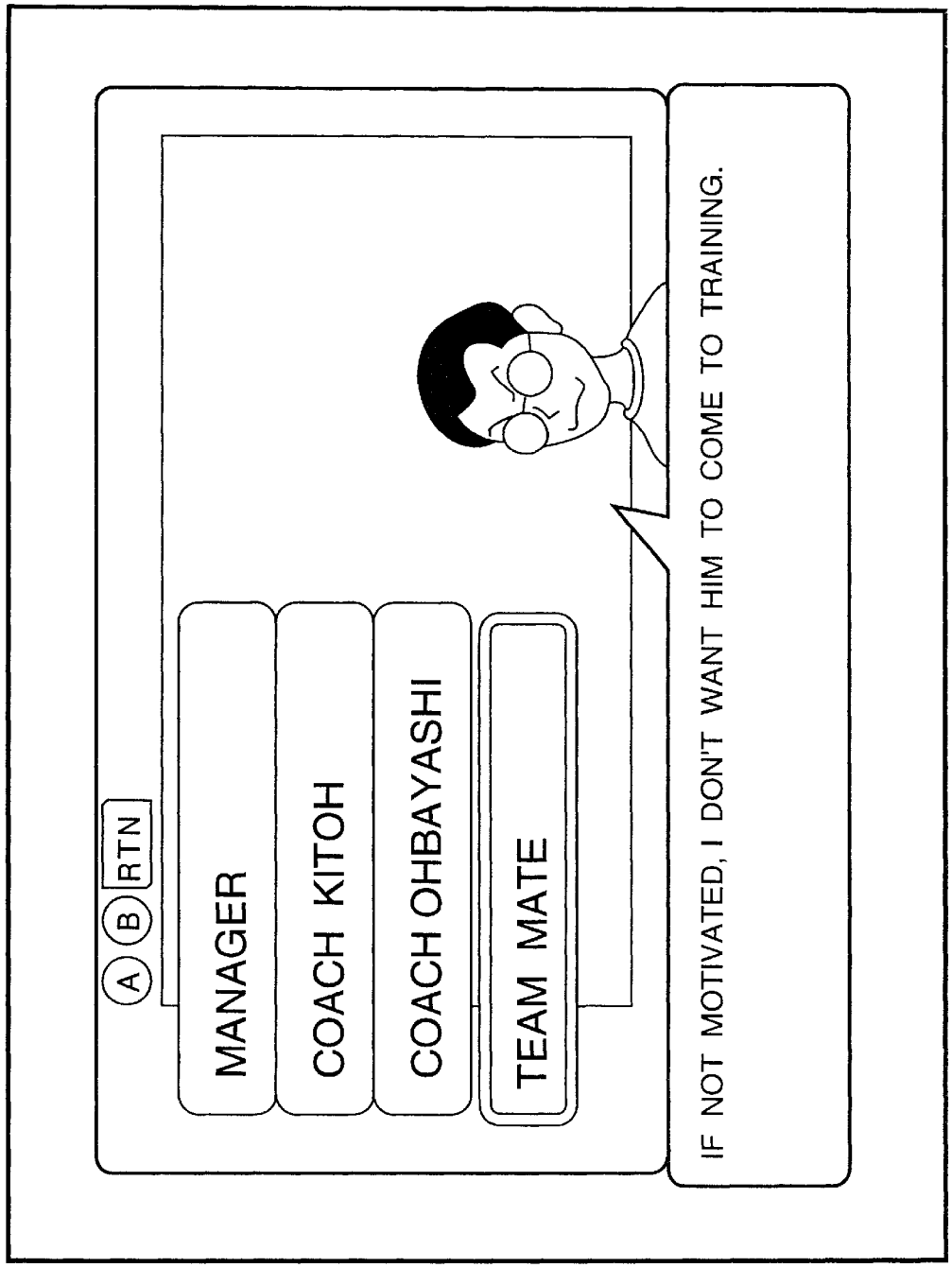
FIG. 20 is a diagram illustrating a screen after a digest version of "Game" is completed.
Figure 21:
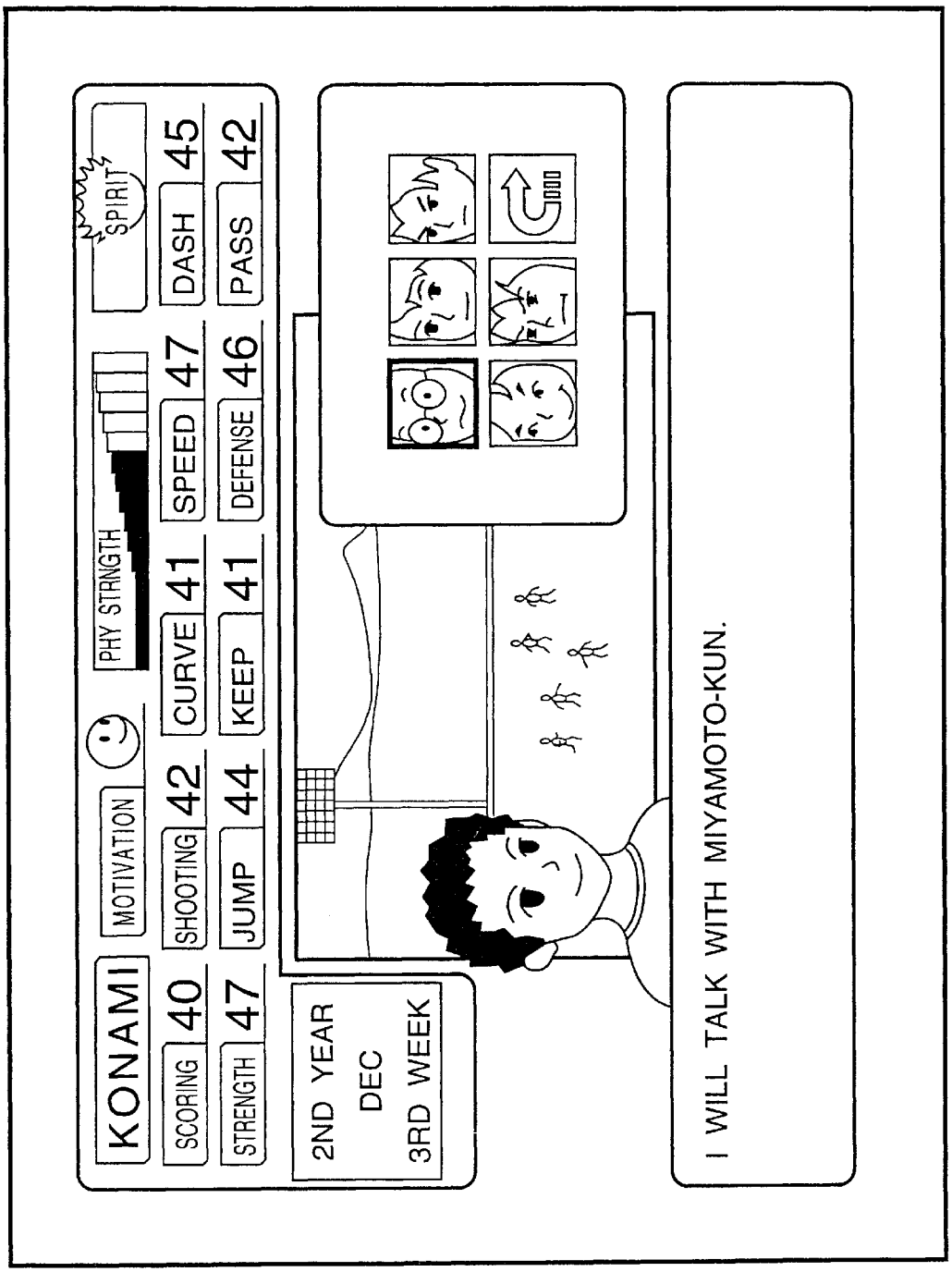
FIG. 21 is a diagram illustrating a screen when "Speak" is selected.
Figure 22:
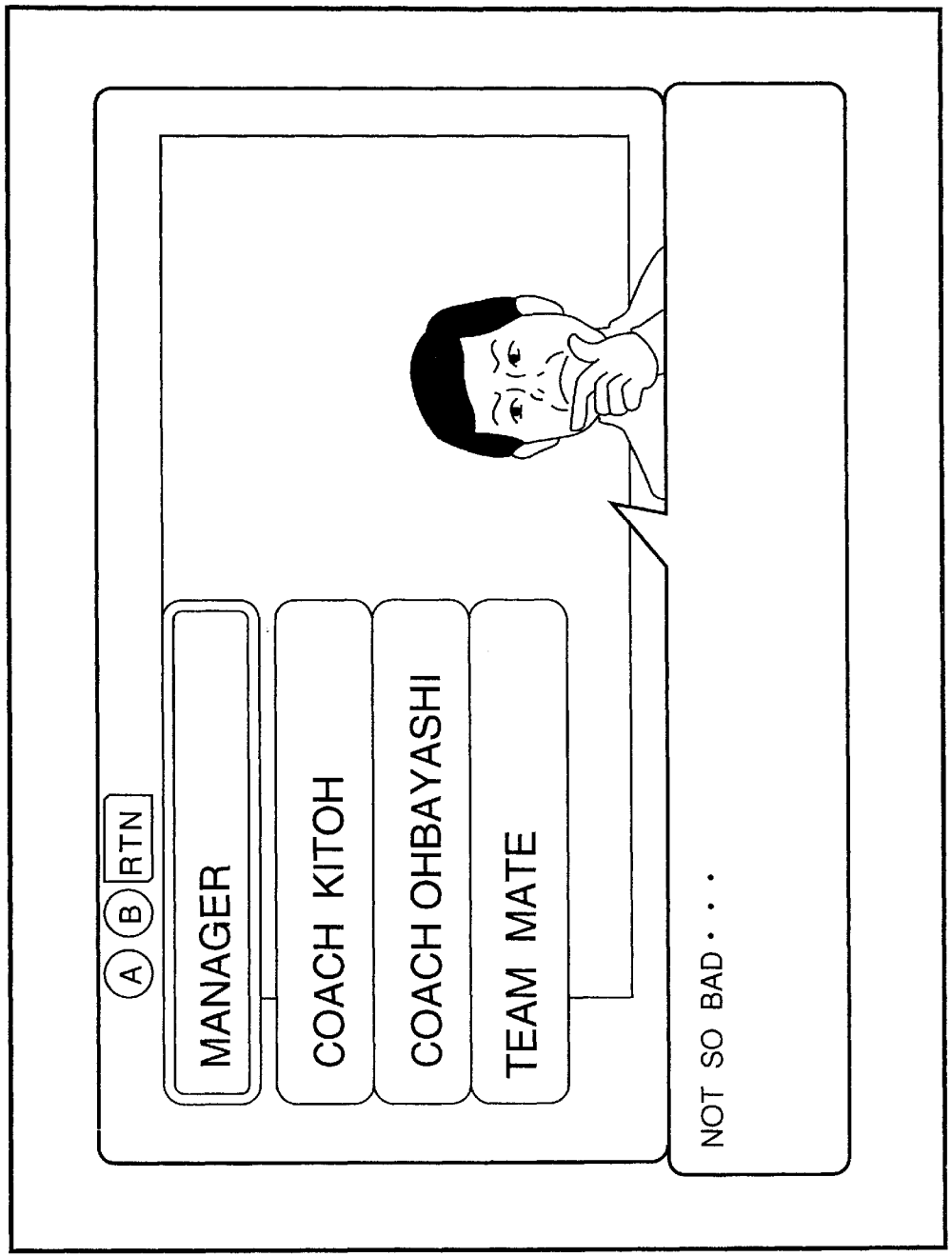
FIG. 22 is a diagram illustrating a screen when "Play a Game" is selected.
Figure 23:
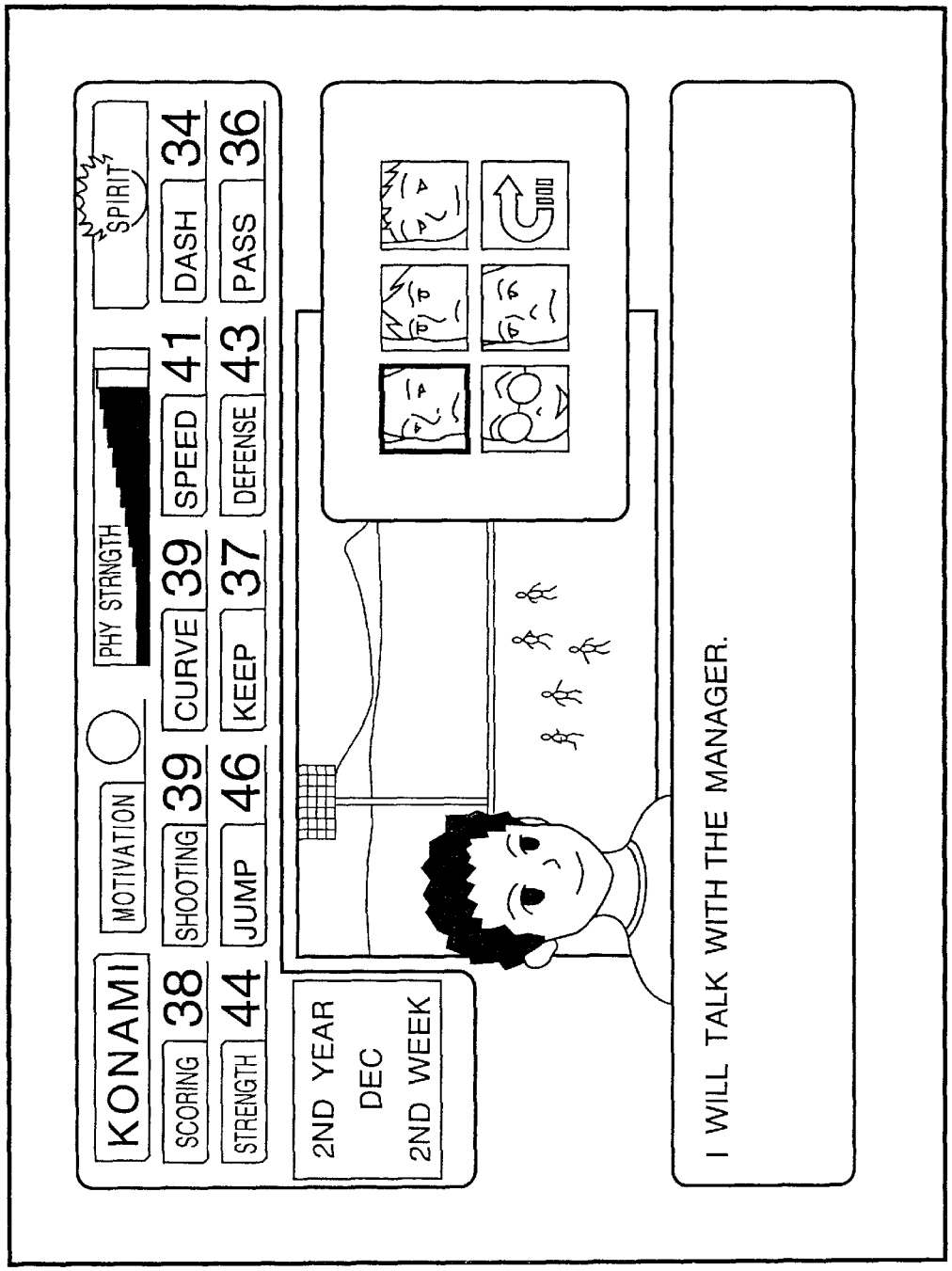
FIGS. 23 and 24 are diagrams illustrating screens when "Speak" is selected.
Figure 24:
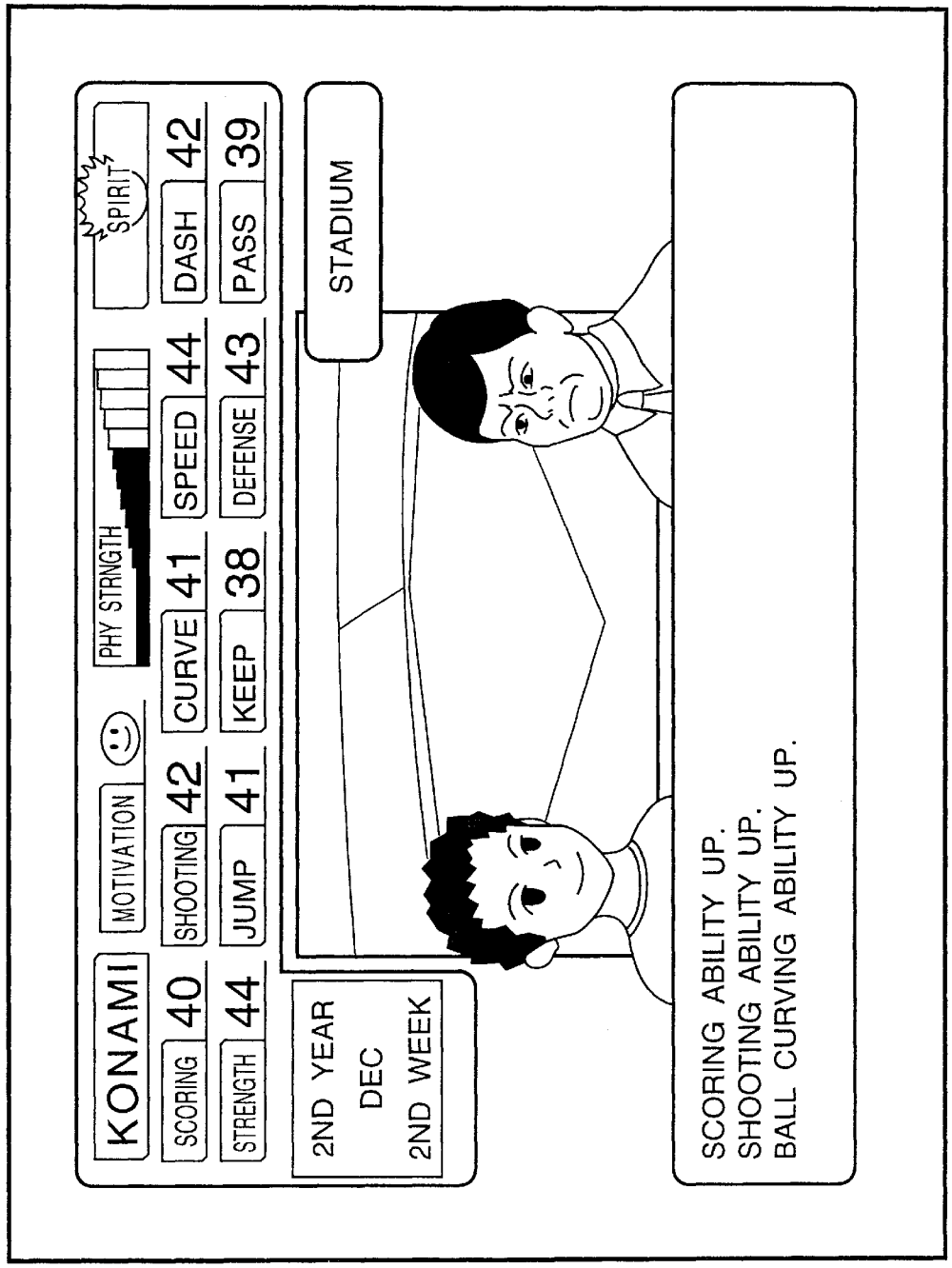

FIGS. 20 and 22 show screens when "Own Evaluation" is selected. In FIG. 20, a negative event which occurs when the "Enthusiasm Parameter Value" of the main character is low is displayed as a speech of a teammate "Miyamoto-kun": "If is not motivated, I don't want him to come to training". In response to the screen of FIG. 20, FIG. 21 shows a screen in which "I will talk with Miyamoto-kun" is executed by the game player selecting "Speak" and "Miyamoto-kun" to increase the "Reliability Degree" of this teammate on the main character. In FIG. 22, the manager character's thoughts "Not so bad . . . " is displayed. In response to the screen of FIG. 22, FIG. 23 shows a screen in which "I will talk with the manager" is executed by the game player selecting "Speak" and "Manager" to increase the "Reliability Degree" of the manager on the main character. As a result of the conversation with the "Manager", the "Reliability Degree" of the manger is increased and "Scoring ability up. Shooting ability up. Ball-curving ability up.+ or the like is displayed in the speech progress guide display area 135 as shown in FIG. 24, thereby showing increases of the "Ability Values" of the main character.

Figure 25:
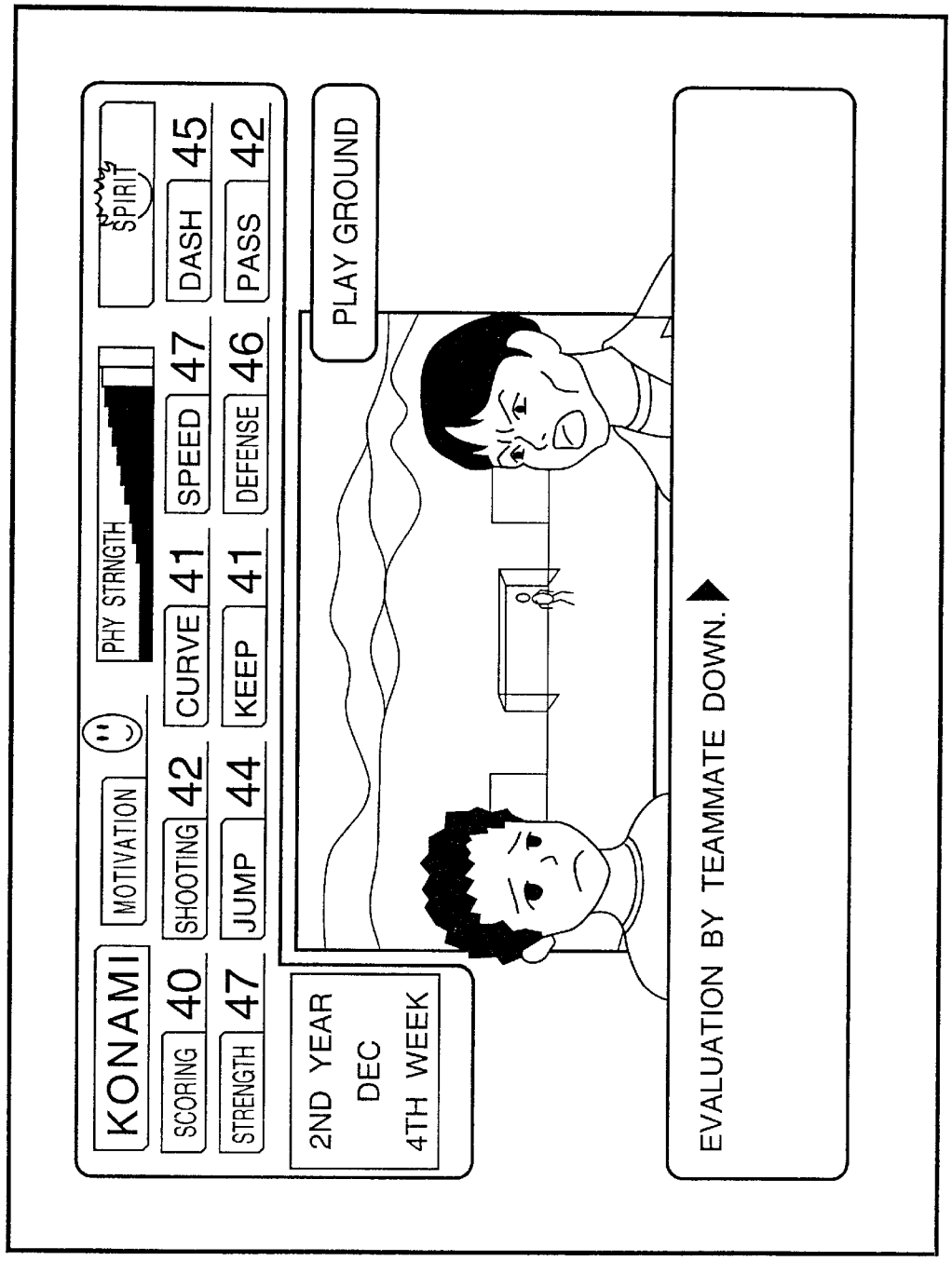
FIGS. 25 and 26 are diagrams of screens illustrating the size of an enthusiasm mark.
Figure 26:
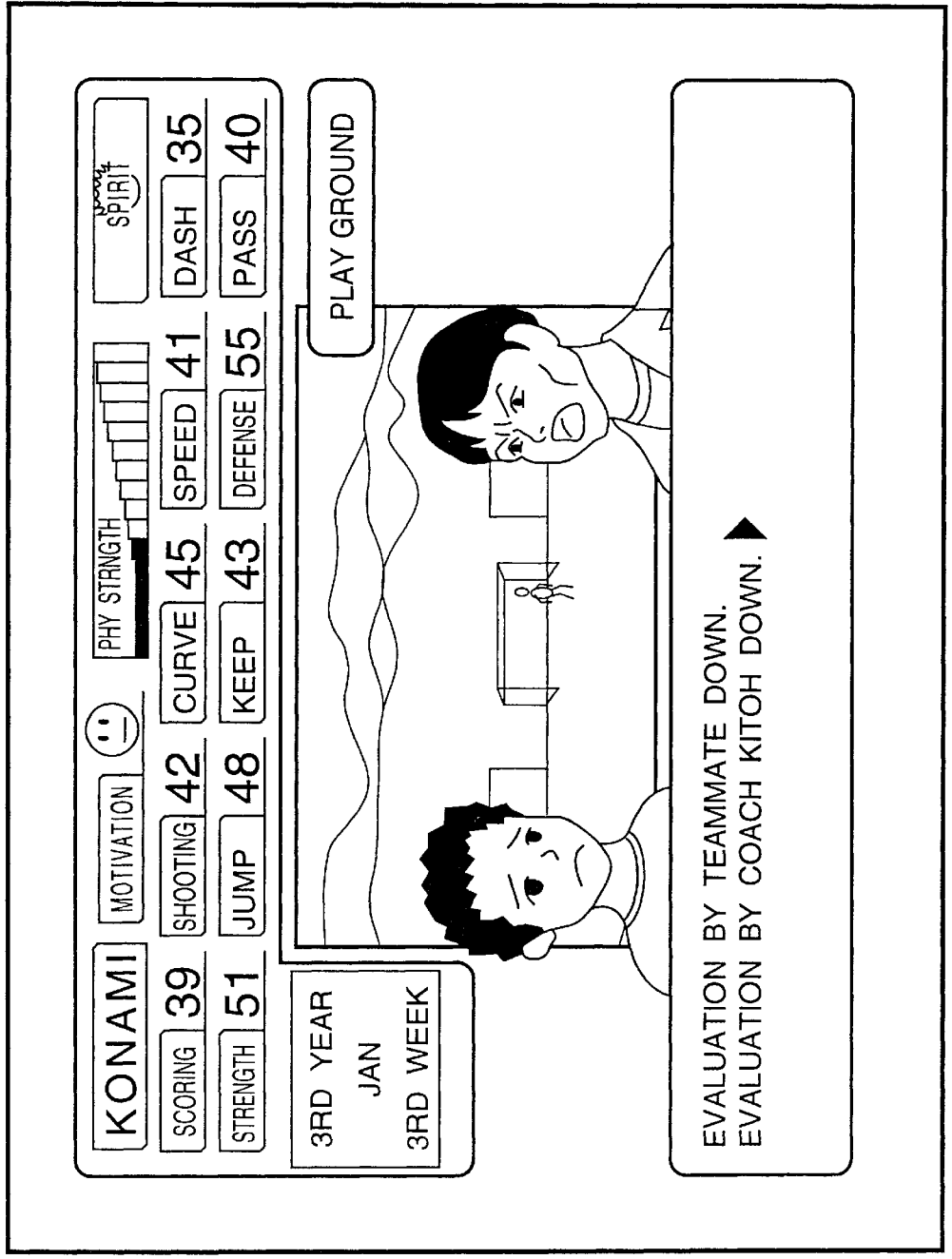
Figure 27:
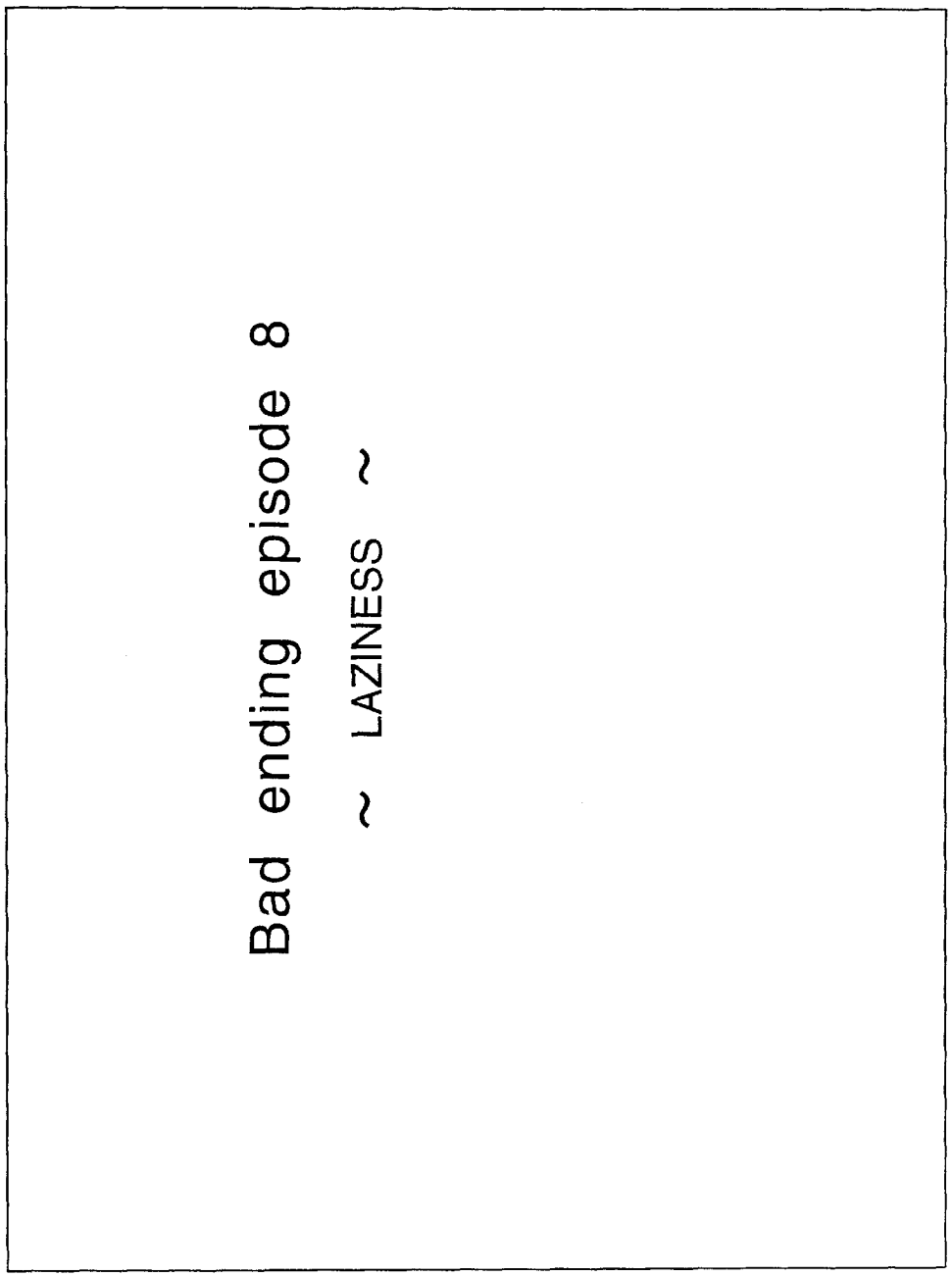
FIG. 27 is a diagram illustrating a "Game Over" screen.

FIGS. 19, 25, 26 show the enthusiasm mark 133c in different sizes. The enthusiasm mark 133c is almost at maximum in FIG. 19, about medium-size in FIG. 25 and at or near minimum in FIG. 26. Accordingly, in FIG. 25, the result of the event is likely to be negative as can be seen from "Evaluation from teammates down". In FIG. 26, the result of the event is even more negative as can be seen from "Evaluation from teammates down and evaluation from Kitoh coach down". If the "Enthusiasm Parameter Value", i.e. the enthusiasm mark 133c falls to or below that of FIG. 26, the game is forcibly finished upon judgment that the main character has lost his enthusiasm for soccer. FIG. 27 shows a screen at this time and ". . . Laziness . . . " is displayed on the screen.

Figure 31:
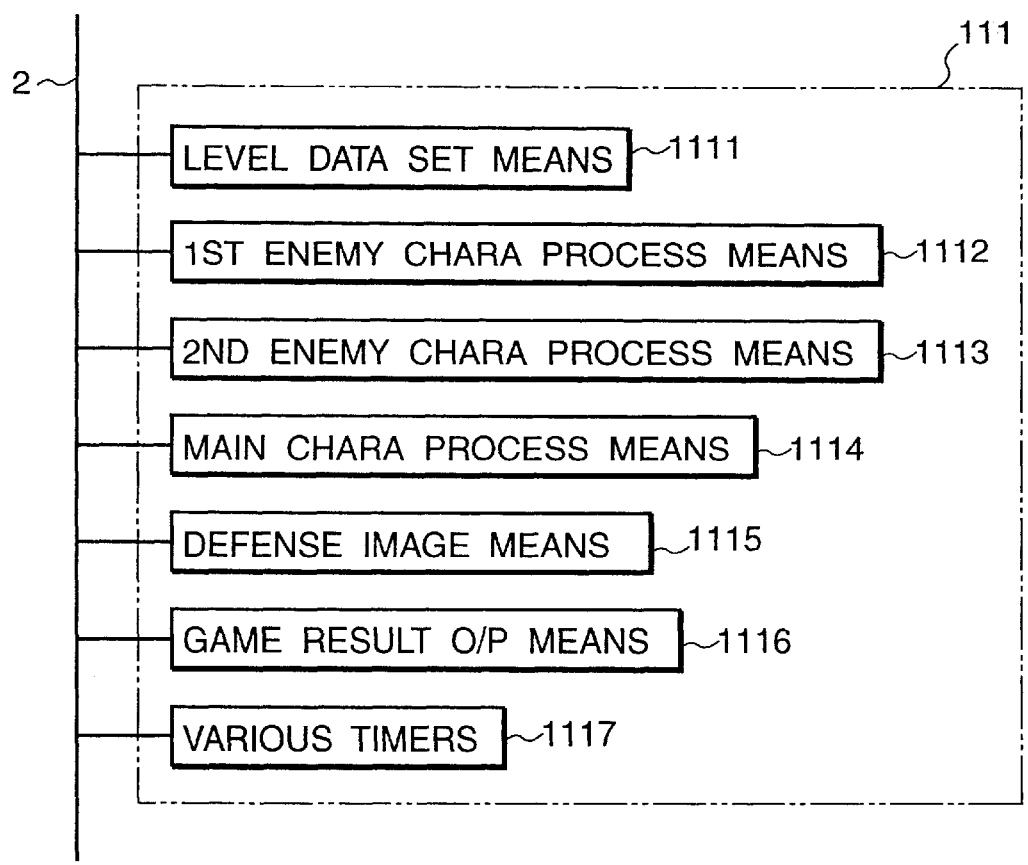
FIG. 31 is a functional block diagram of a mini-game executing means.

FIG. 31 is a functional block diagram of the mini-game executing means 111 shown in FIG. 2. This mini-game (defense training) is executed by selecting "Mini-Game" from the "Training" screen of FIG. 3. The main character is operated using the operation unit 8 to do a one-on-one or two-on-one defense training with enemies (first and second enemy characters). The contents of training are prepared from level 1 to, for example, level 6 in the ROM 51 depending on difficulty.

Figure 39:
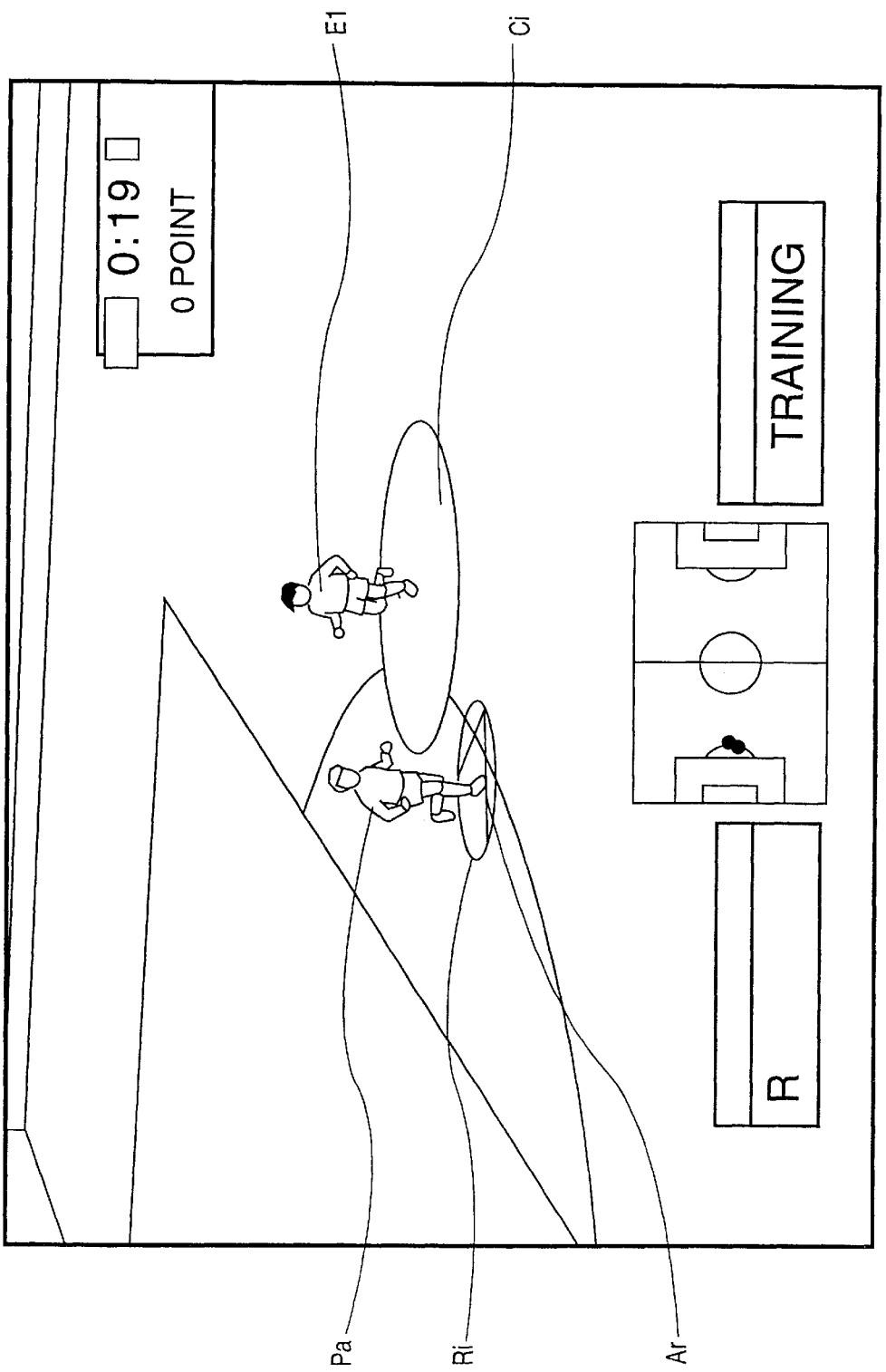
FIGS. 39 and 40 are diagram illustrating screens during a one-on-one mini-game.
Figure 40:
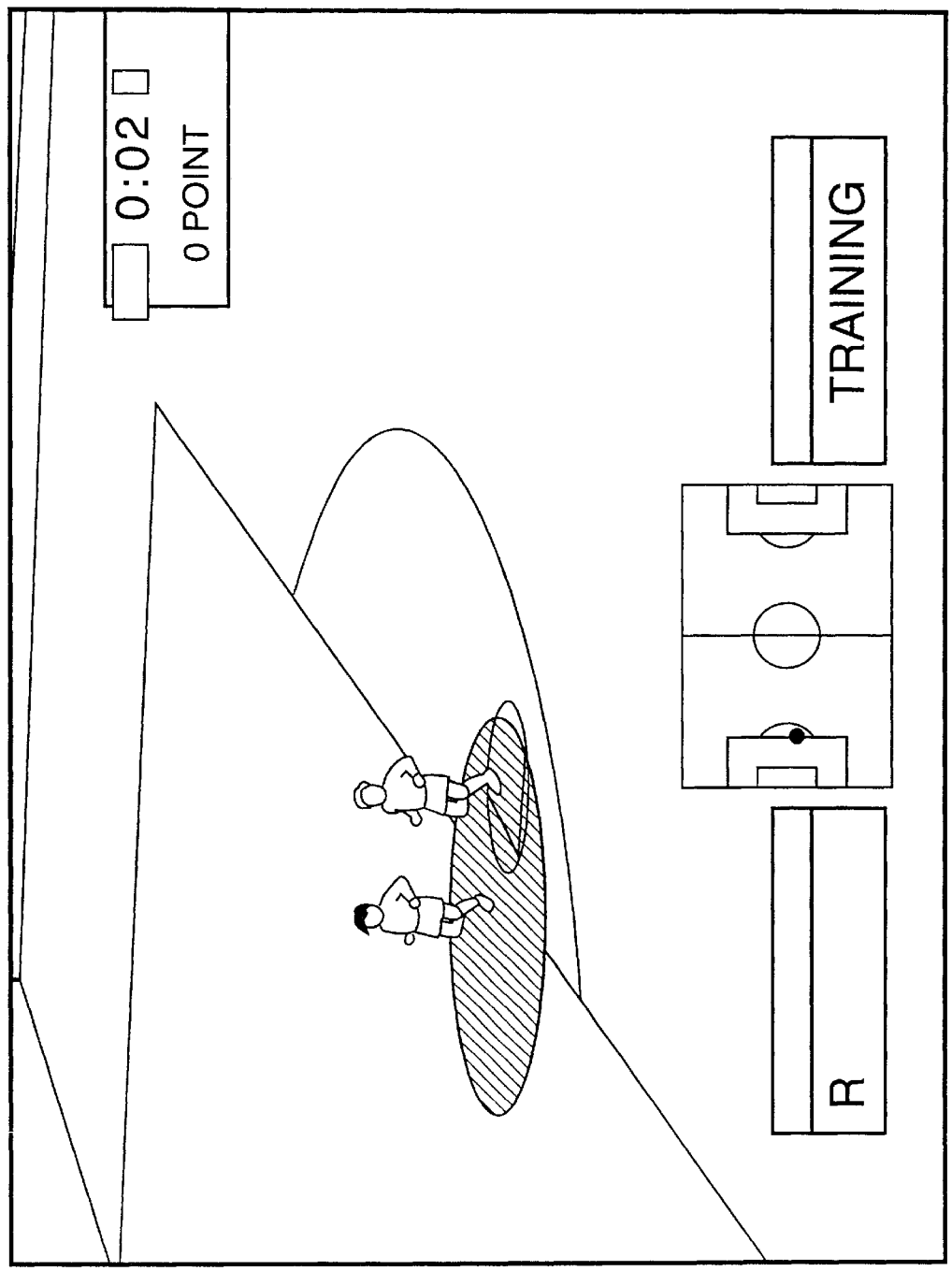
Figure 42:
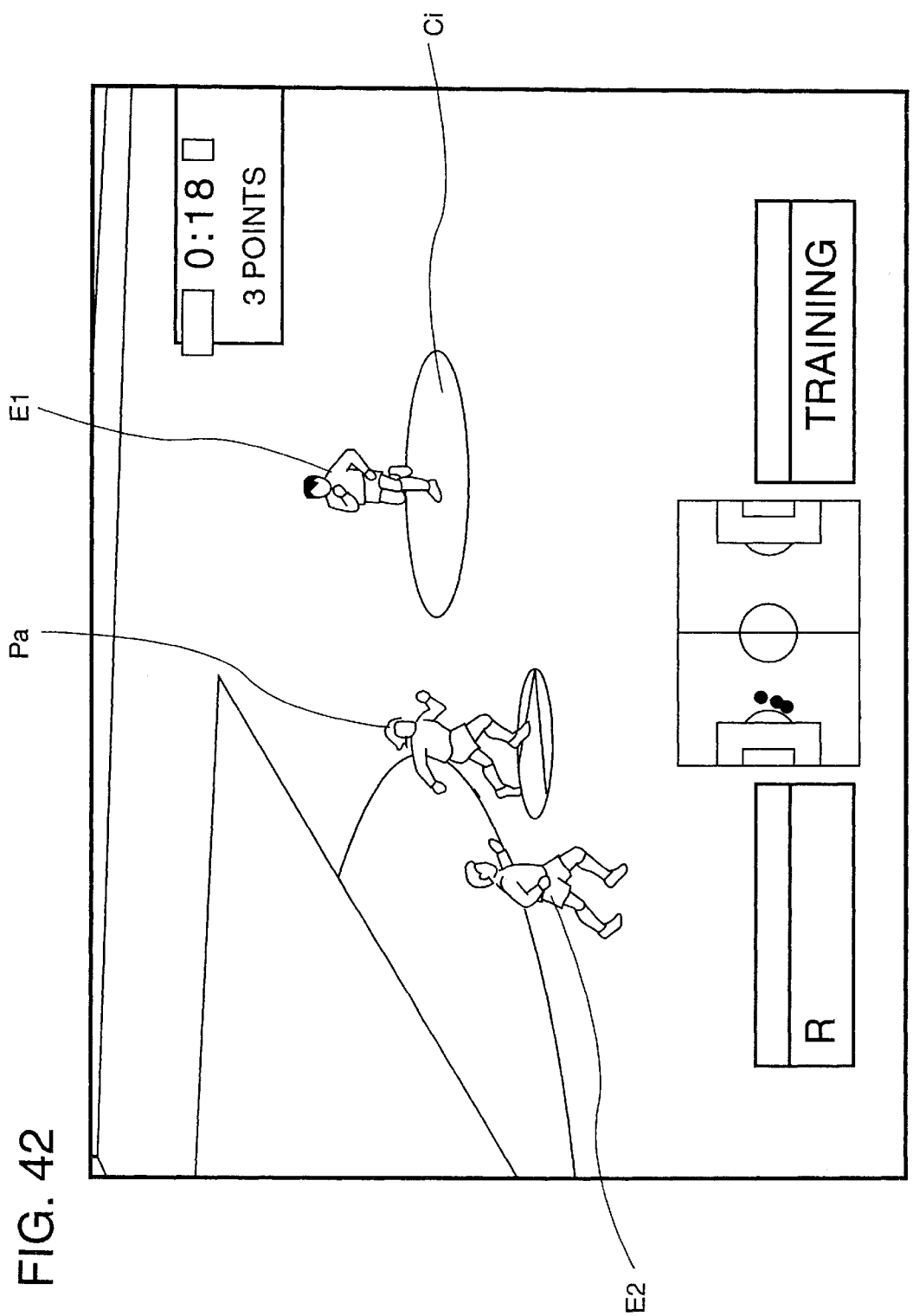
FIG. 42 is a diagram illustrating a screen during a two-on-one mini-game.

This mini-game is schematically described with reference to FIGS. 39 and 40. A field as a gaming place is displayed on the screen, and a first enemy character E1 and a main character Pa are displayed in the one-on-one game. The main character Pa can be moved by operating the operation unit 8, and the first enemy character E1 has its movement controlled by a first enemy character processor 1112 of the CPU 1 to be described later. In the mini-game, no soccer ball is displayed and, instead, a circle mark Ci centered on the feet of the first enemy character E1 is displayed. On the other hand, a ring mark Ri indicating the position of the main character Pa and an arrow mark Sp indicating a moving direction of the main character Pa are displayed at his feet. The defense training is made executable by operating the operation unit 8 such that the main character Pa enters and continues to stay inside the circle mark Ci set for the first enemy character E1, whose moving direction is constantly changed, for a predetermined time. The display color of the circle mark Ci is differed depending upon whether the main character Pa is inside the circle mark Ci (see FIG. 40) or not (see FIG. 39) so that the game player can visually confirm it. Alternatively, the display color of the ring mark Ri may be changed for the same purpose or a sound guide may be given instead of changing the display color. Any means may be adopted provided it will notify in such a manner easily recognizable to the game player. In the two-on-one game mode, the first and second enemy characters E1, E2 appear as shown in FIG. 42 and are switched by alternately setting the circle mark Ci for them.

A level data setting means 1111 is stored in the ROM 51 and adapted to read various setting data for changing difficulty according to the level via the RAM 3 every time the mini-game of a corresponding level is executed. The execution of a mini-game of a next level is permitted by clearing specified conditions from level 1. Mini-game of up to level 6 is executable.

The first enemy character processing means 1112 controls the respective movements of the first enemy character E1 based on the corresponding data set by the level data setting means 1111.

A second character setting means 1113 determines a display position of the second character enemy E2 by setting a position of the first enemy character E1 in the field by coordinate values.

A main character processing means 114 moves the main character Pa on the field screen in accordance with an operation signal received from the operation unit 8.

A defense judging means 1115 judges within a specified game time whether the main character Pa has continued to stay inside the circle mark Ci of the first enemy character E1 for the predetermined time. A variety of timers 1117 are for monitoring the respective set times.

A game result outputting means 1116 outputs an information on the judgment result and cleared level (only information on a failure to clear level 1 if level 1 could not be cleared) to the CPU 1.

Hereafter, the mini-game operation by the mini-game executing means 111 is described with reference to flowcharts shown in FIGS. 32 to 36 while referring to FIGS. 37 to 42 illustrating corresponding screens.

Figure 37:
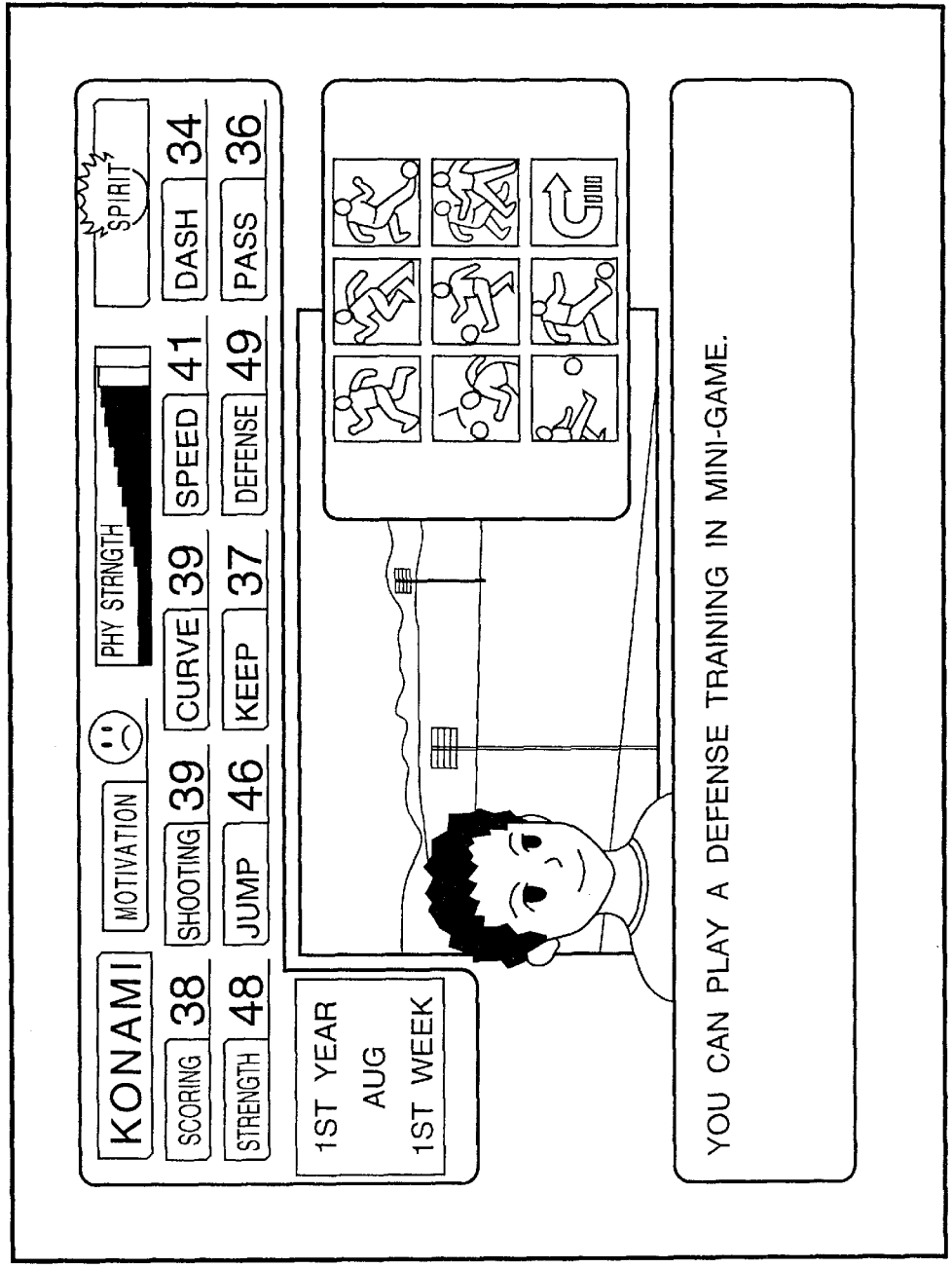
FIGS. 37 and 38 are diagrams illustrating guide screens of the mini-game.
Figure 38:
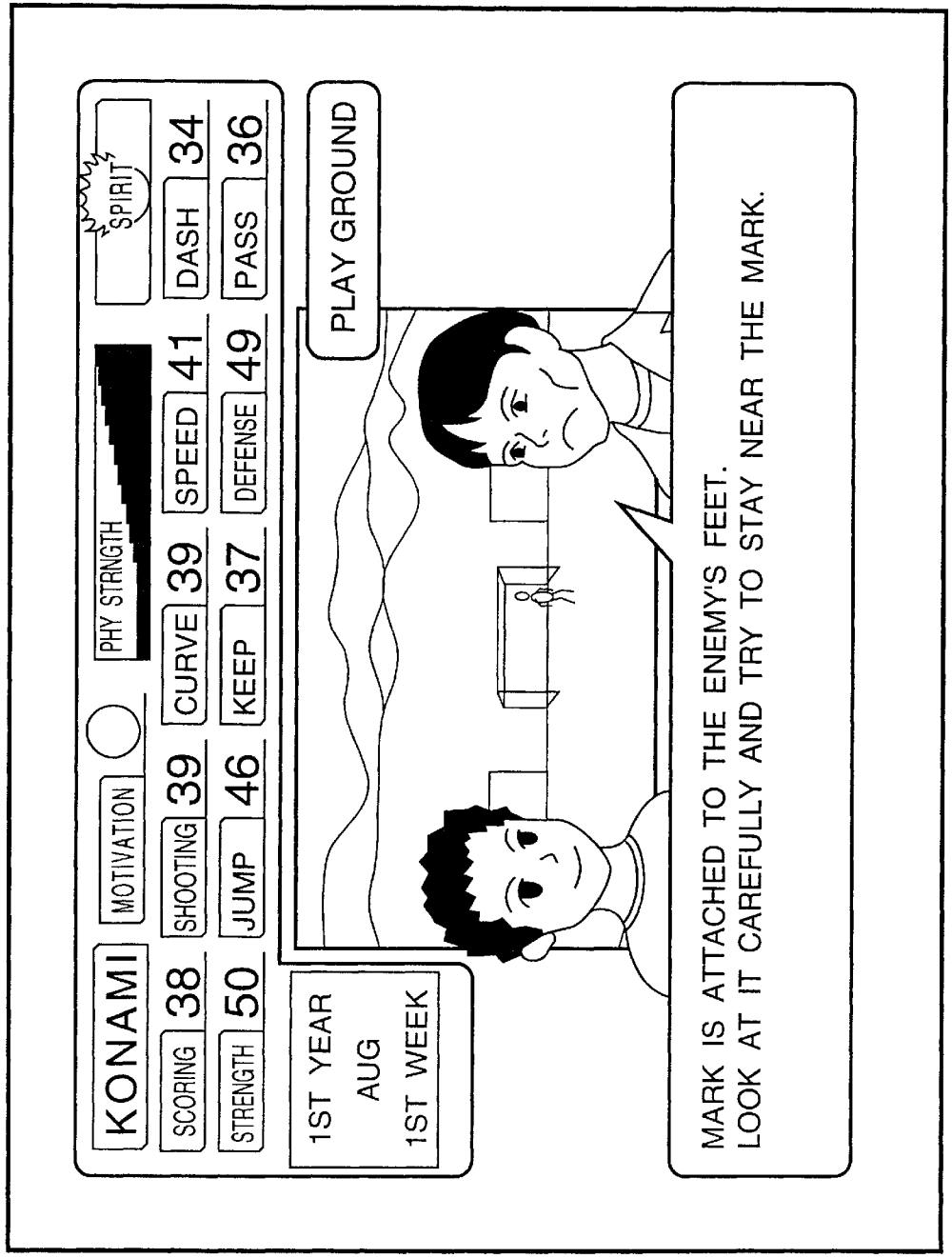

If "Mini-Game" is selected from the "Training" screen, a screen shown in FIG. 37 is displayed "You can play a defense training in mini-game" is displayed as a guide in the speech progress guide display area 135 on the screen. Subsequently, a screen shown in FIG. 38 is displayed "Mark" is attached to the enemy's feet. Look at it carefully and try to stay near the "Mark"" is displayed in order to guide the game player how to operate (conduct the training). Thereafter, a screen of the mini-game, for example, as shown in FIG. 39 appears.

Figure 32:
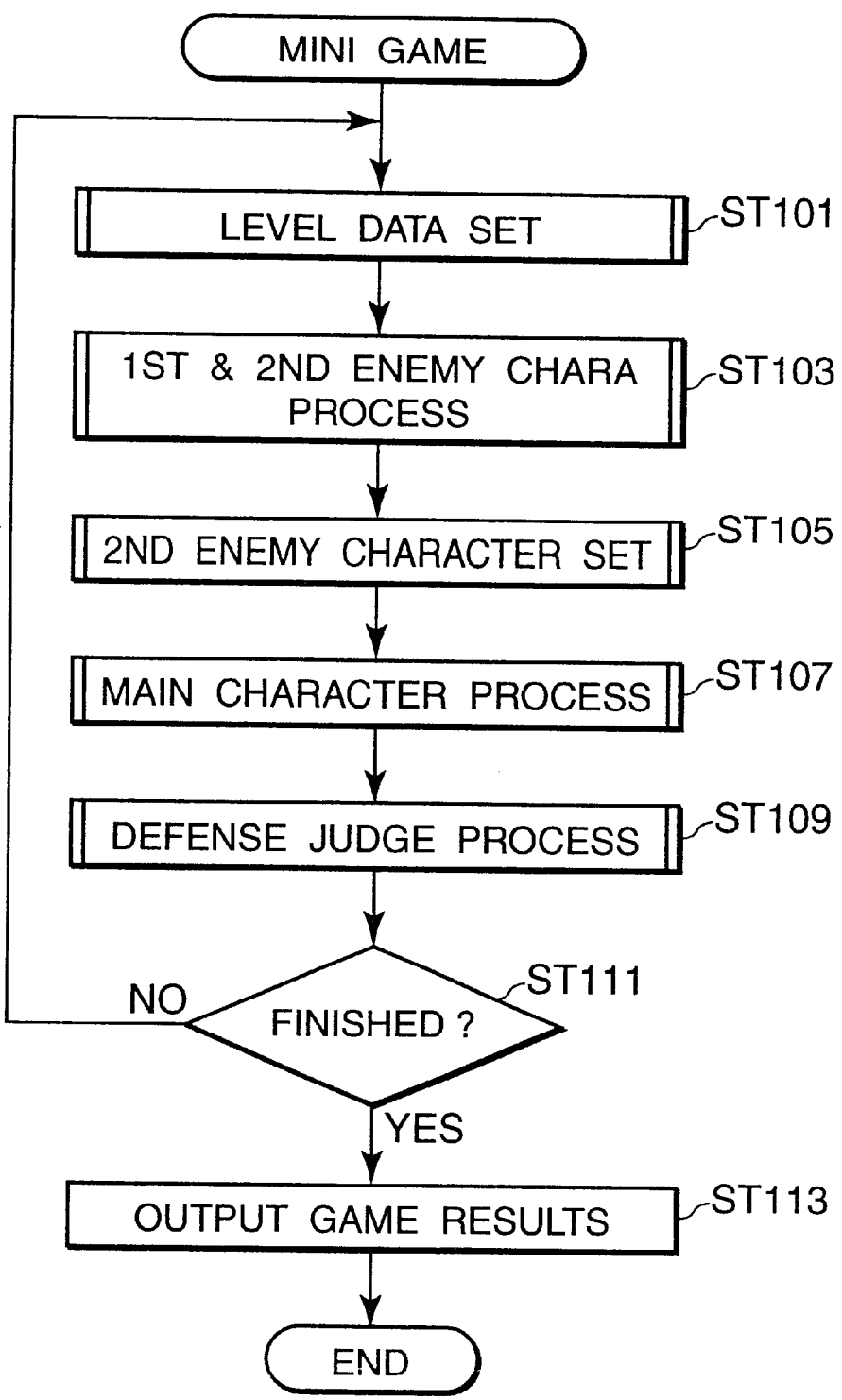
FIG. 32 is a main flowchart of a mini-game.

FIG. 32 is a main flowchart of the mini-game. First, the level data are set according to the level (Step ST101), movement processing is executed for the first and second enemy characters E1, E2 based on the set data and position setting is executed for the second enemy character E2 (Steps ST103, ST105). Subsequently, movement processing is executed for the main character Pa (Step ST107). Then, defense judgment is executed as to whether the main character Pa has continued to stay inside the circle mark Ci of the first enemy character E1 for the predetermined time (has cleared the condition) (Step ST109). If the condition was cleared within the specified game time, this flow returns to Step ST101 to newly set the level data of a next level one step above the previous level and the continuation of the mini-game is similarly permitted. On the other hand, if the condition was not cleared, the game result is outputted upon the judgment that the mini-game is over and this flow is completed.

Figure 33:
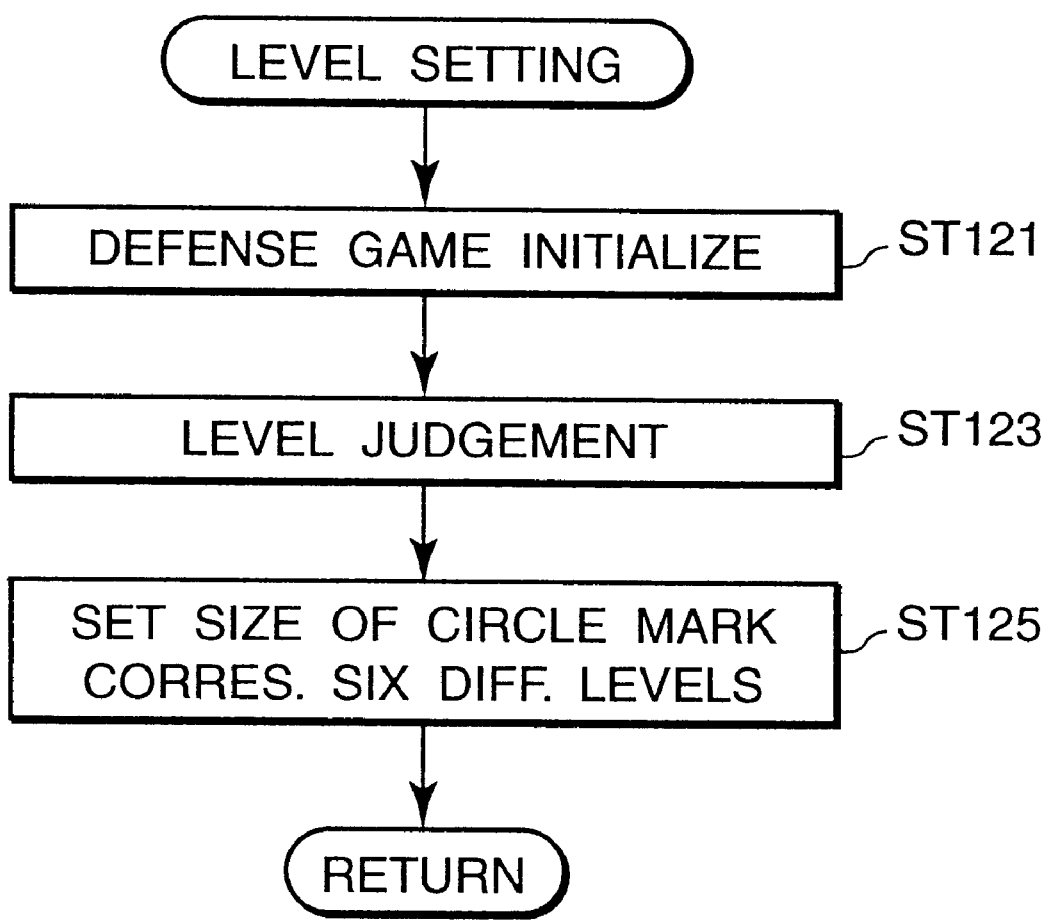
FIG. 33 is a flowchart illustrating a subroutine "Level Data Setting"

FIG. 33 is a subroutine "Level Setting". First, the set data of this game is initialized (Step ST121), and then a level of this time is discriminated (Step ST123) to set the corresponding level data, for example, the size (radius) of the circle mark Ci (Step ST125).

Figure 34:
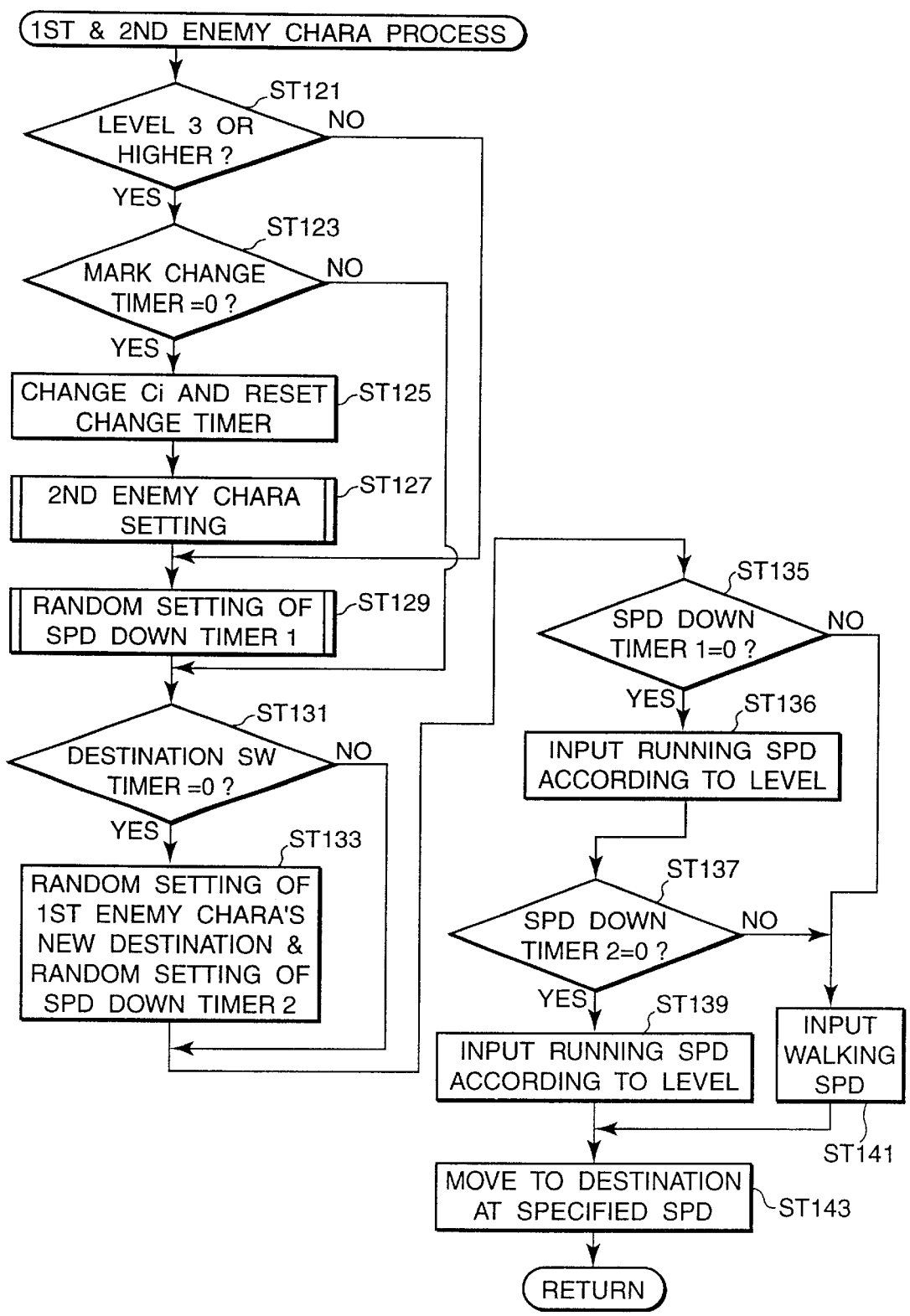
FIG. 34 is a flowchart illustrating a subroutine "Enemies 1, 2 Character Processing"

FIG. 34 is a subroutine "First and Second Enemy Character Processing". Whether the level is not below "3" is first discriminated. The game is executed in one-on-one mode if the level is "1" or "2", while being executed in two-on-one mode if the level is "3" or higher.

If the level is "1" or "2" (NO in Step ST121), this subroutine proceeds to Step ST129 to set a random value in a speed-down timer 1 and further proceeds to Step ST131. The speed-down timer 1 is set for the first enemy character E1. Immediately after a destination is newly set, a moving speed is set to e.g. a walking speed and a higher speed corresponding to the level is set when time set in the speed-down timer 1 is up.

Whether a destination switching timer is "0" is judged in Step ST131. This timer is for successively randomly setting a new destination of the main character Pa with respect to the first enemy character E1 to realize, for example, such an irregular movement of the main character Pa that the main character Pa facing to the right suddenly starts moving to the left as shown in FIGS. 39 and 40. The destination is switched every time a fixed period of several seconds or a randomly set period passes.

If the destination switching timer is not "0", i.e. the set time is not up yet, the first enemy character E1 is caused A to move toward the already set destination. Unless otherwise, a new destination is randomly set with respect to the first enemy character E1 and a random value is set in a speed-down timer 2 (Step ST133), and this flow proceeds to Step ST135 where whether the speed-down timer 1 is "0" is judged.

The speed-down timer 2 remains set at "0" in the one-on-one game mode. Accordingly, this subroutine goes through Step ST137 in this case. The walking speed is inputted and designated as the moving speed of the first enemy character E1 if the speed-down timer 1 has not reached "0", whereas the running speed according to the level is inputted and designated when the speed-down timer 1 reaches "0" (Step ST139). The first enemy character E1 is moved to the destination at such a designated speed (Step ST143).

If the level is "3" or higher (YES in Step ST121), the circle mark Ci is alternately given to the first and second enemy characters E1, E2 as shown in FIG. 42.

Specifically, whether a mark switching timer is "0" is judged in Step ST123. The mark switching timer is for alternately giving the circle mark Ci to the two enemy characters E1, E2. The circle mark Ci is given to the other enemy character when this timer reaches "0", i.e. the set time is up, thereby switching this enemy character to the first enemy character E1. If the mark switching timer is "0" (YES in ST123), the circle mark Ci is switched to the other enemy character, and the mark switching timer is started by resetting (Step ST125). Subsequently, setting processing for the second enemy character E2 is executed (Step ST127) and a random number is set in the speed-down timer 1 (Step ST129). On the other hand, if the mark switching timer is not "0", this subroutine proceeds to Step ST131.

In Step ST131, whether the destination switching timer is Mod is judged. If not, this subroutine proceeds to Step ST135. If the timer is "0", a new destination is randomly set for the first enemy character E1 and a random value is set in the speed-down timer 2.

Whether the speed-down timers 1, 2 are "0" is judged respectively (Steps ST135, ST137). If neither the speed-down timer 1 nor 2 is "0", the walking speed is designated as the moving speed of the first and second enemy characters E1, E2 (Step ST139), who further move to their destinations (Step ST143). When the speed-down timer 1 reaches "0", a running speed corresponding to the level is designated for the first enemy character E1 (Step ST136), and the two enemy characters E1, E2 further move to their respective destinations. When the speeddown timer 2 reaches "0", a running speed corresponding to the level is designated for the second enemy character E2, and the two enemy characters E1, E2 further move to their respective destinations.

Since the circle mark Ci is alternately switched at random intervals to cause an irregular movement of the first enemy character E1, complicated actions which are approximate to those taken during an actual defense training can be easily realized as shown in FIG. 42.

Figure 35:
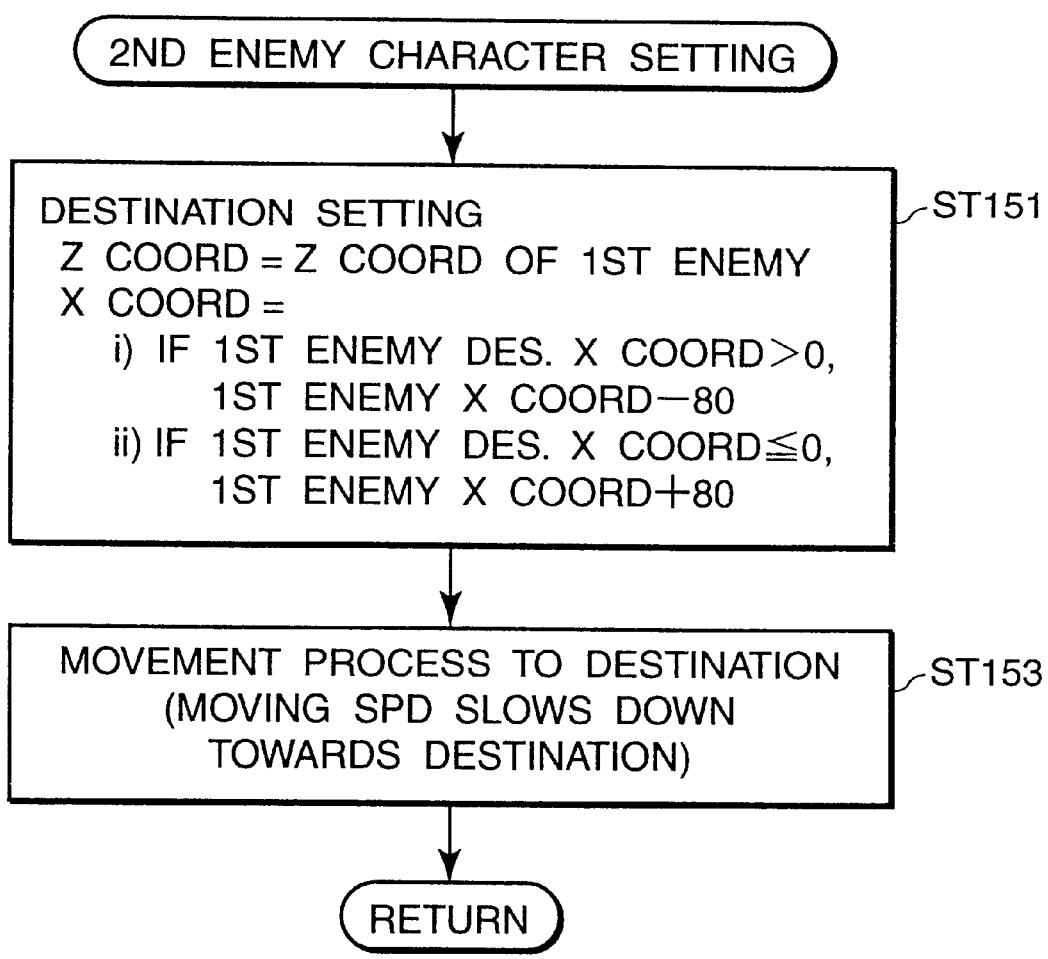
FIG. 35 is a flowchart illustrating a subroutine "Enemy 2 Character Setting"

FIG. 35 shows a subroutine "Second Enemy Character Setting". First, Step ST151 is executed to set a destination of the second enemy character E2. The same coordinate systems as the first enemy character E1 are set on Z-axis, i.e. in a direction toward a goal net, and a middle position of X-axis, i.e. side direction is set at X=0. (X-coordinate of the position of the first enemy character E1 −80) is set as an X-coordinate of the position of the second enemy character E2 when the first enemy character E1 is on the positive side, and conversely, (X-coordinate of the position of the first enemy character E1 +80) is set as an X-coordinate of the position of the second enemy character E2 when the first enemy character E1 is on the negative side (Step ST151). The moving speed of the second enemy character E2 to his destination is set slower as he approaches the destination (after the speed-down timer 2 reaches "0"). As a result, a mini-game conforming to the actual two-on-one defense training can be realized.

Figure 36:
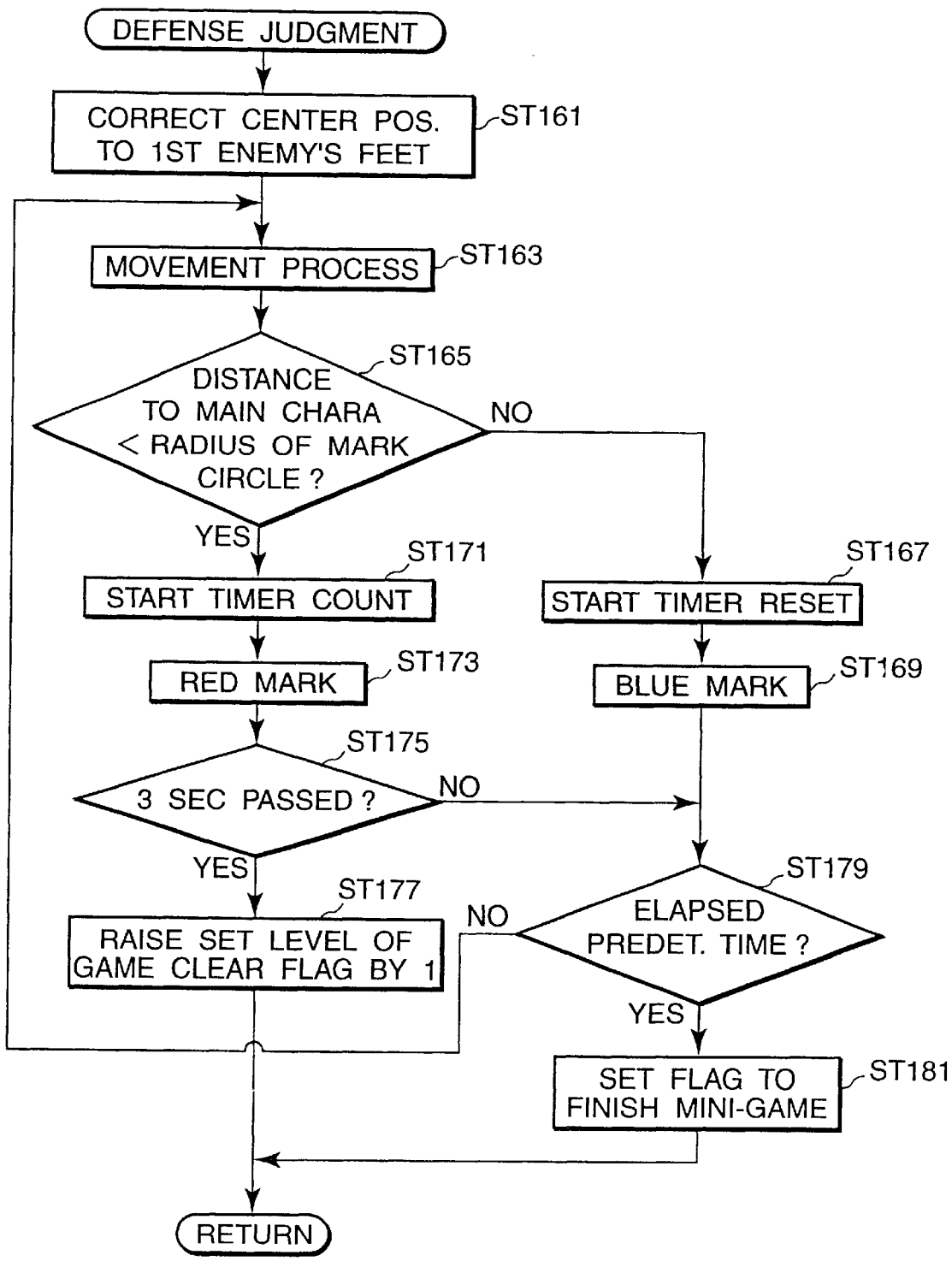
FIG. 36 is a flowchart illustrating a subroutine "Defense Decision"

FIG. 36 is a subroutine "Defense Judgment". First, a center position is corrected to the feet of the first enemy character E1, i.e. relative coordinate systems are set (Step ST161) in order to facilitate a judgment as to whether the main character Pa is inside the circle mark Ci. Subsequently, new coordinate systems corresponding to the operation by the operation unit 8 are obtained for the main character Pa (Step ST163).

Whether the position (feet, for example, coordinates of the center of the ring mark Ri) of the main character Pa is inside the circle mark Ci set for the first enemy character E1 is the judged (Step ST165). If not, this subroutine proceeds to Step ST179 after the timer is started by resetting (Step ST167) and the circle mark Ci is displayed in a specified color, for example, in blue (Step ST169).

On the other hand, if the position of the main character Pa is inside the circle mark Ci set for the first enemy character E1, counting by the timer is continued (Step ST171) and the circle Ci is displayed in a color different from the above specified color, for example, in red (Step ST173).

Figure 41:
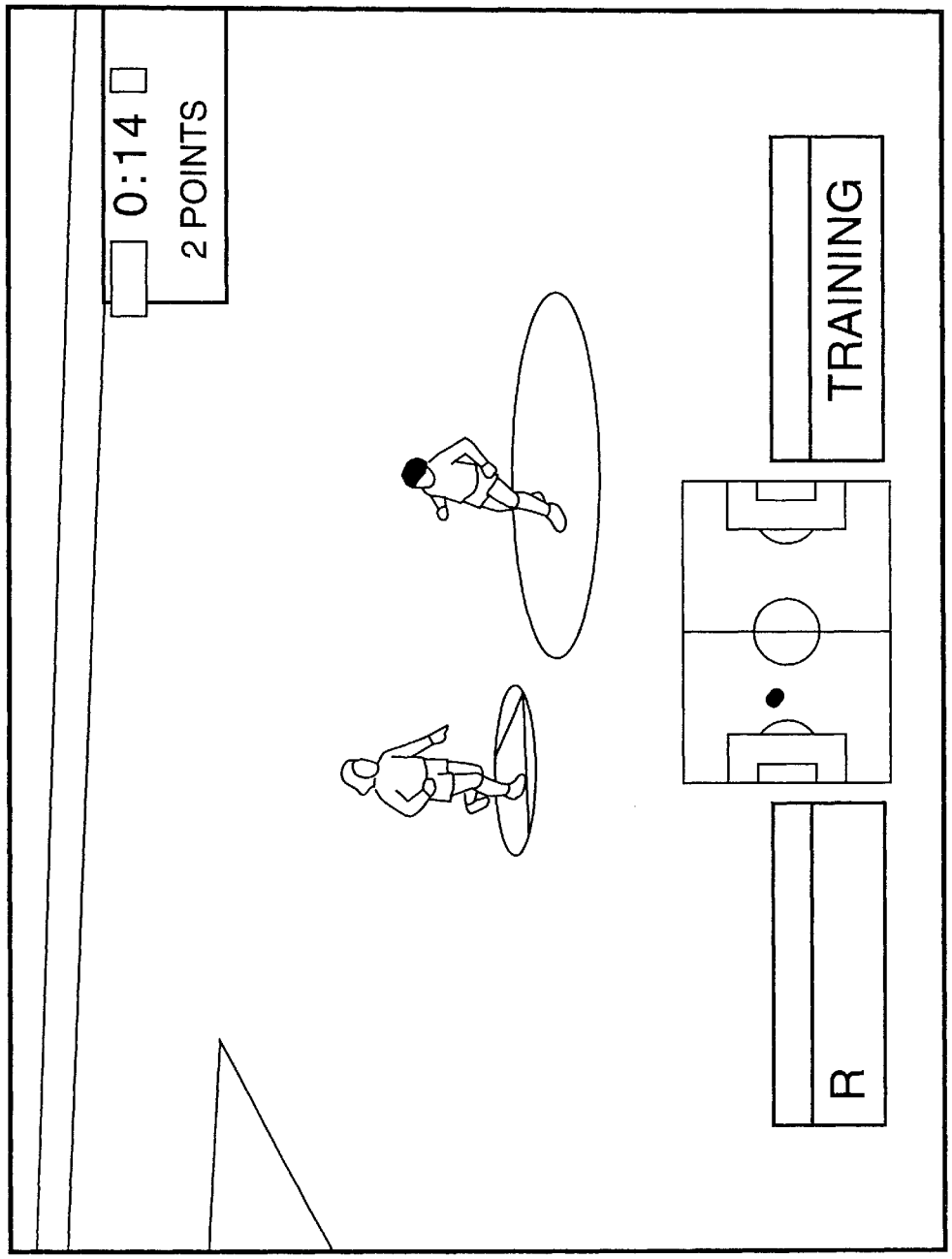
FIG. 41 is a diagram illustrating a screen after the one-on-one mini-game is cleared.

Subsequently, whether the circle mark Ci has been displayed in red for three or more seconds is judged (Step ST175). Specifically, whether the approach of the main character Pa to the first enemy character E1 has been continued for three or more seconds is judged. If three seconds have not elapsed yet, this subroutine proceeds to Step ST179. If, on the other hand, three seconds have already elapsed, this subroutine returns after a game clear flag is set assuming a success and the level of the game is raised by one stage (Step ST177). FIG. 41 shows a game screen when the main character Pa cleared the condition. As shown at the upper right, a time required is 14 seconds and points are changed from 0 point to 2 points.

In Step ST179, whether a predetermined time, e.g. 20 seconds have elapsed is judged. If not, this subroutine returns to Step ST163. If the predetermined time has elapsed, a mini-game completion flag is set assuming that the main character could not clear the condition (Step ST181). A period as a clearing condition is not restricted to three seconds, but may be any suitable period. Alternatively, this period may be changeably set so as to be longer as the level increases.

Next, "Injury Occurrence/Bomb" by the injury/bomb processing means 115 is described with reference to FIGS. 43 to 58.

Figure 43:
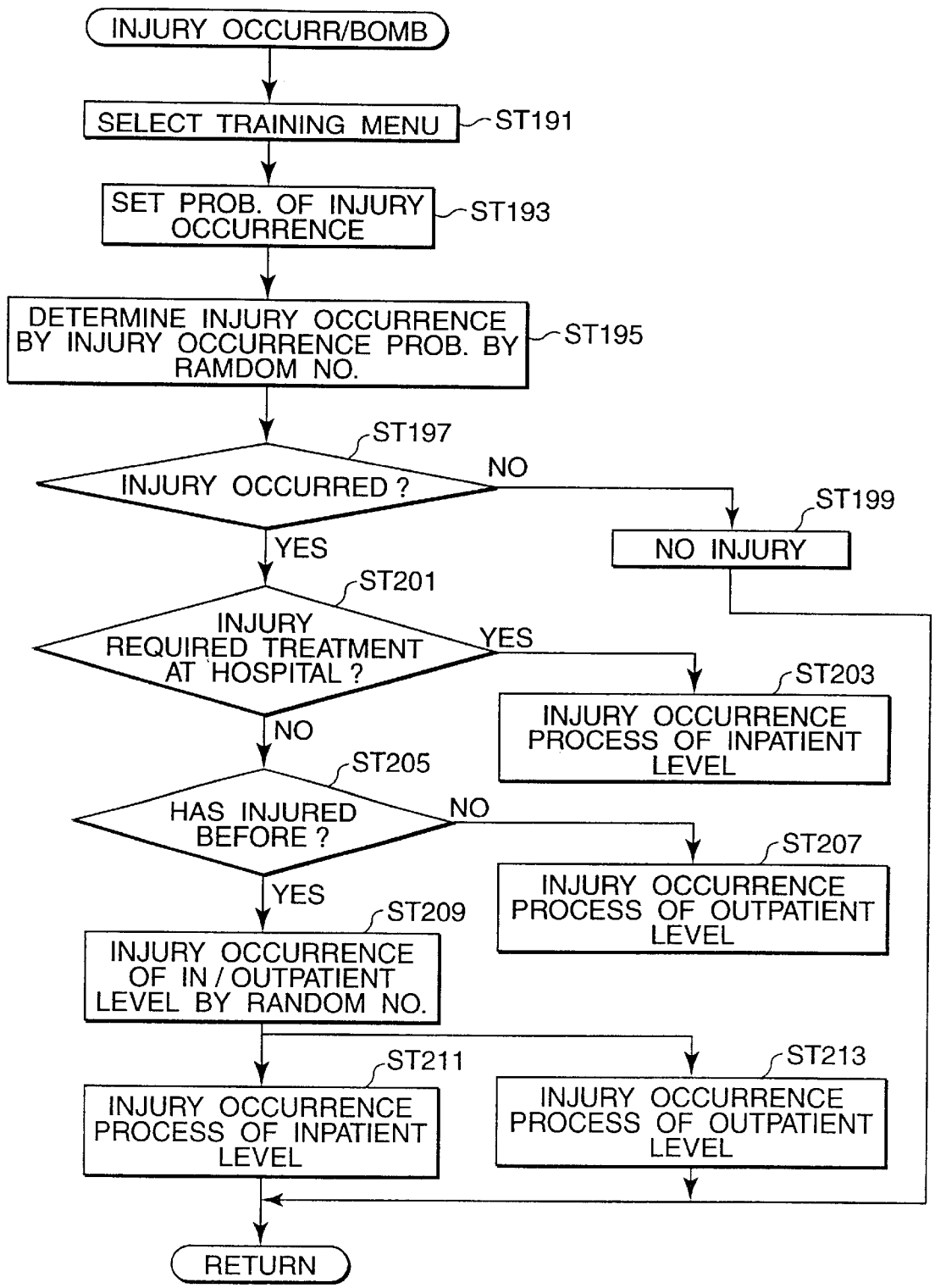
FIG. 43 is a flowchart "Injury Occurrence/Bomb"
Figure 46:
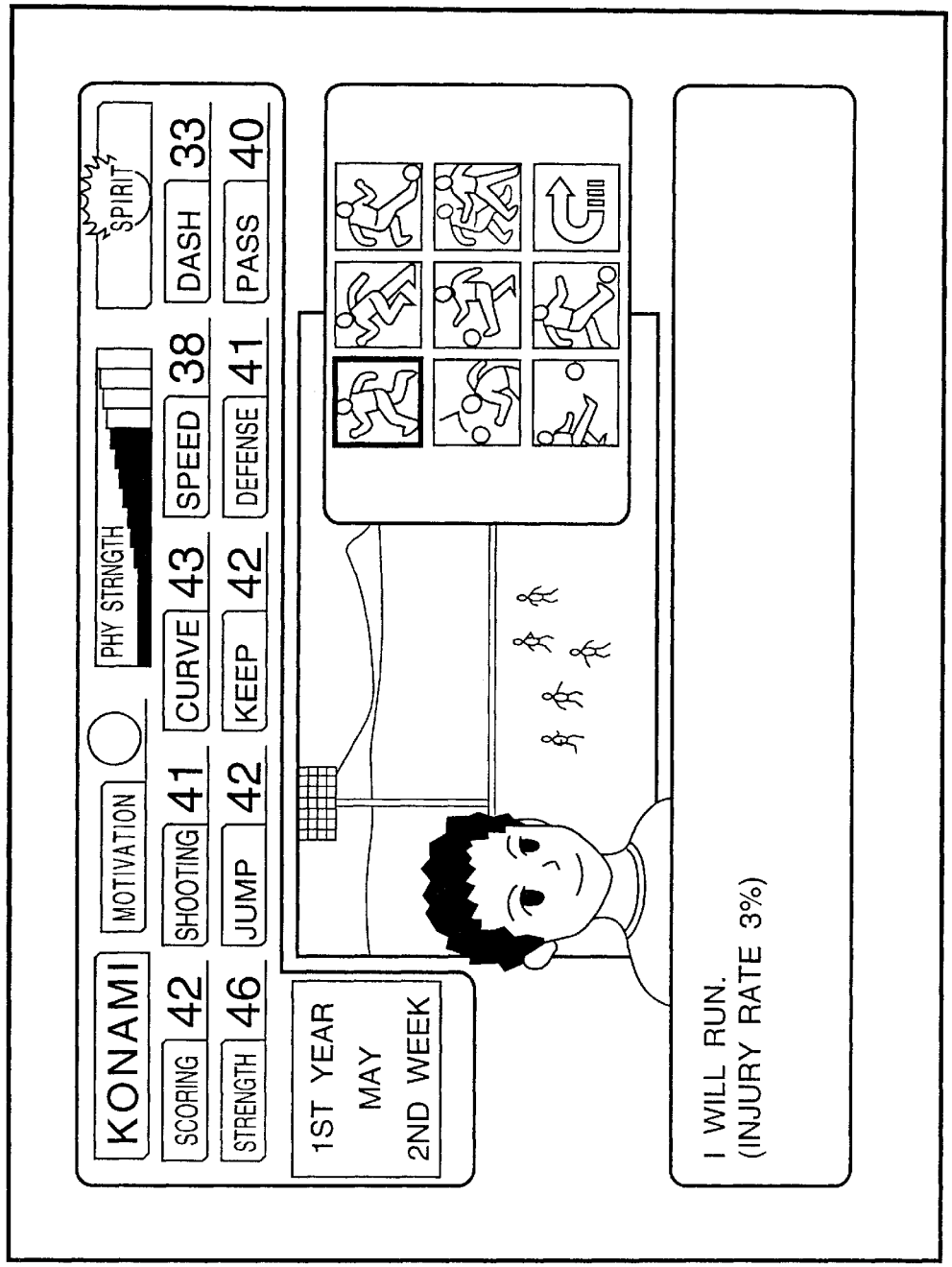
FIGS. 46 and 47 are diagrams illustrating screens when "Running" is selected from the "Training" menu.
Figure 47:
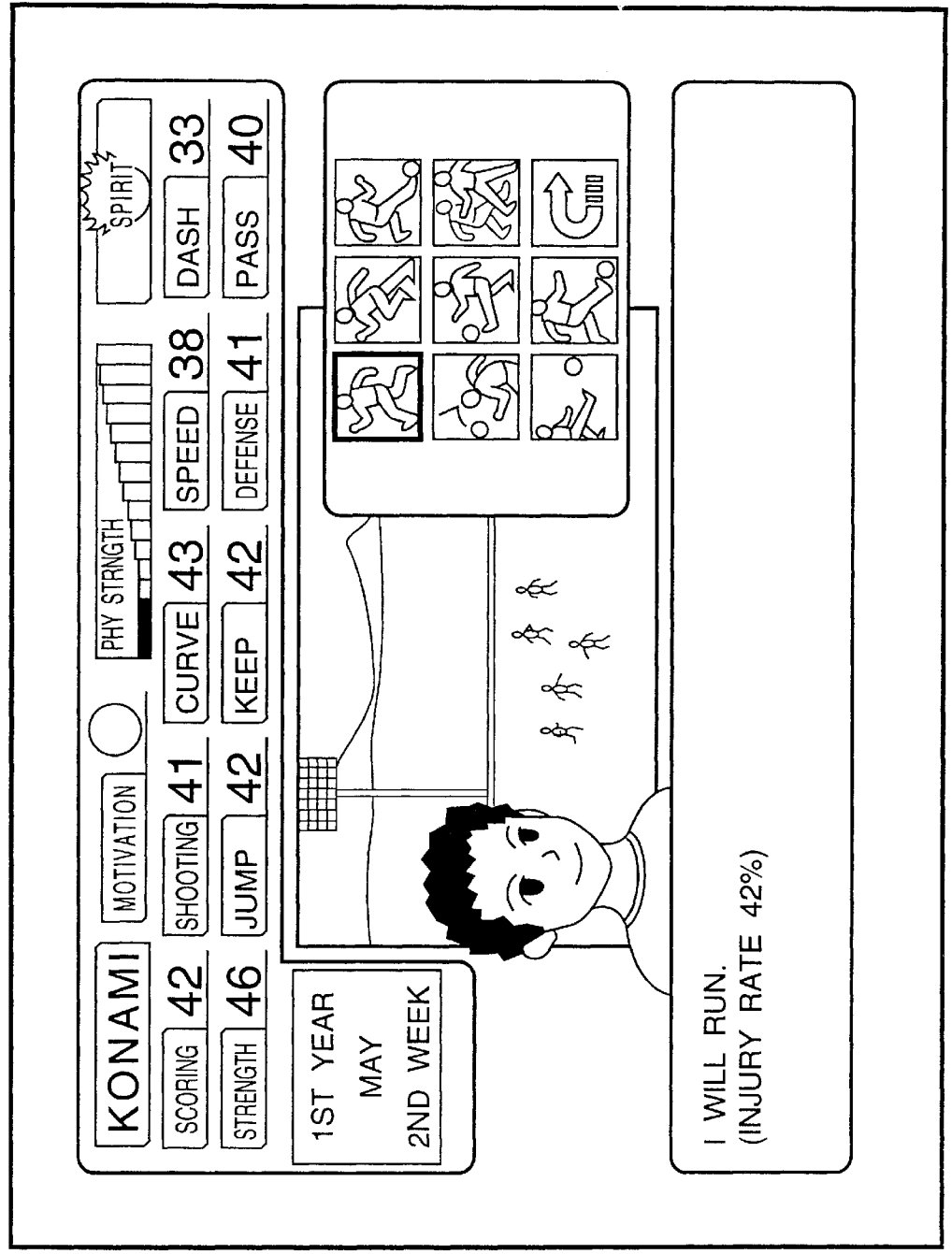
Figure 48:
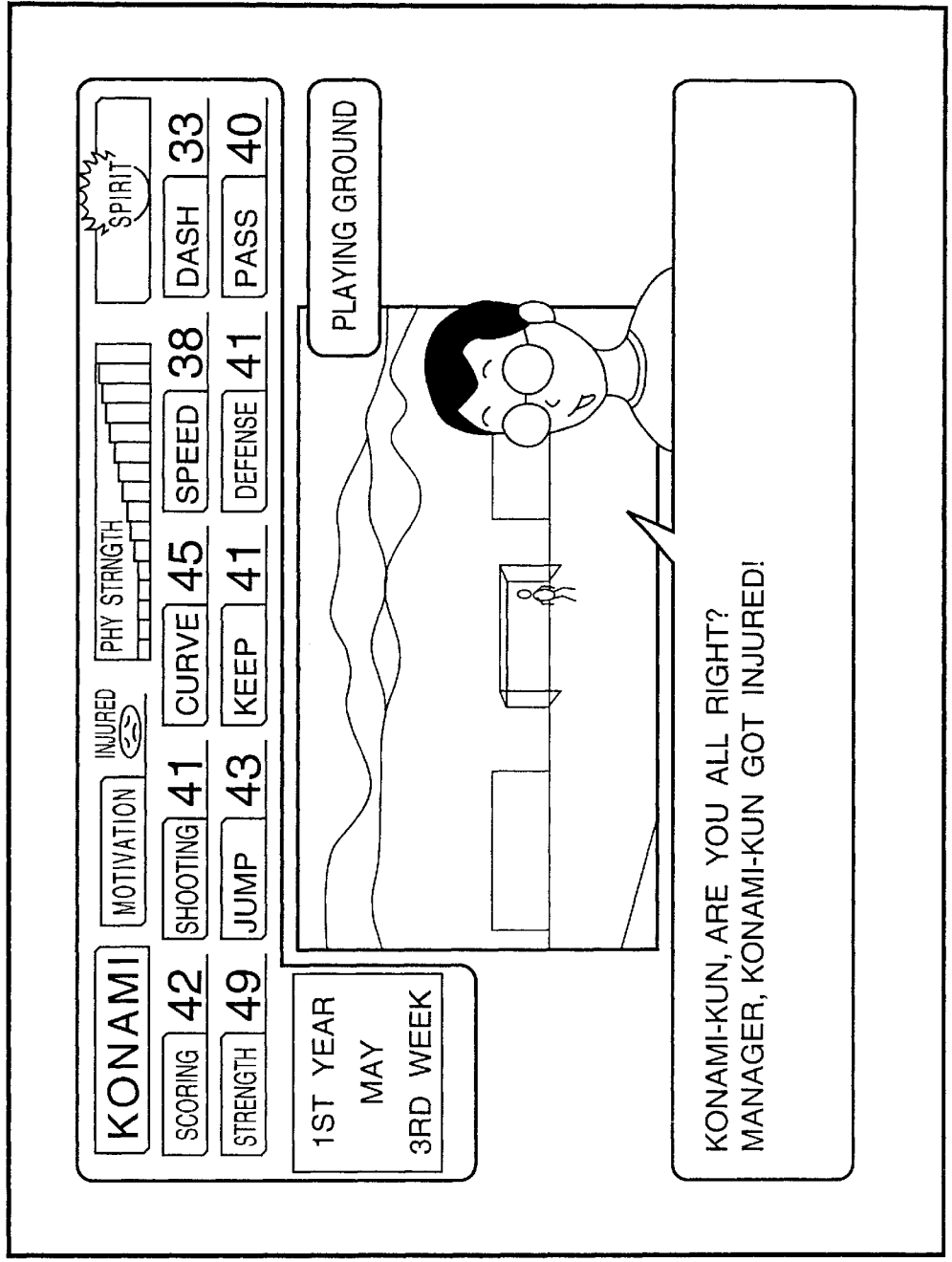
FIGS. 48 and 49 are diagrams illustrating screens when an injury of inpatient level has occurred during "Running"
Figure 49:
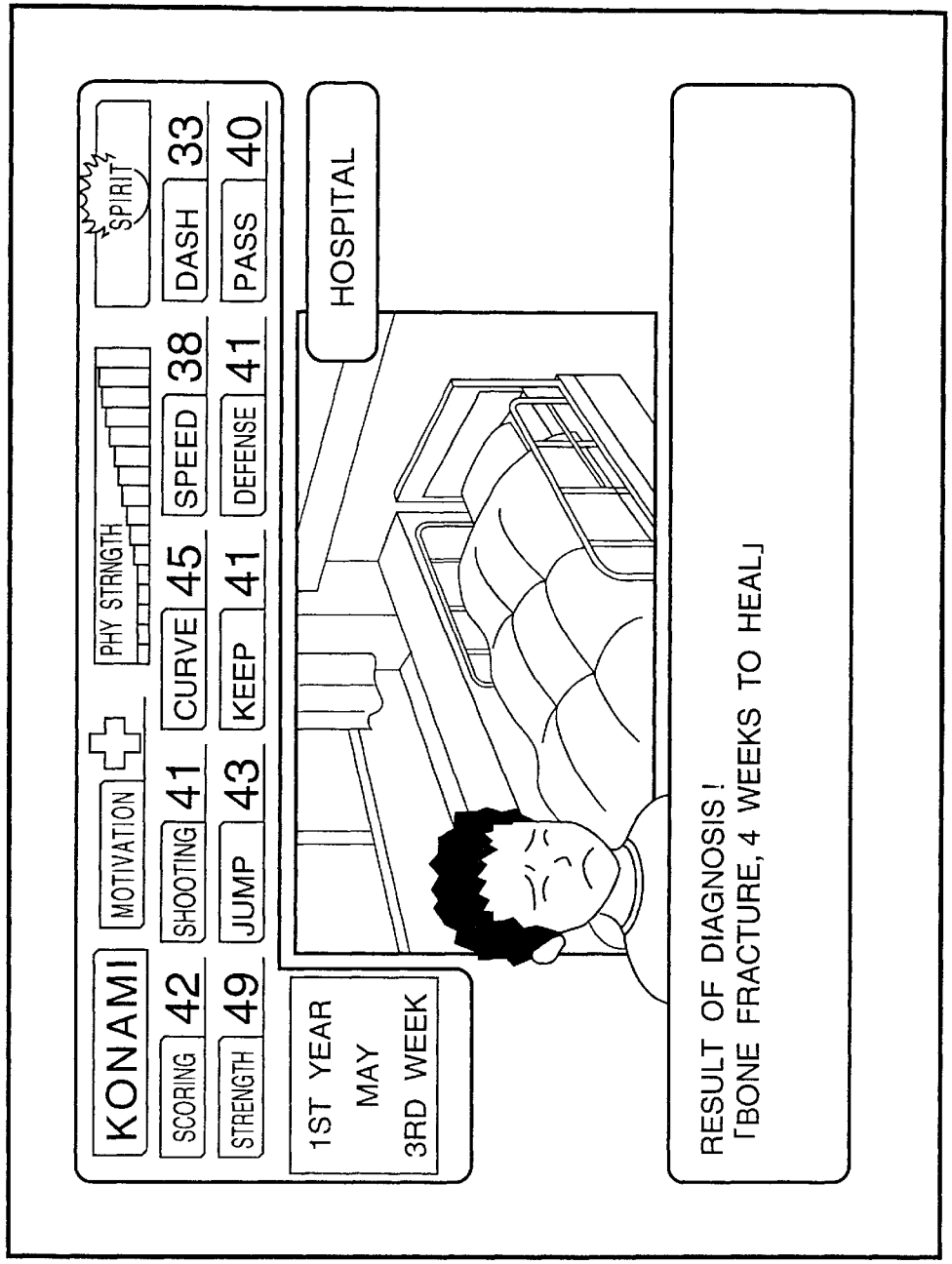

FIG. 43 is a flowchart of a "Injury Occurrence/Bomb" routine. When any of the items is selected from the "Training" menu by the operation unit 8 (Step ST191), an injury occurrence rate is determined using the respective training items, i.e. the main character's "Motivation Index", "Physical Strength Value" and "Enthusiasm Parameter Value" (Step ST193). FIGS. 46 and 47 show screens when "Running" is selected from the "Training" menu. The injury occurrence rate is 3% in FIG. 46 while being 42% in FIG. 47. Subsequently, injury occurrence is actually determined using a random number for the determined occurrence rate (Step ST195). The injury occurrence is judged (Step ST197) and this flow returns without creating an injury occurrence event (Step ST199) if no occurrence is judged. On the other hand, if injury occurrence is judged, whether the injury is of outpatient level (level where the injured goes to hospital for treatment) is judged (Step ST201). If the injury is of outpatient level, a negative event is caused to occur so that the main character has an injury of inpatient level (level where the injured has to be hospitalized) (Step ST203), and the screens are changed to those in hospital for a specified number of weeks and the selection of "Training" is absolutely prohibited while the main character is in hospital. In such a case, the display of "Training" in the icon display area 131 is cleared so as to make any selection impossible. FIGS. 48 and 49 show screens when an injury of inpatient level occurs during "Running". In FIG. 48, the screen in which one teammate appears and cries "Konami-kun, are you all right? Manager, Konami-kun got injured!" is displayed. Then, in FIG. 49, the screen of the main character in hospital is displayed and the level of the injury is explained: "Result of diagnosis: Fracture of Bone, Four Weeks to Completely Heal".

Figure 50:
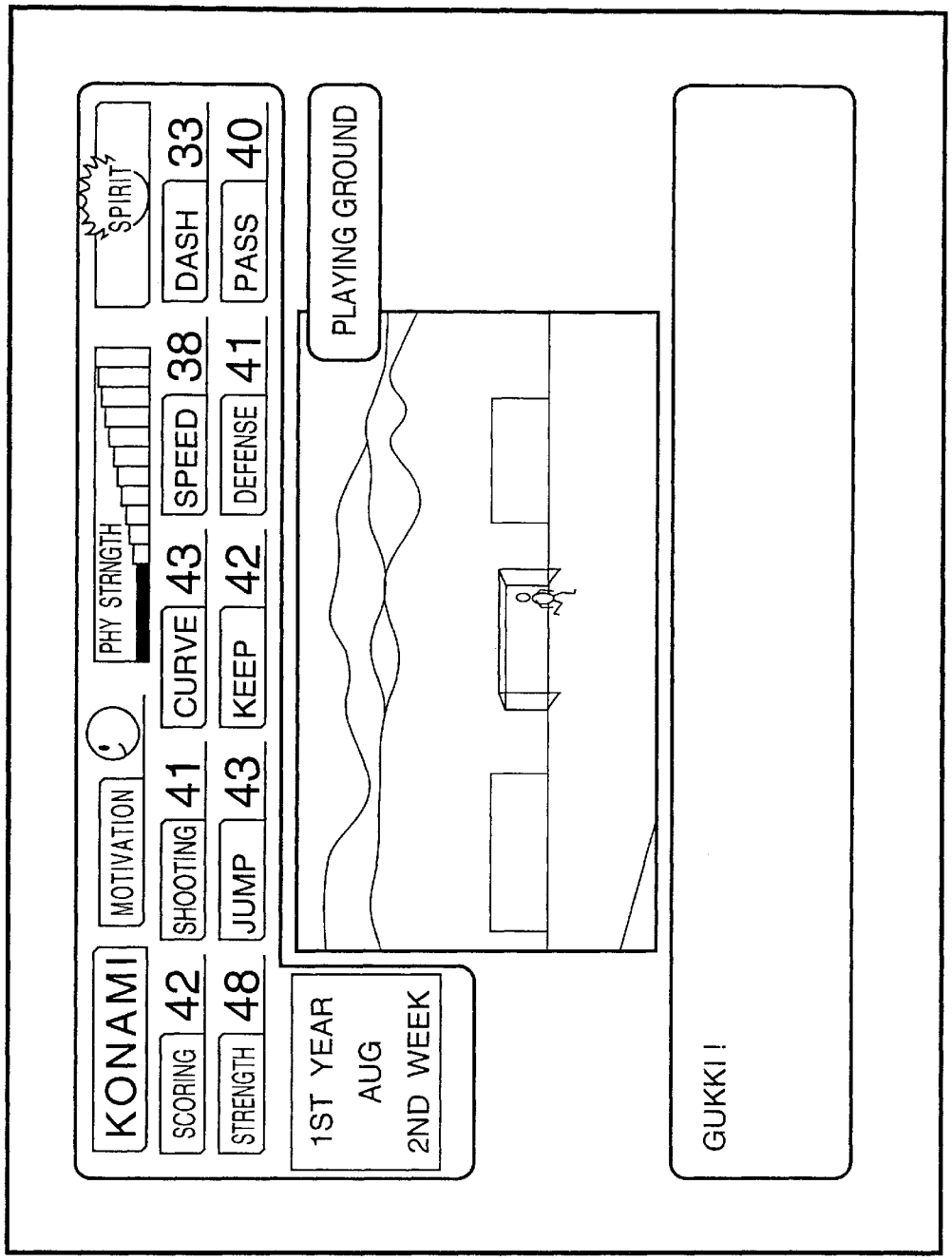
FIGS. 50 and 51 are diagrams illustrating screens when an injury of outpatient level has occurred during "Running"
Figure 51:
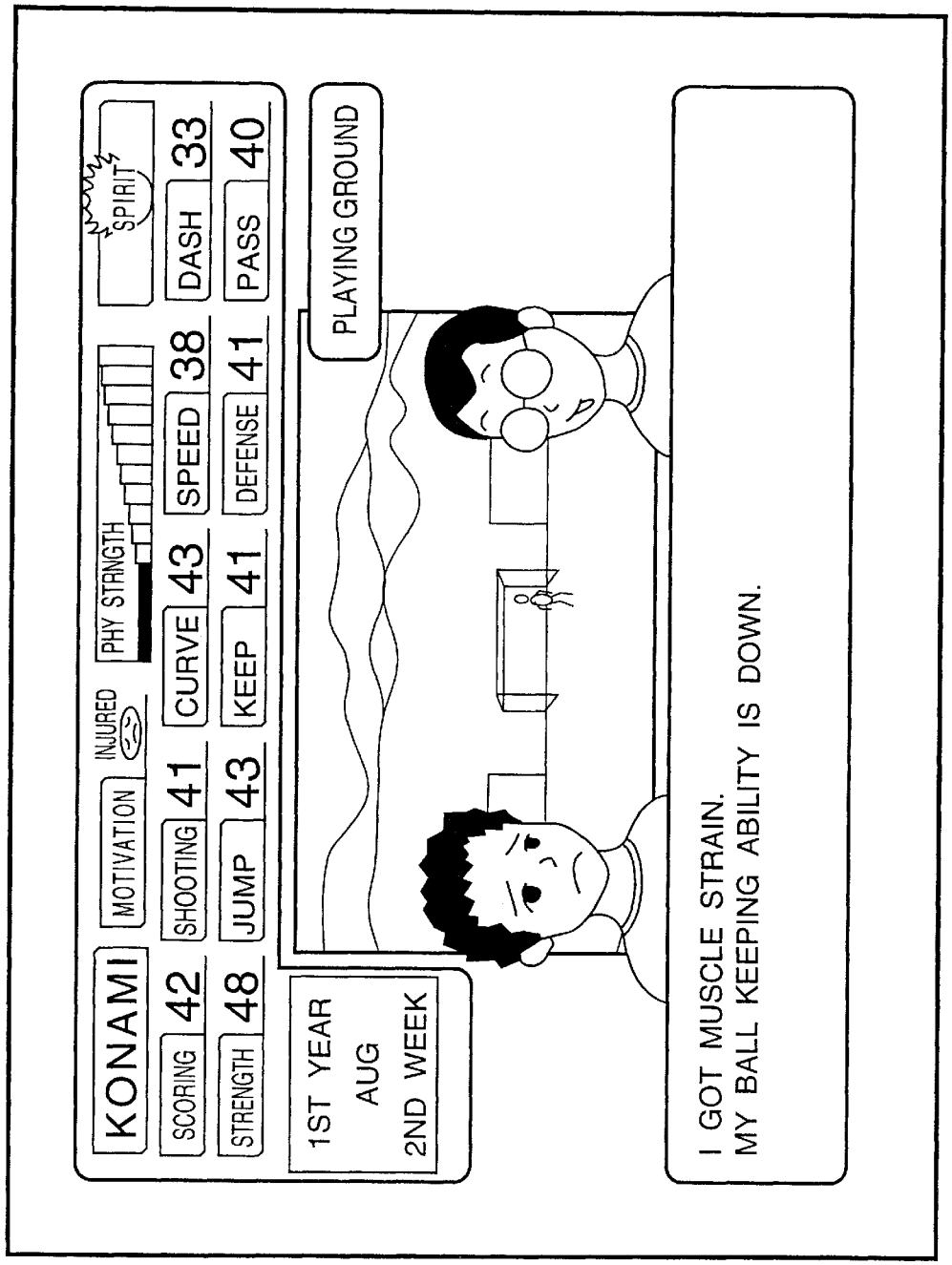

On the other hand, if the injury is not of outpatient level, whether the main character has already got injured at all is judged based on an injury count value (Step ST205). If he has never got injured, a slightly negative event is caused to occur so that an injury of outpatient level will occur and a message to the effect that the main character goes to hospital for treatment is displayed (Step ST207). In this case, selection of certain kinds of training contents may be prohibited. The prohibited training items are displayed at low luminance in the same manner as described above. FIGS. 50 and 51 show screens when an injury of inpatient level occurs during "Running". In FIG. 50, a mimicking sound "Gukil!" indicating an abnormality is displayed. Then, in FIG. 51, a conversation screen with a teammate is displayed, in which a conversation "I got a muscle strain. My ball-keeping ability is down" indicating the injury of outpatient level is displayed.

Figure 52:
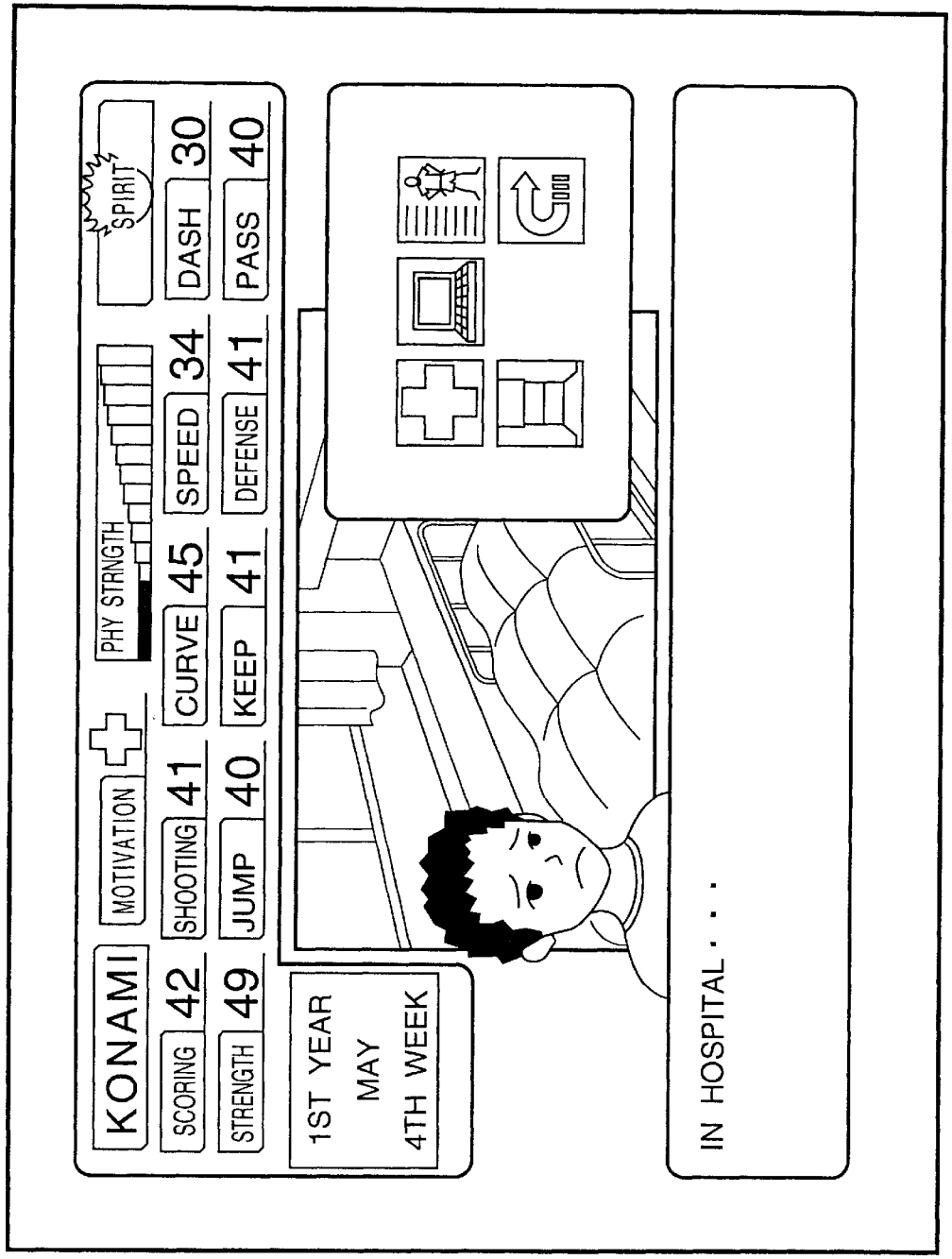
FIG. 52 is a diagram illustrating an in-hospital screen.
Figure 53:
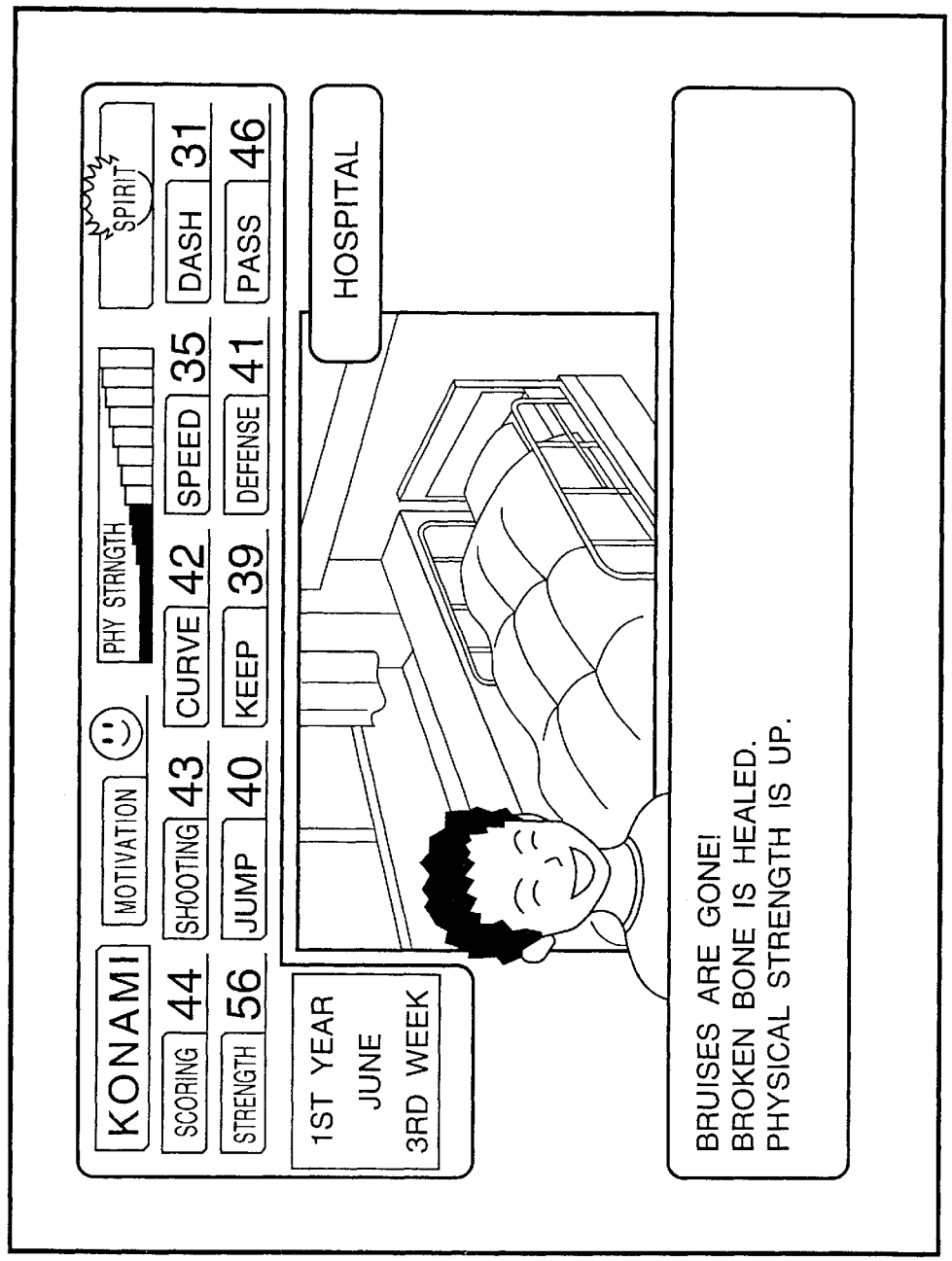
FIG. 53 is a diagram illustrating a complete recovery screen.

On the other hand, if the main character has already got injured at least once, a random number is generated to execute such a control as to cause an occurrence of injury of outpatient or inpatient level (Step ST209). The occurrence of injury of outpatient or inpatient level is determined using the random number such that the occurrence rate of the injury of outpatient level is 30% and that of inpatient level is 70%. Upon the occurrence of the injury of inpatient level, this flow returns after the hospital image is displayed for a predetermined period and an inpatient level injury occurrence processing such as prohibition of the selection of the "Training" items is executed (Step ST211). FIGS. 52 and 53 show screens in which the main character is hospitalized due to the injury of inpatient level and is completely healed after the lapse of a specified time. In FIG. 52, the in-hospital image and "In Hospital . . . " are displayed. In FIG. 53, "Bruises are gone. Broken bone is healed. Physical strength is up" indicating a complete healing is displayed. This indicates the main character's physical strength has been increased by being hospitalized.

On the other hand, if the injury of outpatient level occurs, the flow returns after a message "Currently Outpatient" is displayed (Step ST213).

Figure 44:
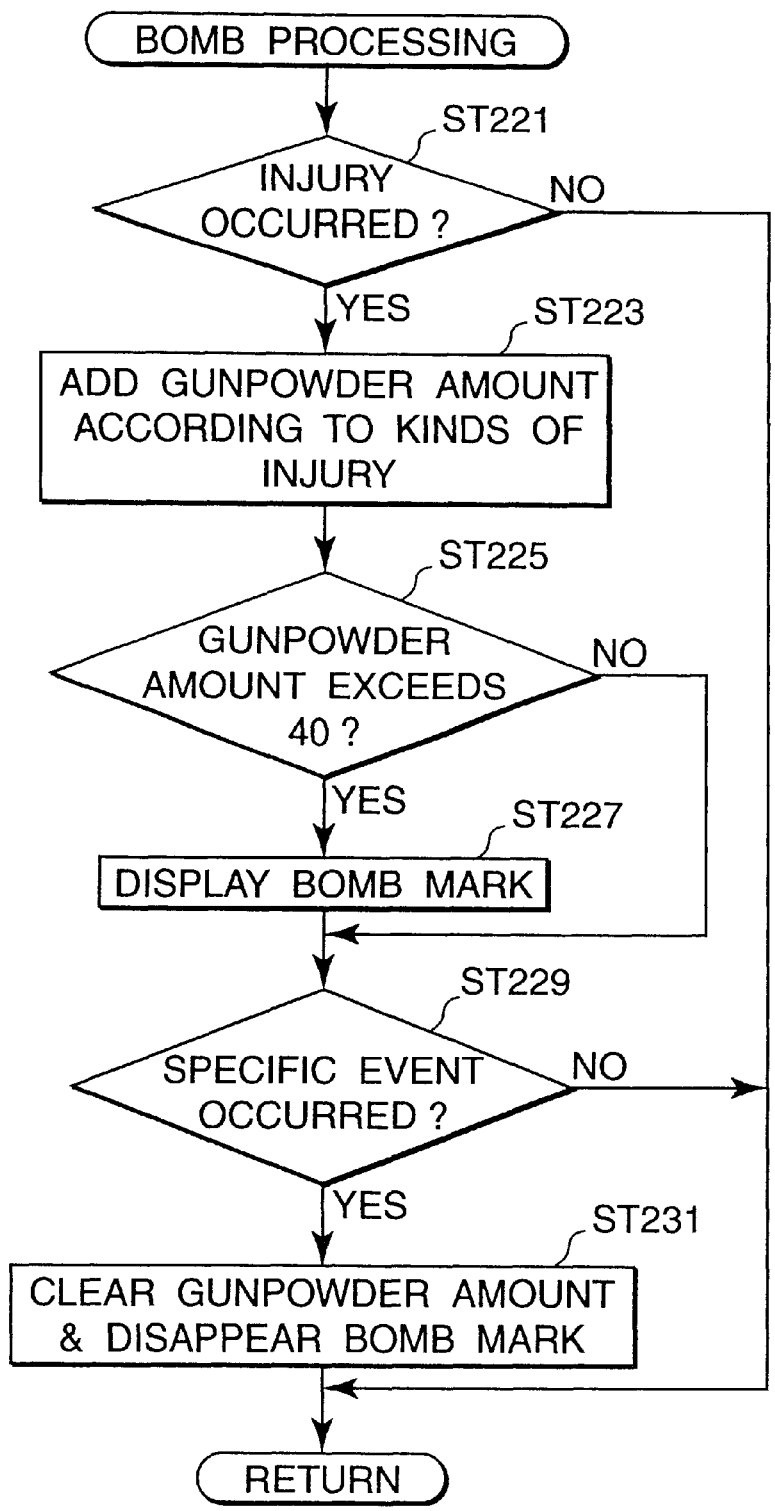
FIG. 44 is a flowchart illustrating a subroutine "Bomb Processing"
Figure 54:
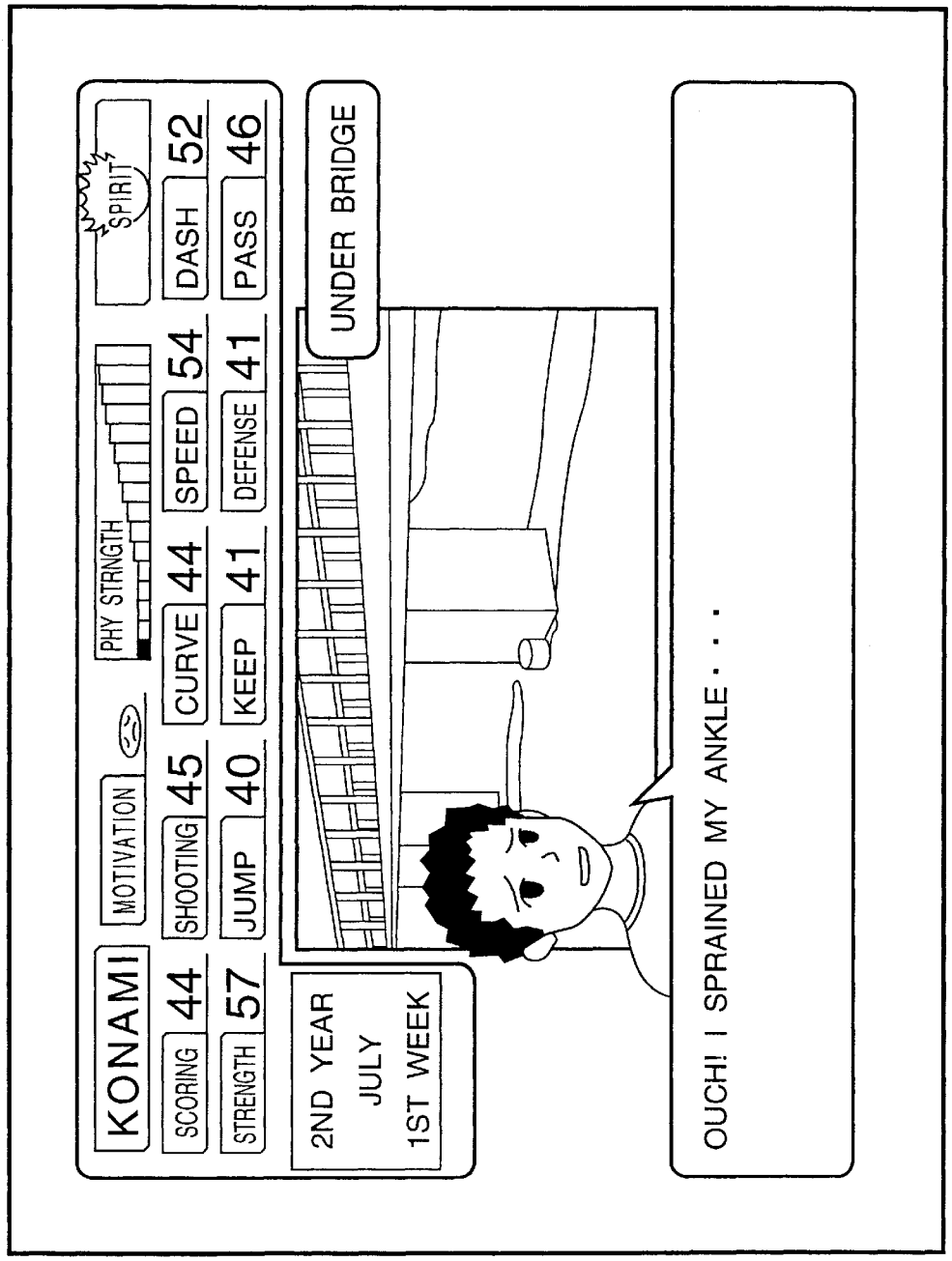
FIG. 54 is a diagram of a screen illustrating an injury occurred during a "Non-Training Period"
Figure 55:
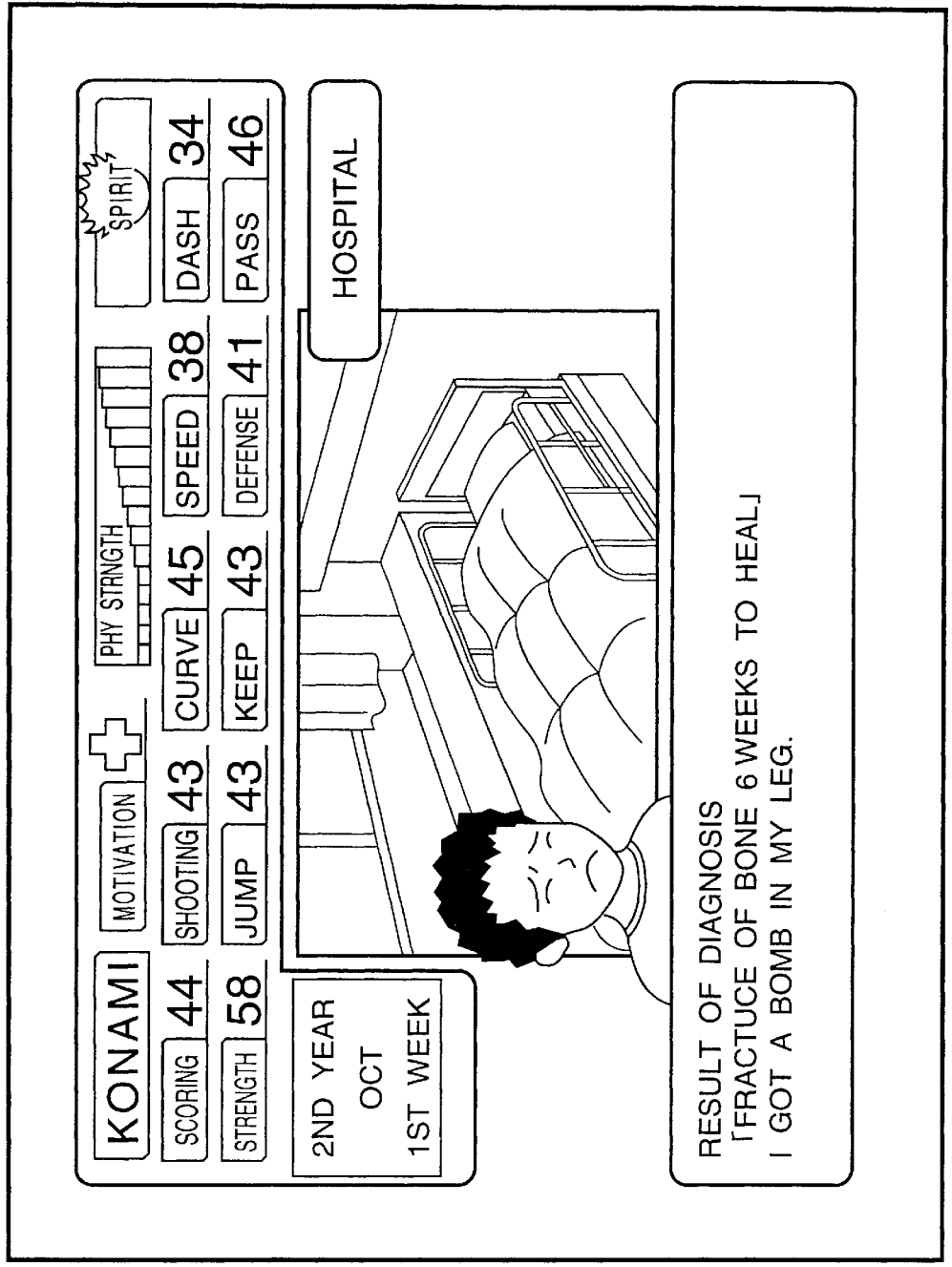
FIG. 55 is a diagram illustrating an in-hospital screen.
Figure 56:
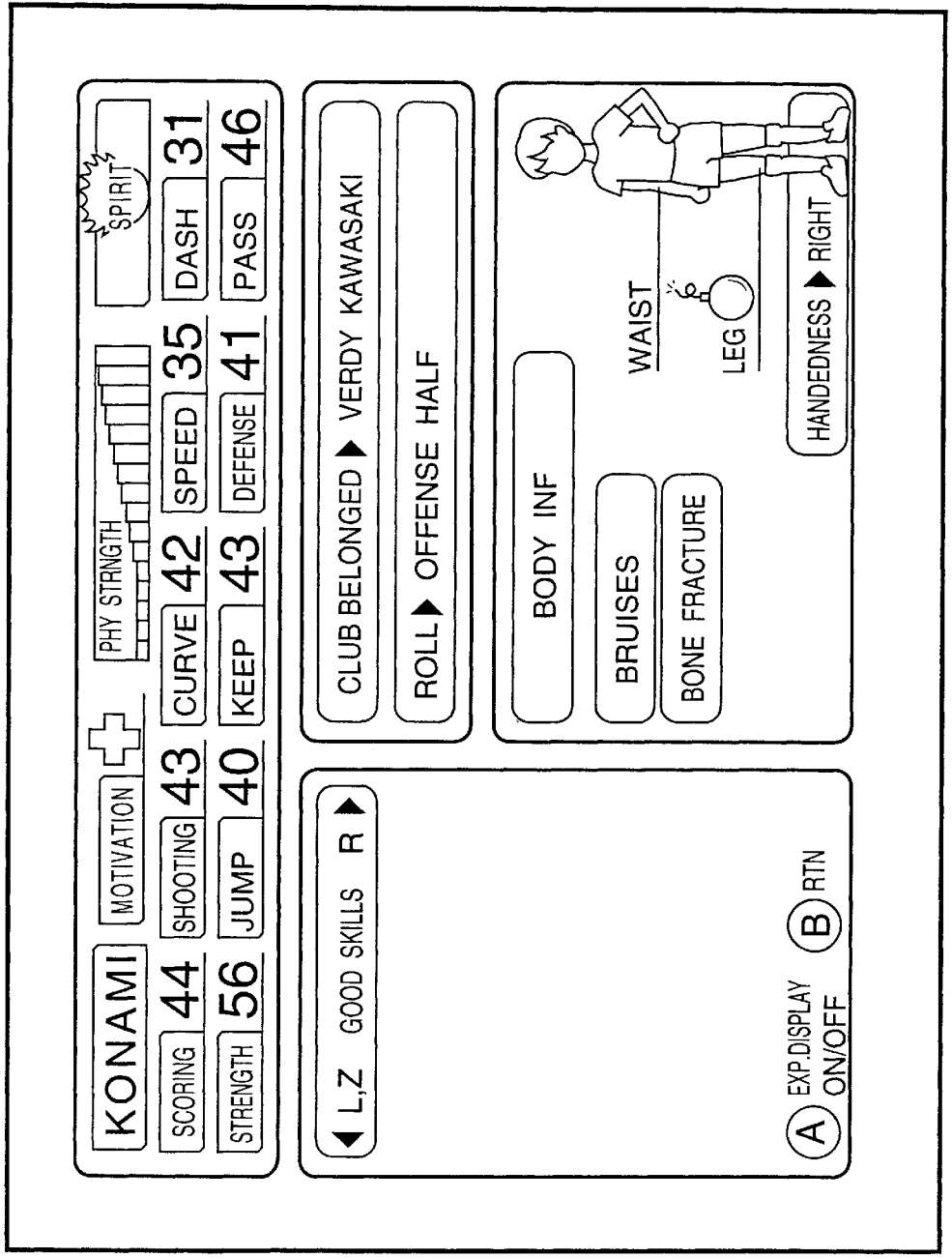
FIG. 56 is a diagram illustrating a screen when "Own Evaluation"

The injury occurrence events are not restricted to during "Training", but may occur during "Play" or the like "Ouch! I䙥e sprained my ankle " as shown in FIG. 54. In the case that "Enthusiasm Parameter Value" is low, an injury is likely to randomly occur as a negative event. FIG. 44 shows a subroutine "Bomb Processing". First, an injury occurrence is judged (Step ST221). This subroutine returns if no injury has occurred. On the other hand, if the injury has occurred, an amount of gunpowder according to the level and kind-of the injury is set (Step ST223). The gunpowder amount is calculated by adding a gunpowder amount this time to the one immediately before the occurrence of injury. Subsequently, whether the gunpowder amount has reached "40" in relation to a maximum amount "100" is judged (Step ST225). This subroutine proceeds to Step ST229 unless the gunpowder amount exceeds "40". Conversely, if the gunpowder amount exceeds "40", setting of a bomb is known to the game player by displaying "Result of diagnosis: Fracture of bone, six weeks to completely heal" is displayed on the in-hospital screen. FIG. 56 is a screen sowing "Own Evaluation". After the occurrence of the bomb, "Body information: Bruises, Fracture of Bone" is displayed as body information at that time. Further, a display control is executed so that a bomb mark B appears on the side of "Legs" (the bomb mark B can also appear on the side of "Waist" of the main character image (Step ST227). Subsequently, an occurrence of a specific event is judged (Step ST229). This subroutine returns if no such event has occurred. A control is executed to clear the gunpowder amount and disappear the bomb mark B (Step ST231) if the specific event has occurred.

Figure 45:
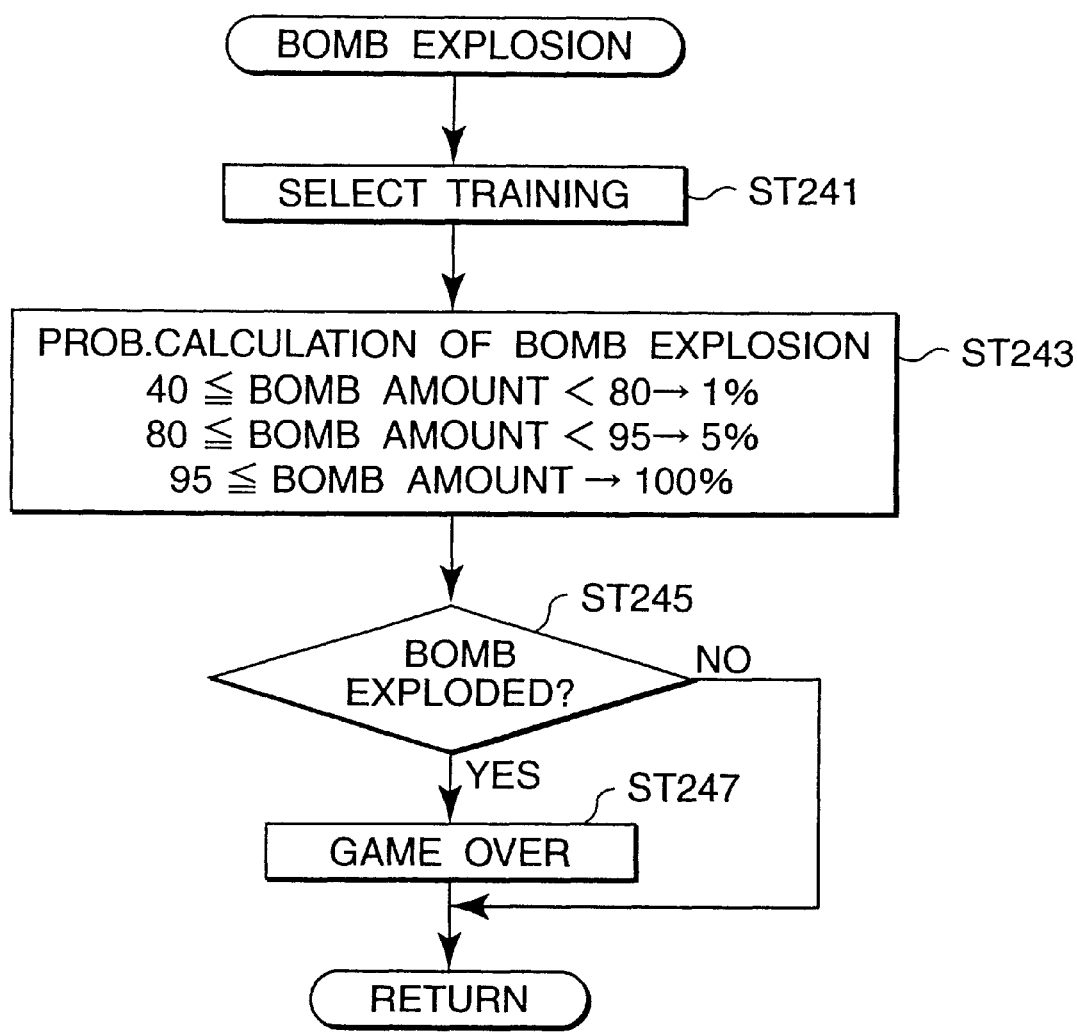
FIG. 45 is a flowchart illustrating a subroutine "Bomb Explosion"
Figure 57:
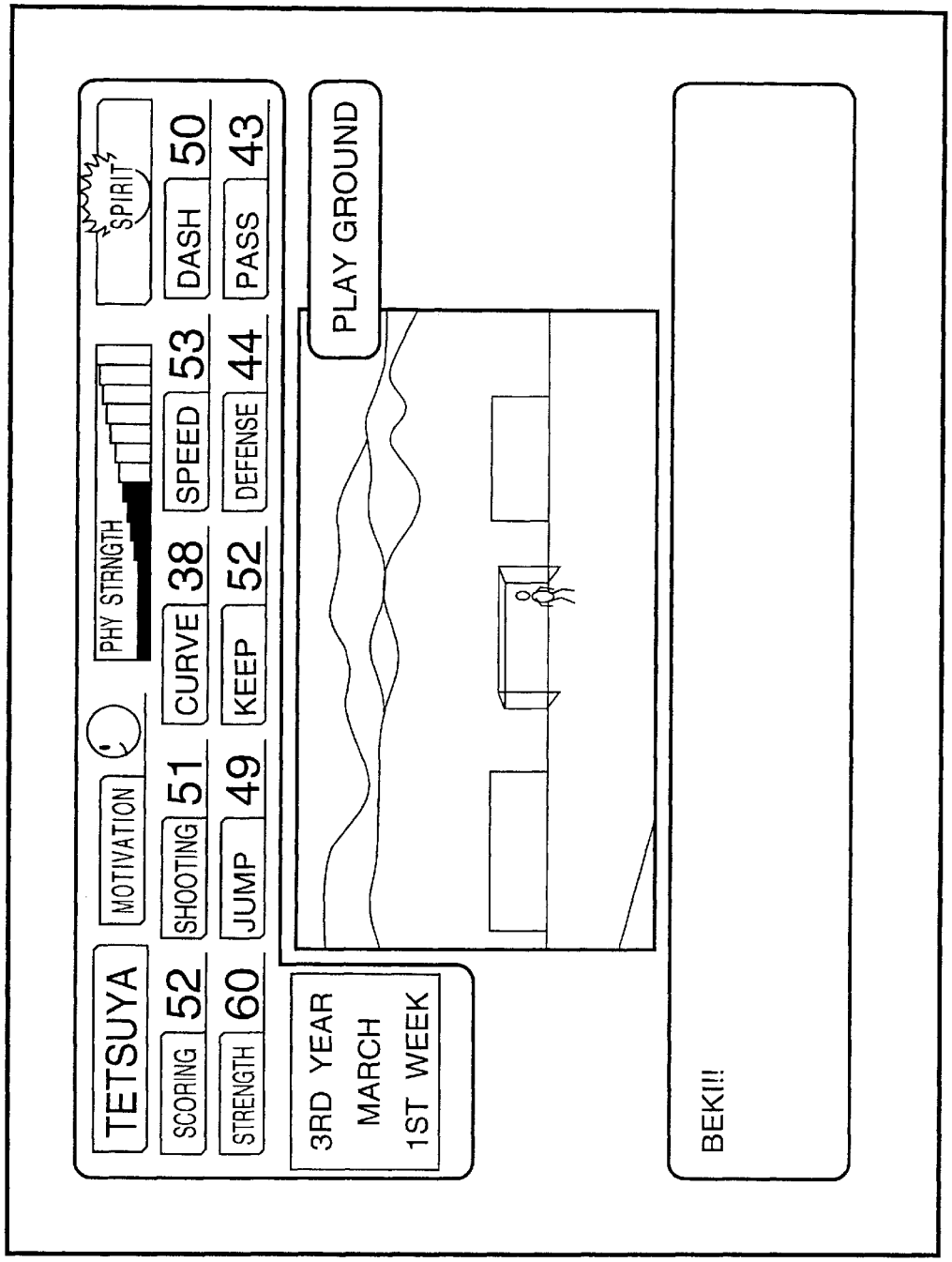
FIG. 57 is a diagram showing a screen when an abnormality occurs during "Training"

FIG. 45 is a subroutine "Bomb Explosion". When "Training" is selected (Step ST241), whether the bomb will explode is determined using a random number (Step ST243). A bomb explosion rate is 1t when the gunpowder amount is 40 to 80 (exclusive) and 5% when it is 80 to 95 (exclusive). The explosion of the bomb is determined using the random number with such rates. A determination method here is as follows. For example, in the case that the gunpowder amount is "85", the bomb will explode if one number randomly selected from numbers 1 to 100 coincides with one of five numbers specified in advance. In the case that the gunpowder amount is "95", the bomb will exploded 100%, i.e. without fail. If the explosion of the bomb is determined (YES in Step ST245), the game is forcibly finished (Step ST247) assuming that such a fatal injury as to make it impossible for the main character to play soccer again has occurred to the leg or waist of the main character. This subroutine returns unless otherwise (NO in Step ST245). FIGS. 57 and 58 show game-over occurrence screens. In FIG. 57, "Beki!!" showing an abnormality is displayed during "Training". Upon receipt of the determination of the bomb explosion, ". . . Explosion . . . " is displayed in FIG. 58 to finish the game.

The present invention may also be embodied as follows.

(1) Although the reliability degree of the manager character on the main character is a judgment factor in the foregoing embodiment, both of the reliability degrees of the manager and the coaches as leader characters may be considered and a sum of these reliability degrees may be used as a judgment factor. Alternately, the weighted reliability degree of the teammate(s) may be reflected on the judgment.

(2) Although the present invention is described with respect to a soccer game in the foregoing embodiment, it is applicable to a baseball game, other ball games, or any sport game related to the growth of players. Further, by more broadly understanding the growth, the present invention may also be applicable to any growth beyond the areas of sport.

(3) The application of the inventive game video device is not restricted to human characters, and this video device may be applied to characters in general having a growing factor based on enthusiasm and reliability.

(4) The enthusiasm mark is not restricted to a character and a flame, and may be any mark (including a gauge) with which the degree of enthusiasm is recognizable.

(5) The reflection of the enthusiasm parameter on the reliability degree is not restricted to the aforementioned operational expression, and various operational expressions may be used. For example, the enthusiasm parameter may be reflected at a specified ratio or a multiply of the enthusiasm parameter may be converted into a reliability degree, which is added or subtracted to and from the present reliability degree.

(6) The mini-game is not restricted to the one-on-one mode and two-on-one mode, and may be a two-on-two mode including a teammate at the main character's side.

(7) Even if the inventive game is applied to a competition game other than soccer, a similar training can be done as a mini-game without displaying an image simulating a tool used in the competition. This is advantageous in suppressing burdens on the software in generating images.

The present invention also embraces the following embodiments.

Specifically, in a video game device comprising: a speech/action storage means for storing contents of various speeches and actions of a leader character to be given to a main character as an ability growth object relating at least to training and a random factor; a display control means for displaying the leader character, the main character, menus corresponding to the various speeches/actions made by the main character, and contents of the speeches/actions to be executed on a display unit; an operation unit for successively selectably instructing the menu corresponding to an arbitrary speech/action from the various menus displayed on the display unit; a speech/action executing means for reading out the speech/action corresponding to the menu instructed by the operation unit and causing the main character to perform the content of the speech/action into which the random factor is incorporated to thereby obtain an execution result, an ability value updating means for successively updating an ability value of the main character according the execution result of the content of the speech/action; a parameter storage means for storing an enthusiasm parameter which is set to be a positive value corresponding to each training-related speech/action while being a negative value corresponding to any other speech/action; an enthusiasm parameter adding means for adding a corresponding set value to a present enthusiasm parameter presently given to the main character every time the speech/action is executed, a reliability degree calculating means for calculating a reliability degree between the main character and the leader character, and a judging means for judging a successful growth based on conditions if the ability value of the main character is equal to or above a specified level after the speeches/actions are executed a specified number of times and if the reliability degree given to the main character is equal to or above a specified level.

Further, the ability value updating means may include an addend calculating means for setting an ability addend value corresponding to the execution result of each speech, and an ability value adding means for adding the ability addend value obtained to the present ability value every time the speech is executed. In this way, the ability addend value set every time the speech is executed can be influenced by the reliability degree and the like.

Further, the reliability degree calculating means includes a reliability addend calculating means for setting a reliability addend value representing a reliability degree between the main character and the leader character according to the execution result of the speech and the enthusiasm parameter value at that time, and a reliability degree adding means for adding the obtained reliability addend value to the present reliability degree every time the speech is executed. In this way, the enthusiasm parameter value can be more likely to be reflected on the reliability addend value obtained every time the speech is executed.

The reliability addend calculating means may set a large value when a positive value is to be set as the reliability addend value in the case that the enthusiasm parameter value is equal to or larger than a specified large value.

The reliability addend calculating means may add a specific value when a positive value is set as the reliability addend value in the case that the enthusiasm parameter is equal to or larger than a predetermined value near an upper limit value.

The reliability addend calculating means may set a small value when a negative value is to be set as the reliability addend value in the case that the enthusiasm parameter value is equal to or larger than the specified large value.

The reliability addend calculating means may set a small value when a positive value is to be set as the reliability addend value in the case that the enthusiasm parameter value is equal to or smaller than a specified small value.

The reliability addend calculating means may set a large value when a negative value is to be set as the reliability addend value in the case that the enthusiasm parameter value is equal to or larger than the specified small value.

Further, the speech executing means may make it likely for such a random factor as to make an ability addend value positive to occur as a result of execution of the speech content in the case of a high enthusiasm parameter value.

The speech executing means may make it likely for such a random factor as to make an ability addend value zero or negative to occur as a result of execution of the speech content in the case of a low enthusiasm parameter value.

There may be further provided a forcible ending means for forcibly ending the game if the enthusiasm parameter value falls to a specified value.

Further, the display control means may display a sum of the enthusiasm parameter value obtained by the enthusiasm parameter adding means in the form of a mark on the display unit.

The display control means may display an enthusiasm mark on the screen displaying the menus.

The display control means may display a simulated flame as the enthusiasm mark, which flame successively changes in size according to the sum of the enthusiasm parameter value.

The display control means may display a character conceiving an enthusiasm in the flame-simulating mark, which character successively changes in size according to the sum of the enthusiasm parameter value.

The display control means may display a character conceiving an enthusiasm as an enthusiasm mark, which character successively changes in its display color according to the sum of the enthusiasm parameter value.

There may be further provided a time advancing means for advancing a time axis of the game every time the speech is executed, and the judging means may make the judgment when the time axis reaches a predetermined point of time. A unit time by which the time axis is advanced in this case may be suitably set according to the kind of the game. For instance, the unit time may be one week.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. A video game device comprising:

a speech/action storage means for storing contents of speeches and actions of a leader character to be given to a main character as an ability growth object relating at least to training and a random factor;

a display control means for displaying the leader character, the main character, menus corresponding to speeches/actions made by the main character, the speeches/actions including training-related speeches/actions, and contents of the speeches/actions to be executed on a display unit;

an operation unit for successively selectably instructing the menus corresponding to the speeches/actions to select a speech/action thereof;

a speech/action executing means for reading out the speech/action selected by the operation unit and causing the main character to perform the content of the speech/action into which the random factor is incorporated to thereby obtain an execution result;

an ability value updating means for successively updating an ability value of the main character according the execution result of the content of the speech/action;

a parameter storage means for storing an enthusiasm parameter which is set to be a positive value corresponding to each of the training-related speeches/actions while being a negative value corresponding to any other of the speeches/actions;

an enthusiasm parameter adding means for adding a corresponding set value to a present value of the enthusiasm parameter presently given to the main character every time the speech/action is executed;

a reliability degree calculating means for calculating a reliability degree between the main character and the leader character; and a judging means for judging a successful growth based on conditions if the ability value of the main character is equal to or above a specified level after the speeches/actions are executed a specified number of times and if the reliability degree given to the main character is equal to or above a specified level.

2. A video game device according to claim 1, wherein the ability value updating means includes an addend calculating means for setting an ability addend value corresponding to the execution result of each of the speeches/actions, and an ability value adding means for adding the ability addend value obtained to the present ability value every time the speech/action is executed.

3. A video game device according to claim 1, wherein the reliability degree calculating means includes a reliability addend calculating means for setting a reliability addend value representing a reliability degree between the main character and the leader character according to the execution result of the speech/action and the enthusiasm parameter value at that time, and a reliability degree adding means for adding the obtained reliability addend value to the present reliability degree every time the speech/action is executed.

4. A video game device according to claim 3, wherein the reliability addend calculating means sets a large value when a positive value is to be set as the reliability addend value in the case that the enthusiasm parameter value is equal to or larger than a specified large value and said large value is larger than a standard value to be set when the enthusiasm parameter value is smaller than said specified large value.

5. A video game device according to claim 3, wherein the reliability addend calculating means adds a specific value when a positive value is set as the reliability addend value in the case that the enthusiasm parameter is equal to or larger than a predetermined value near an upper limit value.

6. A video game device according to claim 3, wherein the reliability addend calculating means sets a small value when a negative value is to be set as the reliability addend value in the case that the enthusiasm parameter value is equal to or larger than the specified large value and said small value is smaller than a standard value to be set when the enthusiasm parameter value is smaller than said specified large value.

7. A video game device according to claim 3, wherein the reliability addend calculating means sets a small value when a positive value is to be set as the reliability addend value in the case that the enthusiasm parameter value is equal to or smaller than a specified small value and said small value is smaller than a standard value to be set when the enthusiasm parameter value is larger than said specified small value.

8. A video game device according to claim 3, wherein the reliability addend calculating means sets a large value when a negative value is to be set as the reliability addend value in the case that the enthusiasm parameter value is equal to or larger than the specified small value and said large value is larger than a standard value to be set when the enthusiasm parameter value is smaller than said specified small value.

9. A video game device according to claim 2, wherein the speech/action executing means makes it likely for such a random factor as to make an ability addend value positive to occur as a result of execution of the speech/action content in the case of a high enthusiasm parameter value.

10. A video game device according to claim 2, wherein the speech/action executing means makes it likely for such a random factor as to make an ability addend value zero or negative to occur as a result of execution of the speech/action content in the case of a low enthusiasm parameter value.

11. A video game device according to claim 1, wherein further comprising a forcible ending means for forcibly ending the game if the enthusiasm parameter value falls to a specified value.

12. A video game device according to claim 1, wherein the display control means displays a sum of the enthusiasm parameter value obtained by the enthusiasm parameter adding means in the form of a mark on the display unit.

13. A video game device according to claim 12, wherein the display control means displays an enthusiasm mark on the screen displaying the menus.

14. A video game device according to claim 12, wherein the display control means displays a simulated flame as the enthusiasm mark, which flame successively changes in size according to the sum of the enthusiasm parameter value.

15. A video game device according to claim 14, wherein the display control means displays a character conceiving an enthusiasm in the flame-simulating mark, which character successively changes in size according to the sum of the enthusiasm parameter value.

16. A video game device according to claim 13, wherein the display control means displays a character conceiving an enthusiasm as an enthusiasm mark, which character successively changes in its display color according to the sum of the enthusiasm parameter value.

17. A character growth control method for a video game in which an ability value of a main character is successively updated every time a speech/action is executed by successively executing contents of speeches/actions of a leader character, including training-related speeches/actions, to be given to the main character as an ability growth object and relating at least to training and a random factor according to consecutive operations of an operation unit, and causing the main character to perform the contents of the speeches/actions into which the random factor is incorporated, said method comprising the steps of:

storing an enthusiasm parameter which is set to be a positive value corresponding to each of the training-related speeches/actions while being a negative value corresponding to any other speech/action is stored;

adding a corresponding set value to a present enthusiasm parameter presently given to the main character every time the speech/action is executed;

calculating a reliability degree between the main character and the leader character based on an execution result of the speech/action and the enthusiasm parameter value at that time; and judging a successful growth based on conditions if the ability value of the main character is equal to or above a specified level after the speeches/actions are executed a specified number of times and if the reliability degree given to the main character at the time of the judgment is equal to or above the specified level.

18. A readable storage medium for storing a character growth program of a video game in which an ability value of a main character is successively updated every time a speech/action is executed, the character growth program including the steps of:

successively executing contents of speeches/actions of a leader character, including training-related speeches/actions, to be given to the main character as an ability growth object relating to training and a random factor according to successive operations of an operation unit by causing the main character to perform the contents of the speeches/actions into which the random factor is incorporated, wherein an enthusiasm parameter which is set to be a positive value corresponding to each of the training-related speeches/actions while being a negative value corresponding to any other speech/action is stored;

adding a corresponding set value to a present enthusiasm parameter presently given to the main character every time the speech/action is executed;

calculating a reliability degree between the main character and the leader character based on an execution result of the speech/action and the enthusiasm parameter value at that time; and judging a successful growth based on conditions of the ability value of the main character is equal to or above a specified level after the speeches/actions are executed a specified number of times and if the reliability degree given to the main character at the time of the judgment is equal to or above the specified level.

* * * * *